Nov. 19, 1929.   L. A. WATTERS ET AL   1,736,334
ACCOUNTING APPARATUS AND METHOD
Filed April 22, 1918   19 Sheets-Sheet 1
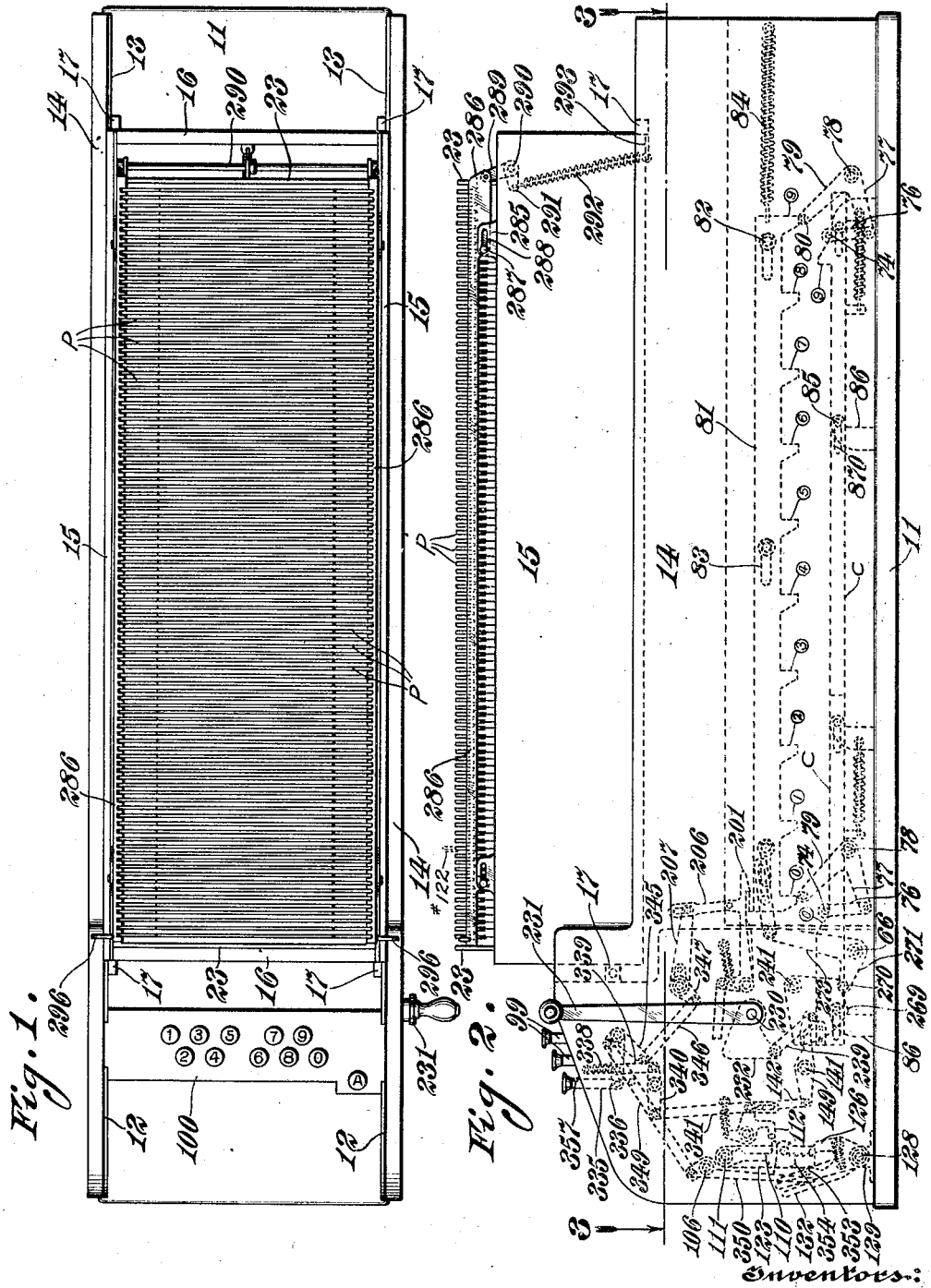
Inventors:
LUTHER A. WATTERS & SAMUEL F. LLOYD.
By John H. Bruninga
Their Attorney.

Nov. 19, 1929.  L. A. WATTERS ET AL  1,736,334
ACCOUNTING APPARATUS AND METHOD
Filed April 22, 1918    19 Sheets-Sheet 2
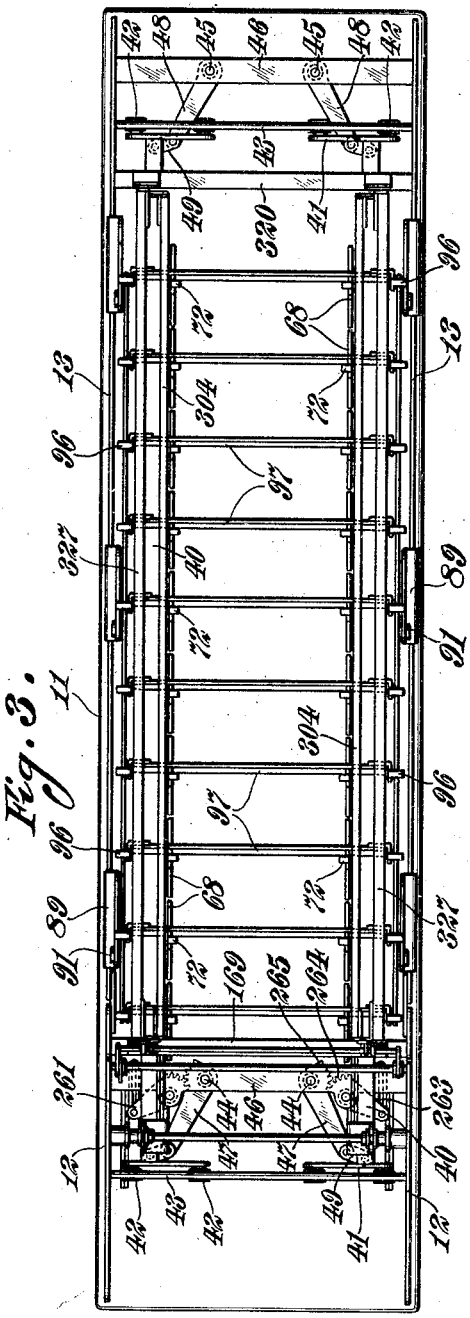
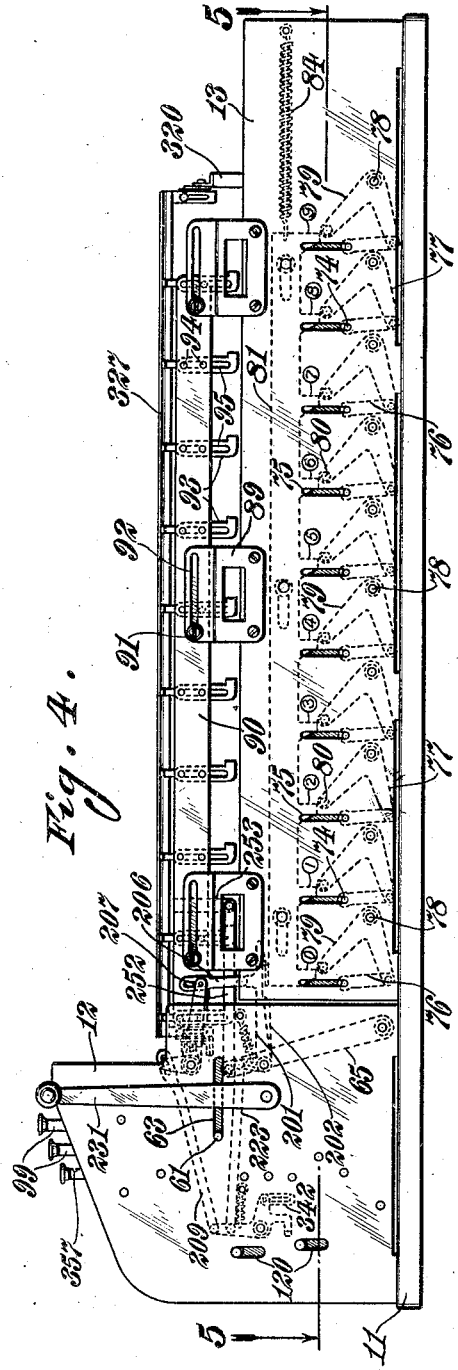
Inventors:
LUTHER A. WATTERS AND SAMUEL F. LLOYD,
By John N. Bruninga
Their Attorney.

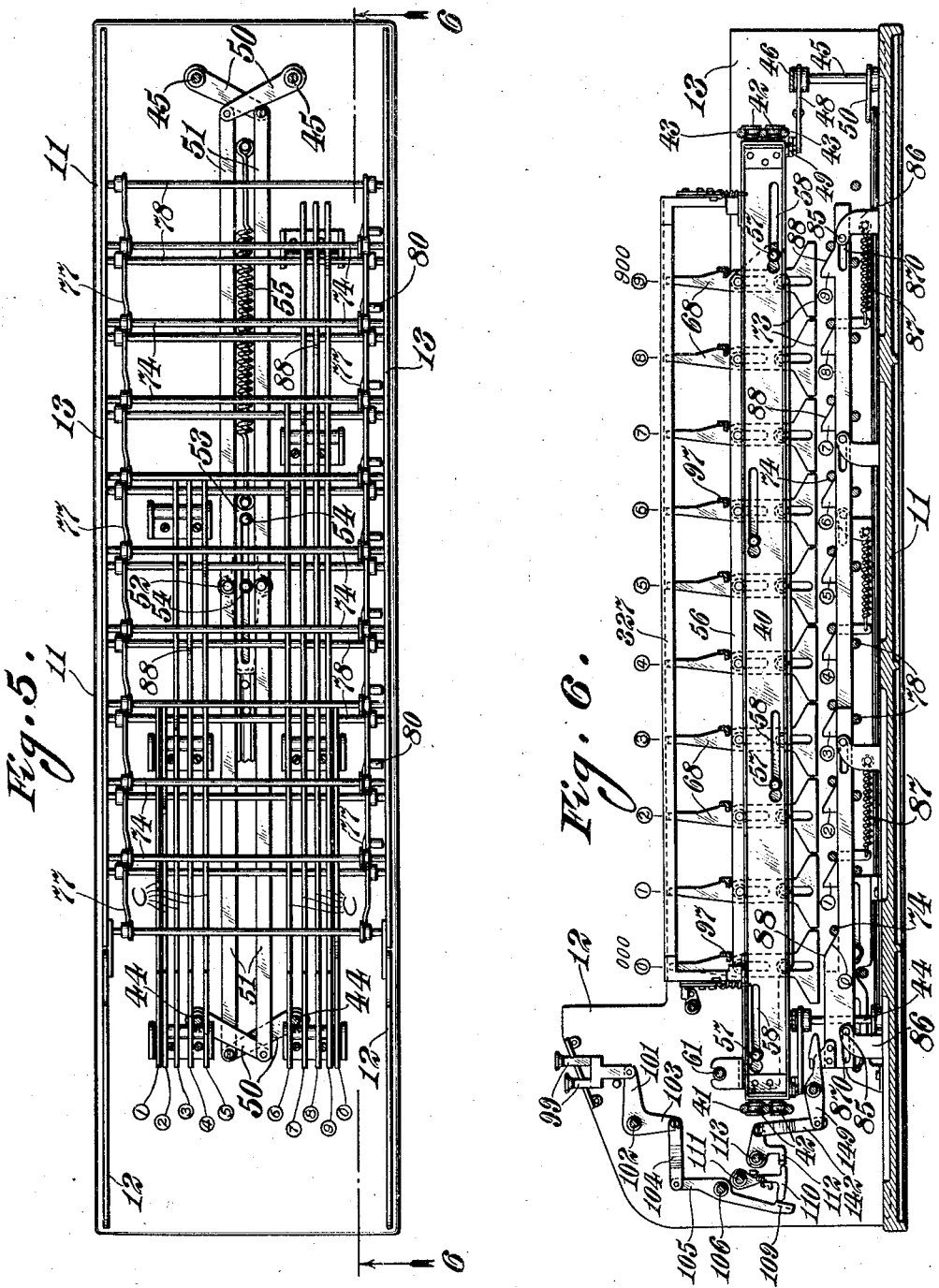

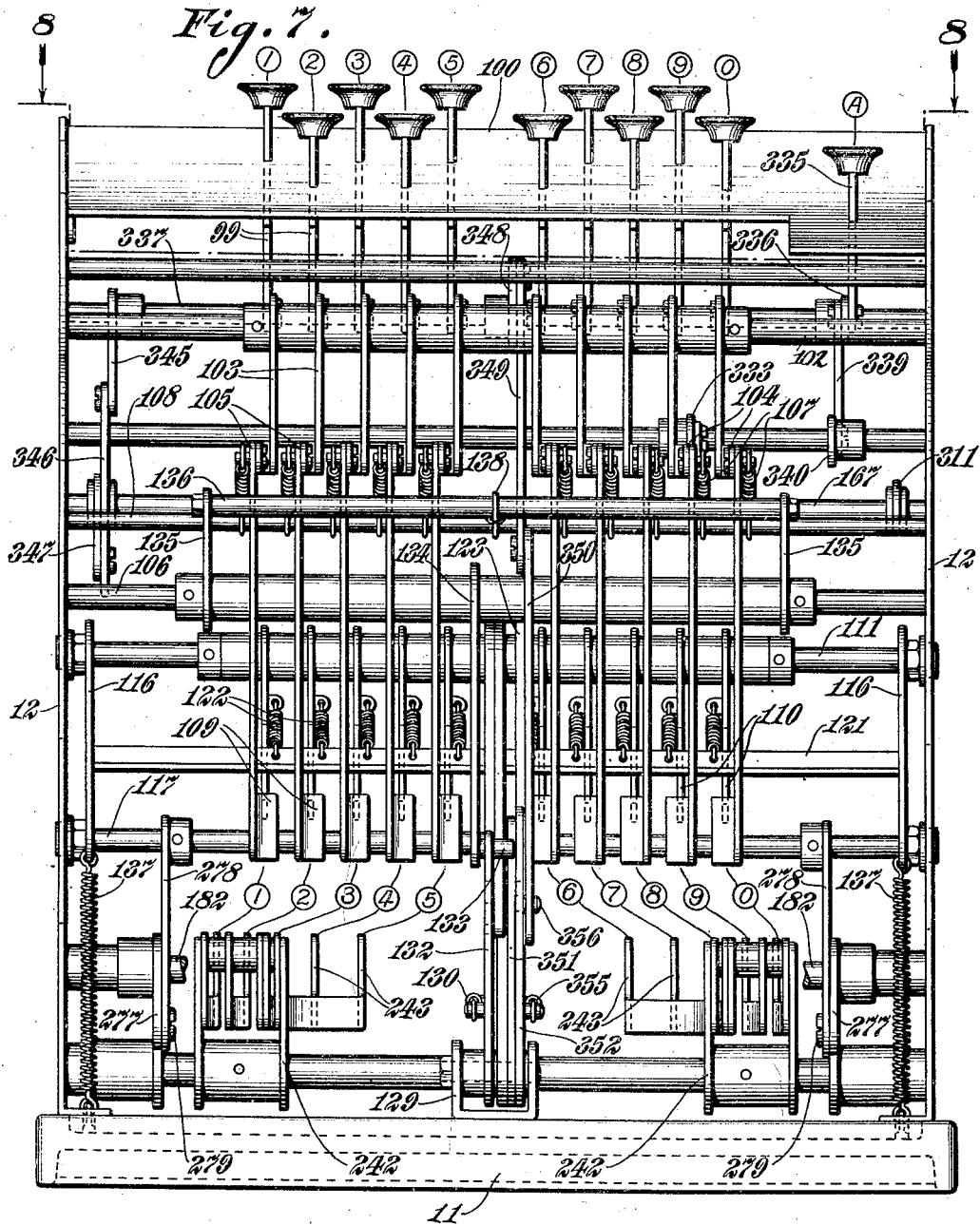

Nov. 19, 1929.  L. A. WATTERS ET AL  1,736,334
ACCOUNTING APPARATUS AND METHOD
Filed April 22, 1918  19 Sheets-Sheet 5

Inventors:
LUTHER A. WATTERS AND SAMUEL F. LLOYD,
By John N. Bruninga
Their Attorney.

Nov. 19, 1929.  L. A. WATTERS ET AL  1,736,334
ACCOUNTING APPARATUS AND METHOD
Filed April 22, 1918  19 Sheets-Sheet 6

Inventors:
LUTHER A. WATTERS AND SAMUEL F. LLOYD,
By John N. Bruninga
Their Attorney

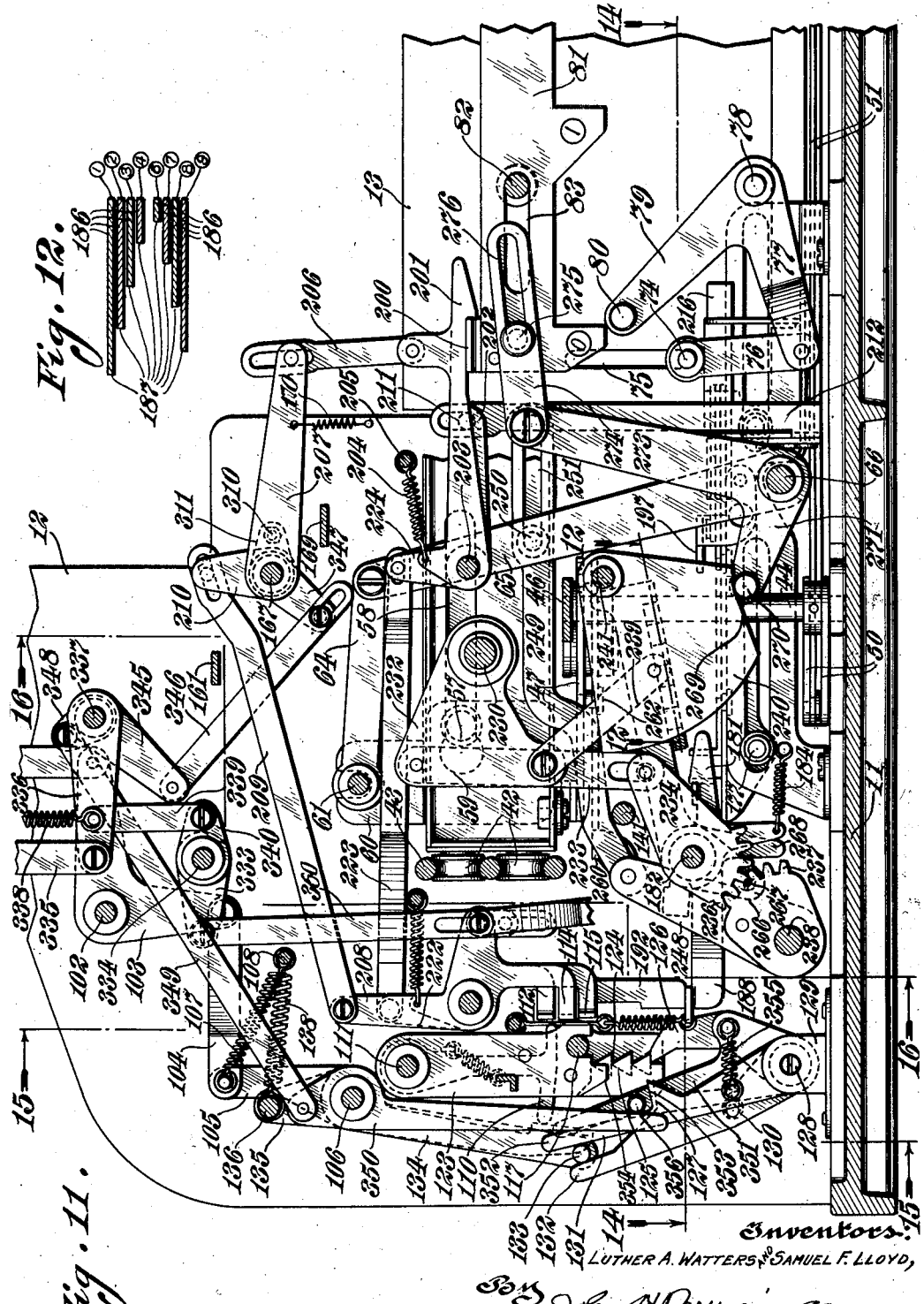

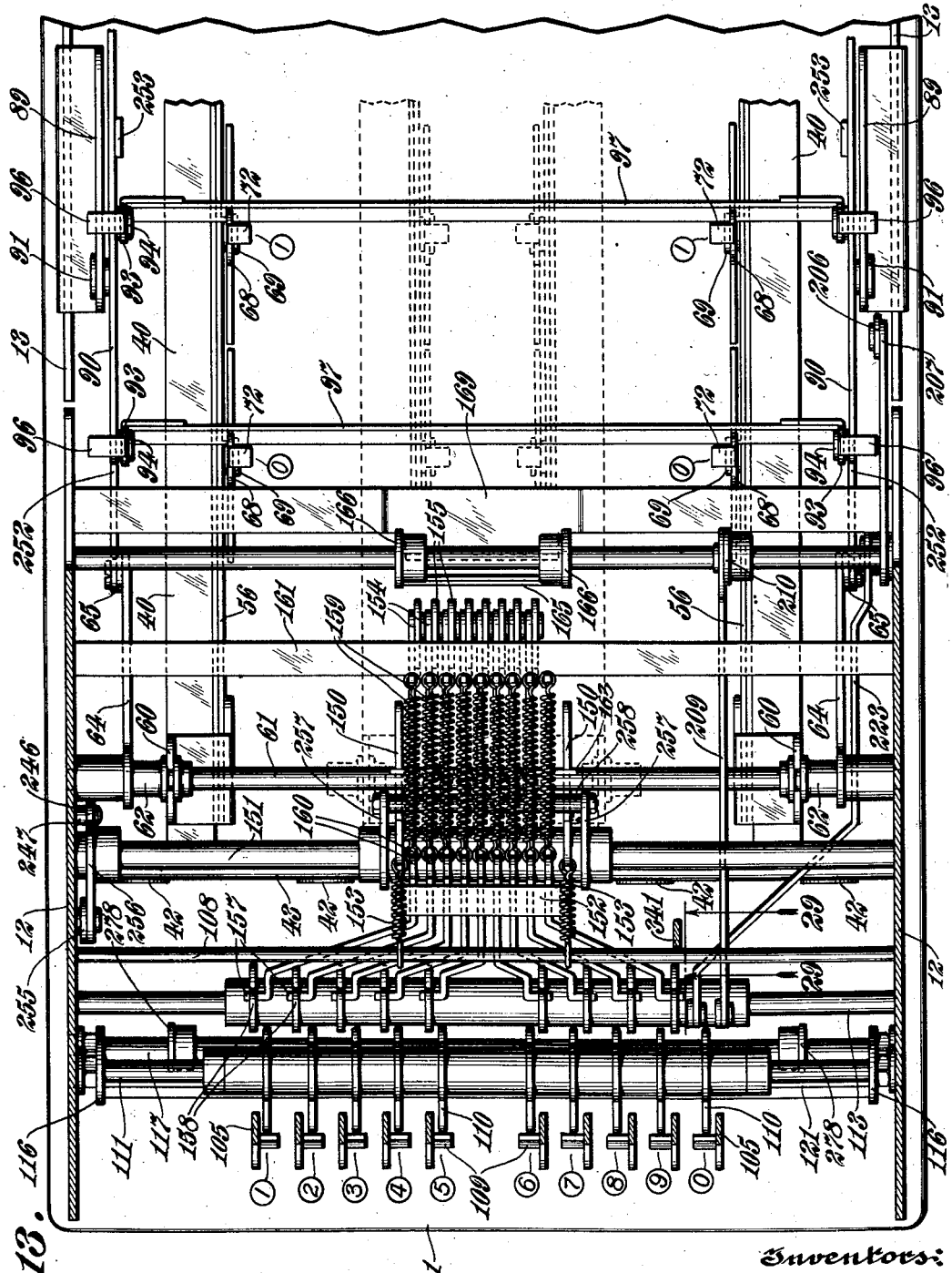

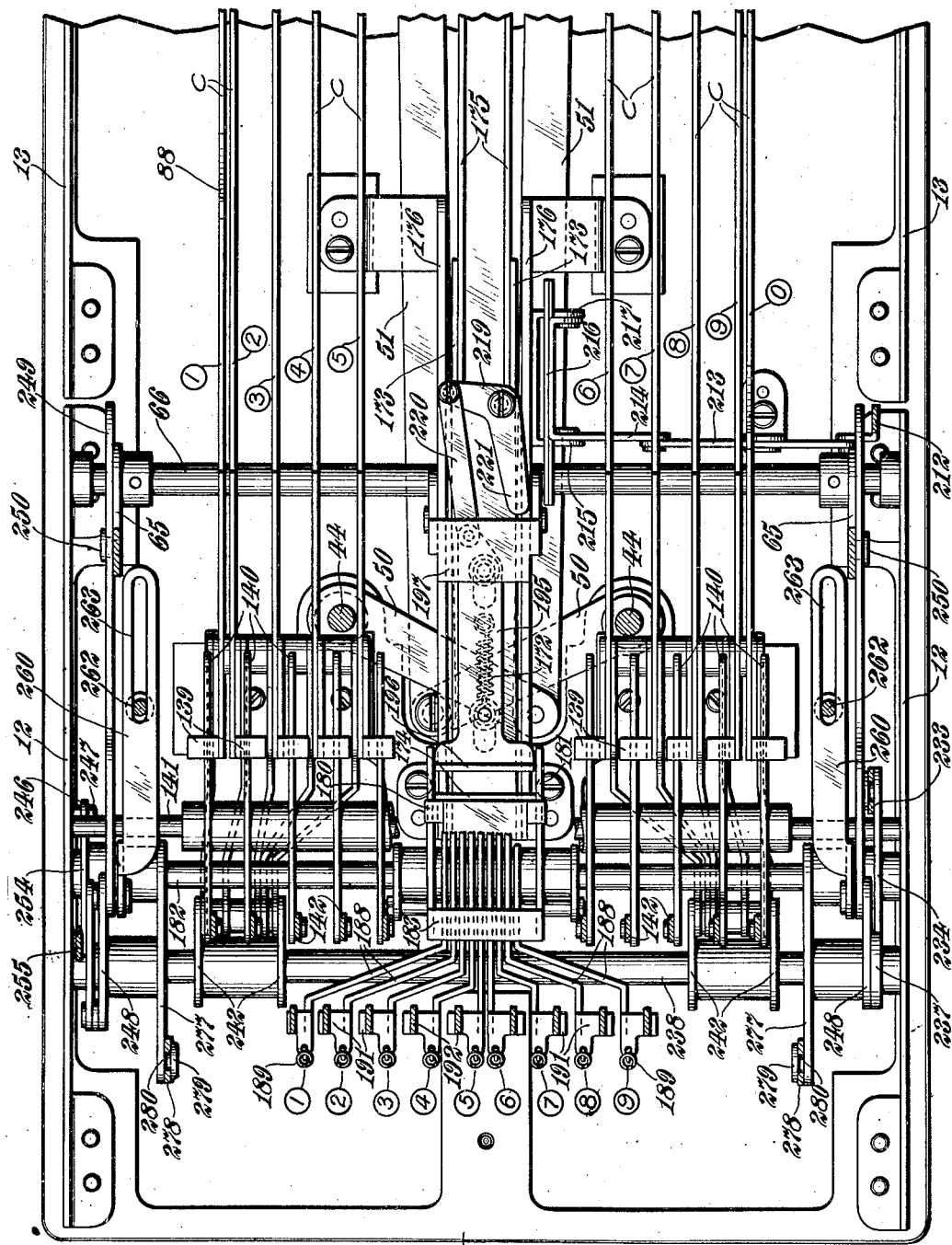

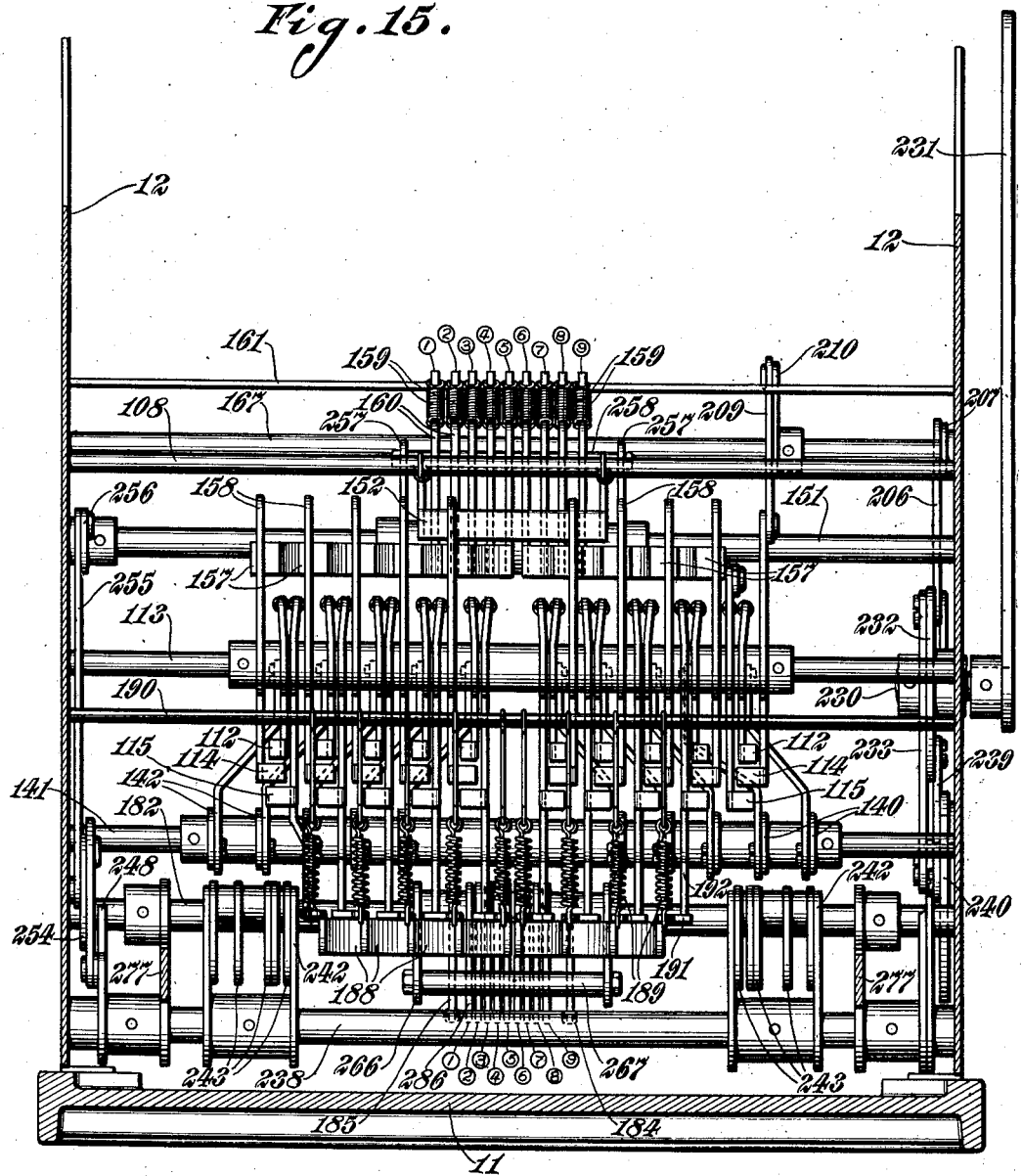

Nov. 19, 1929.                L. A. WATTERS ET AL                    1,736,334
                         ACCOUNTING APPARATUS AND METHOD
                            Filed April 22, 1918           19 Sheets-Sheet 12
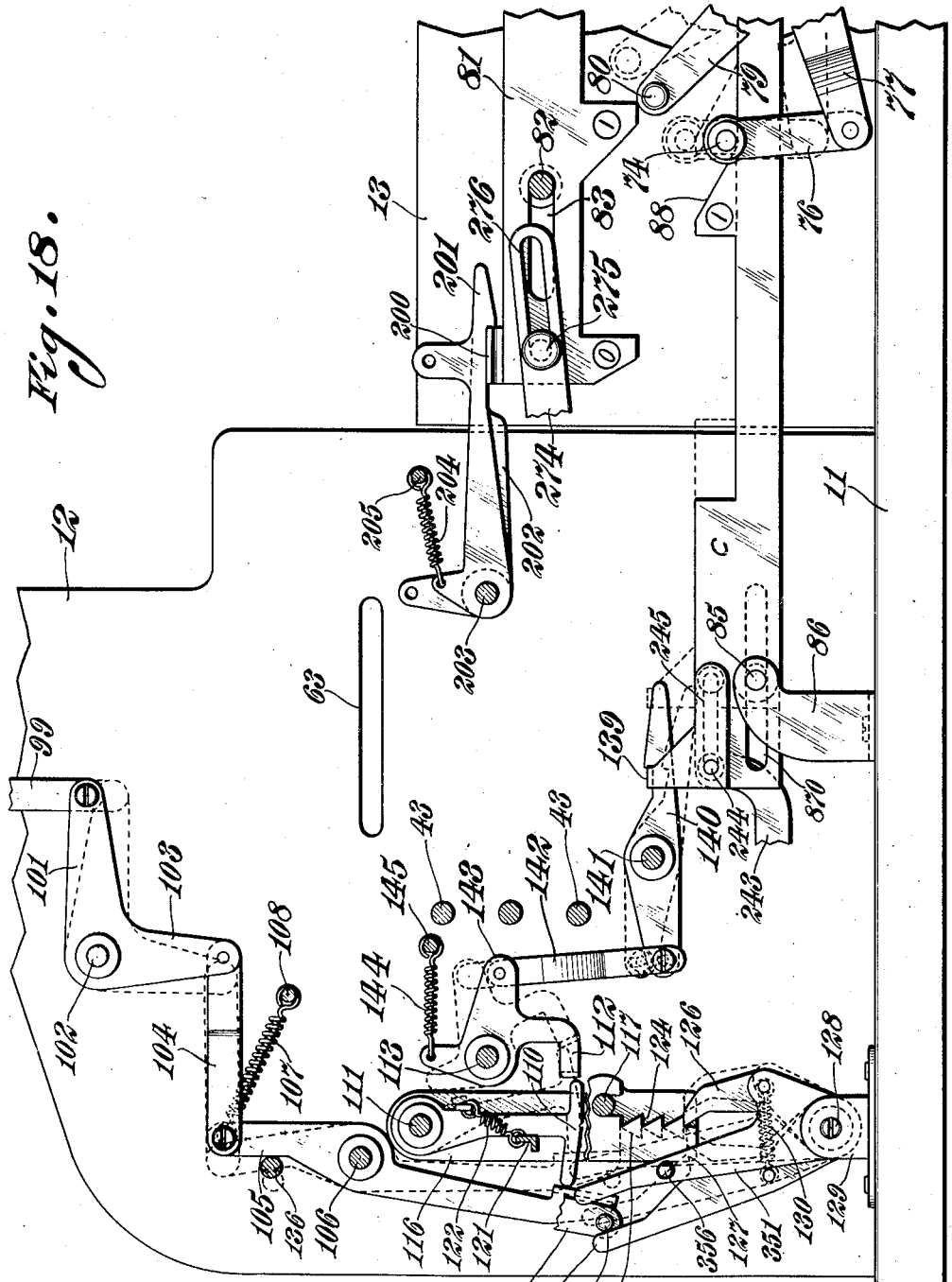
Inventors:
Luther A. Watters, and Samuel F. Lloyd,
By John K. Bruninga
Their Attorney.

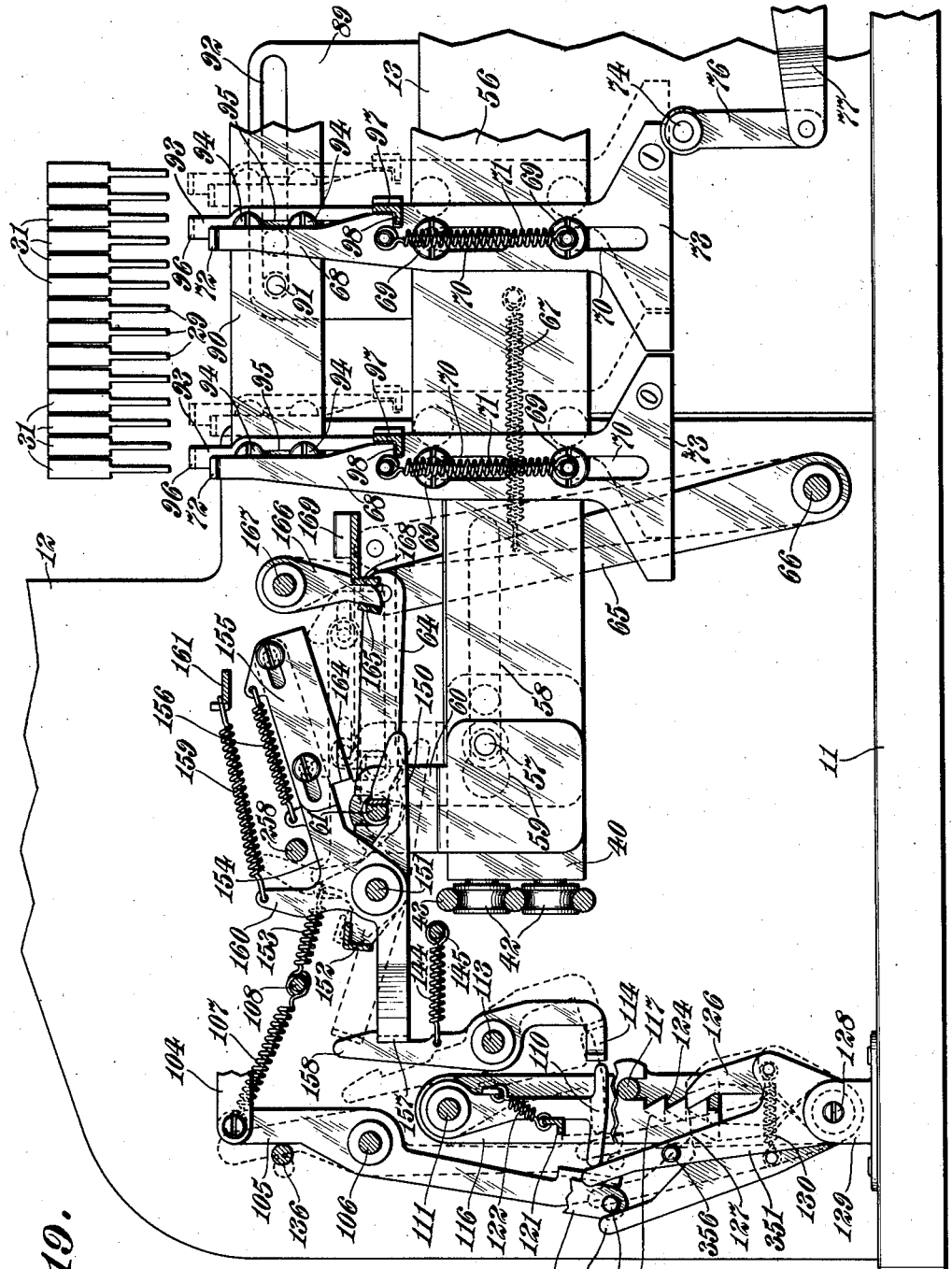

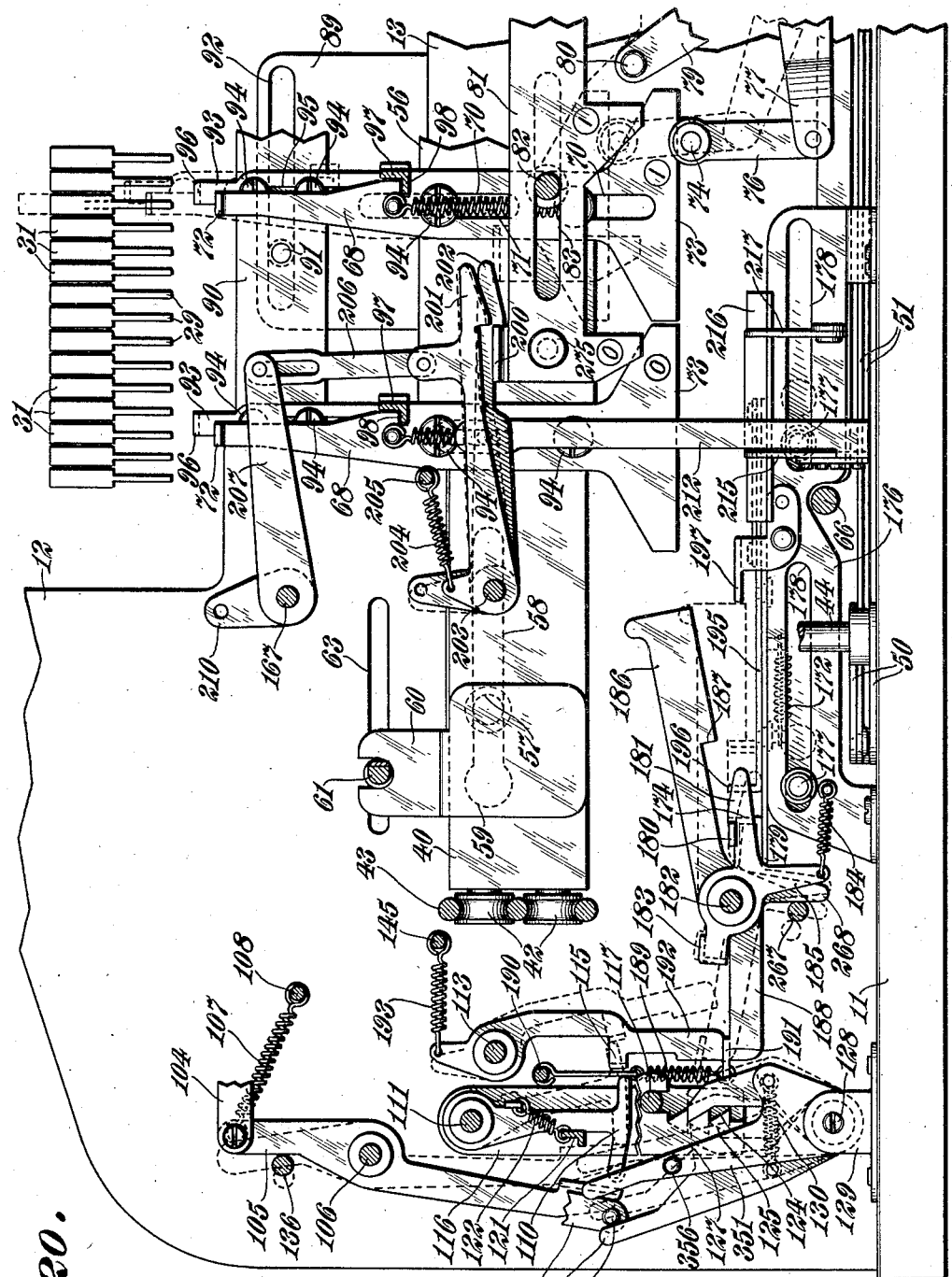

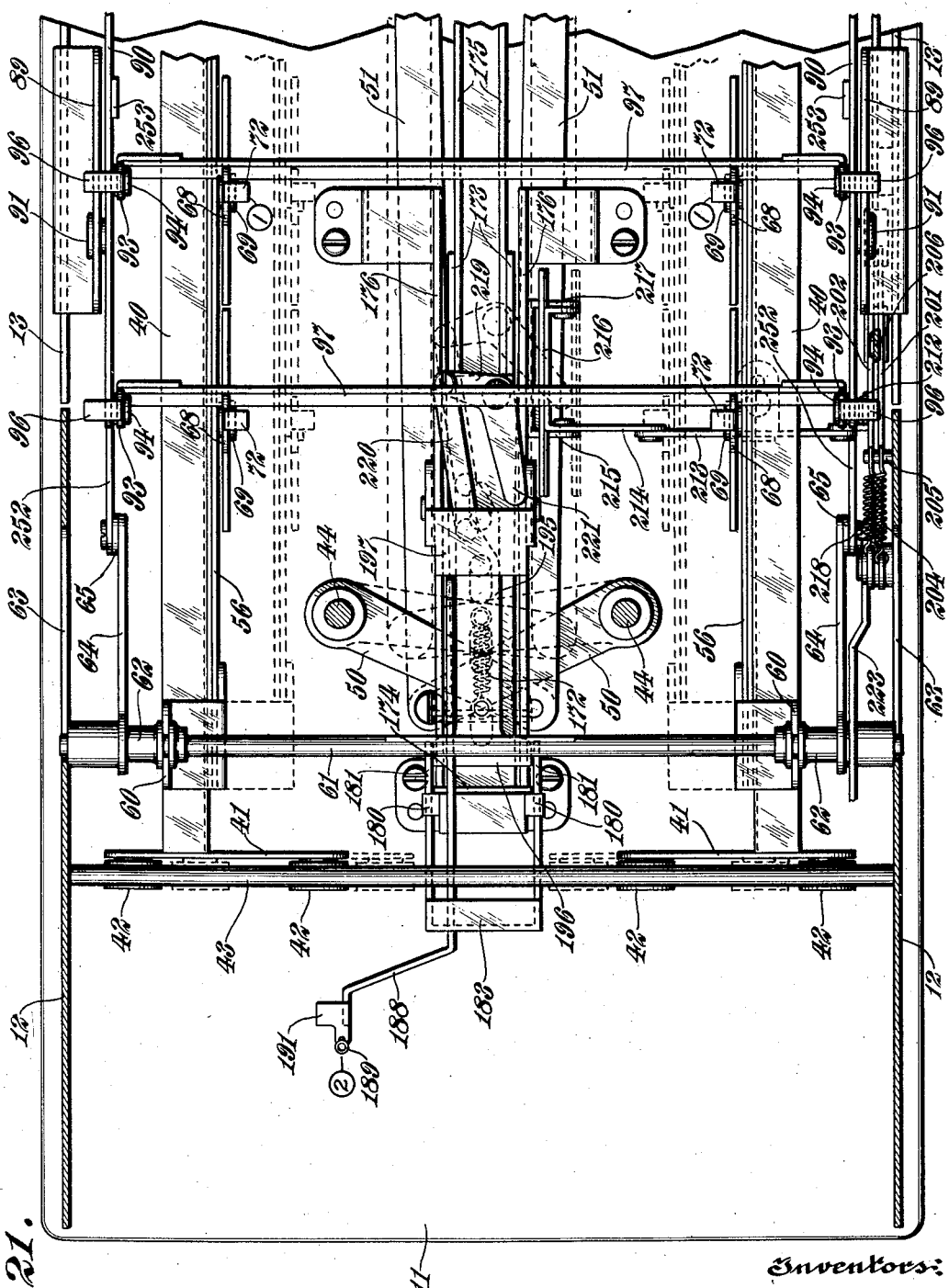

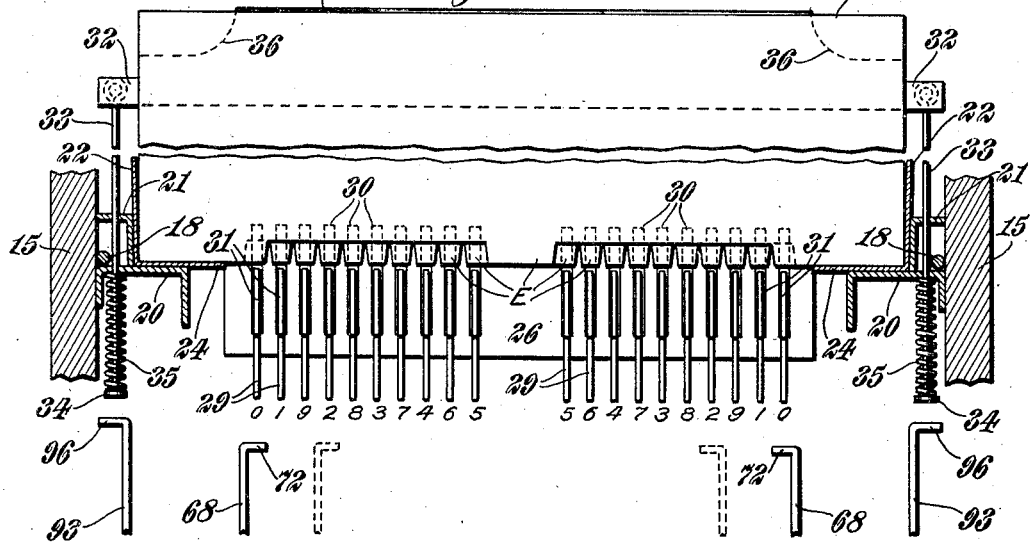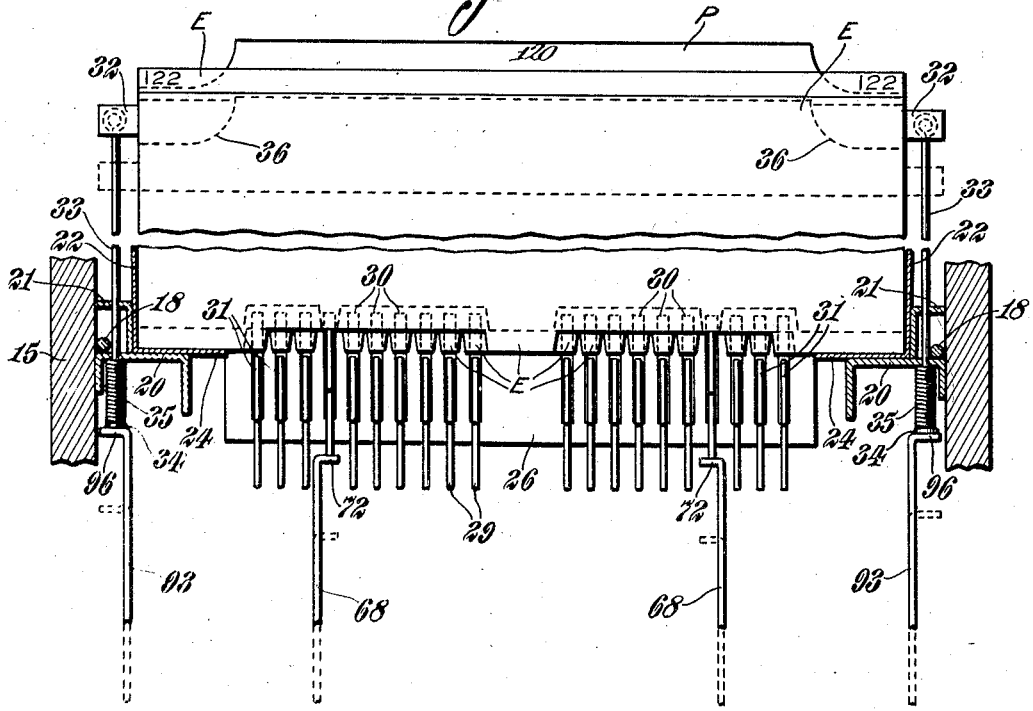

Nov. 19, 1929.  L. A. WATTERS ET AL  1,736,334
ACCOUNTING APPARATUS AND METHOD
Filed April 22, 1918   19 Sheets-Sheet 17
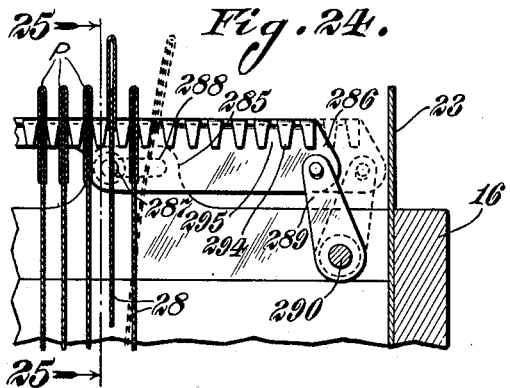
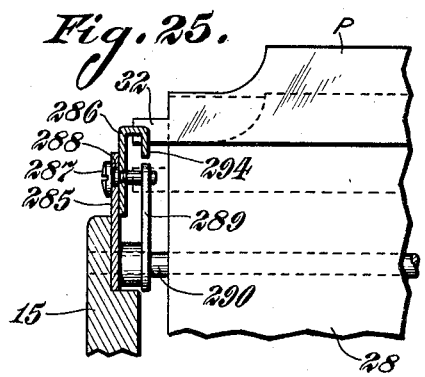
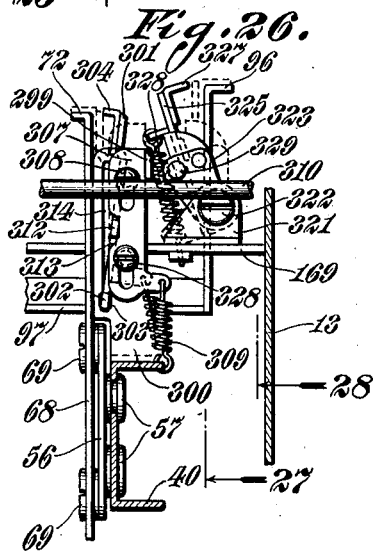
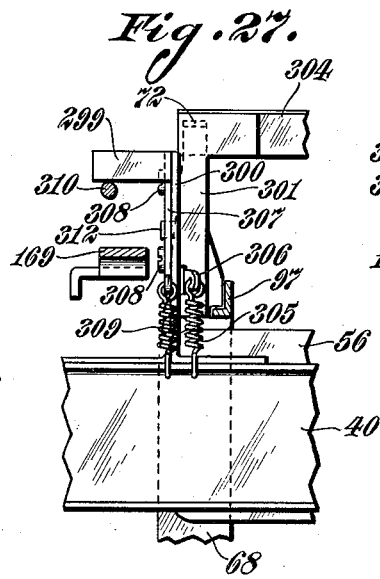
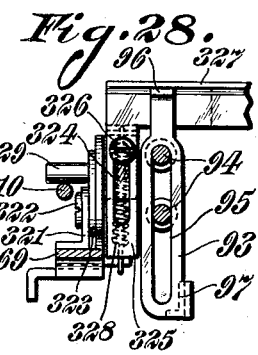
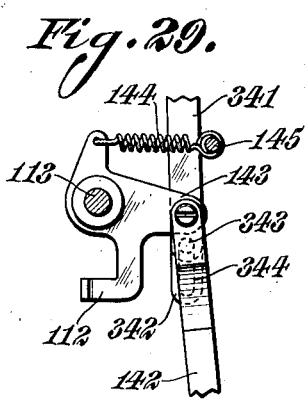
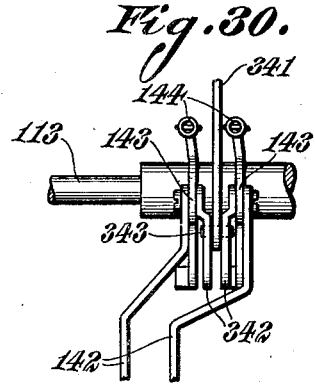
Inventors:
Luther A. Watters and Samuel F. Lloyd,
By John H. Bruninga
Their Attorney.

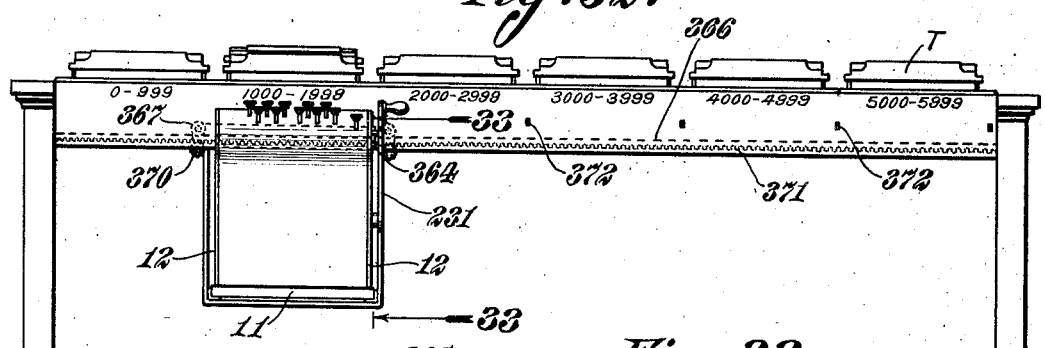
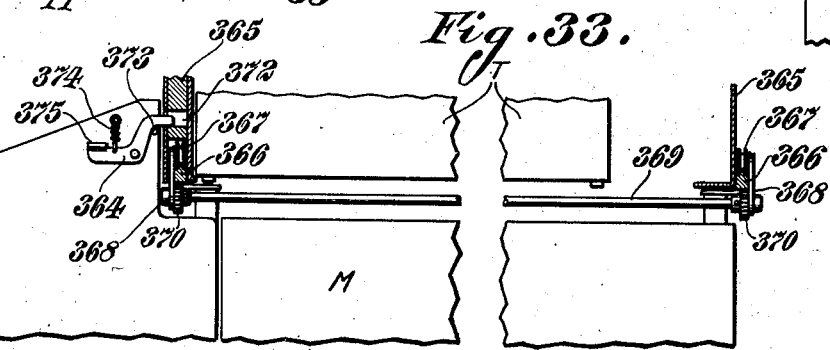
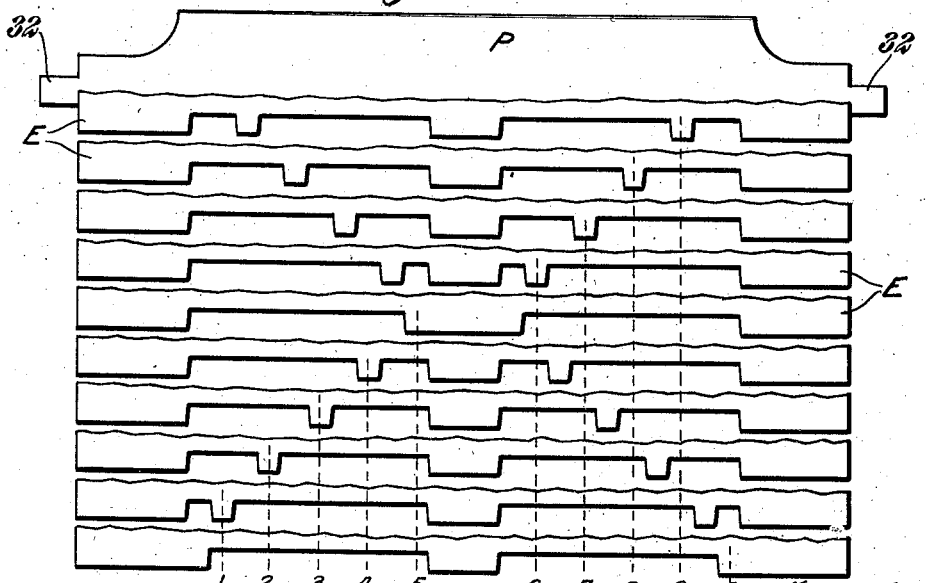

Nov. 19, 1929.　　　L. A. WATTERS ET AL　　　1,736,334
ACCOUNTING APPARATUS AND METHOD
Filed April 22, 1918　　　19 Sheets-Sheet 19
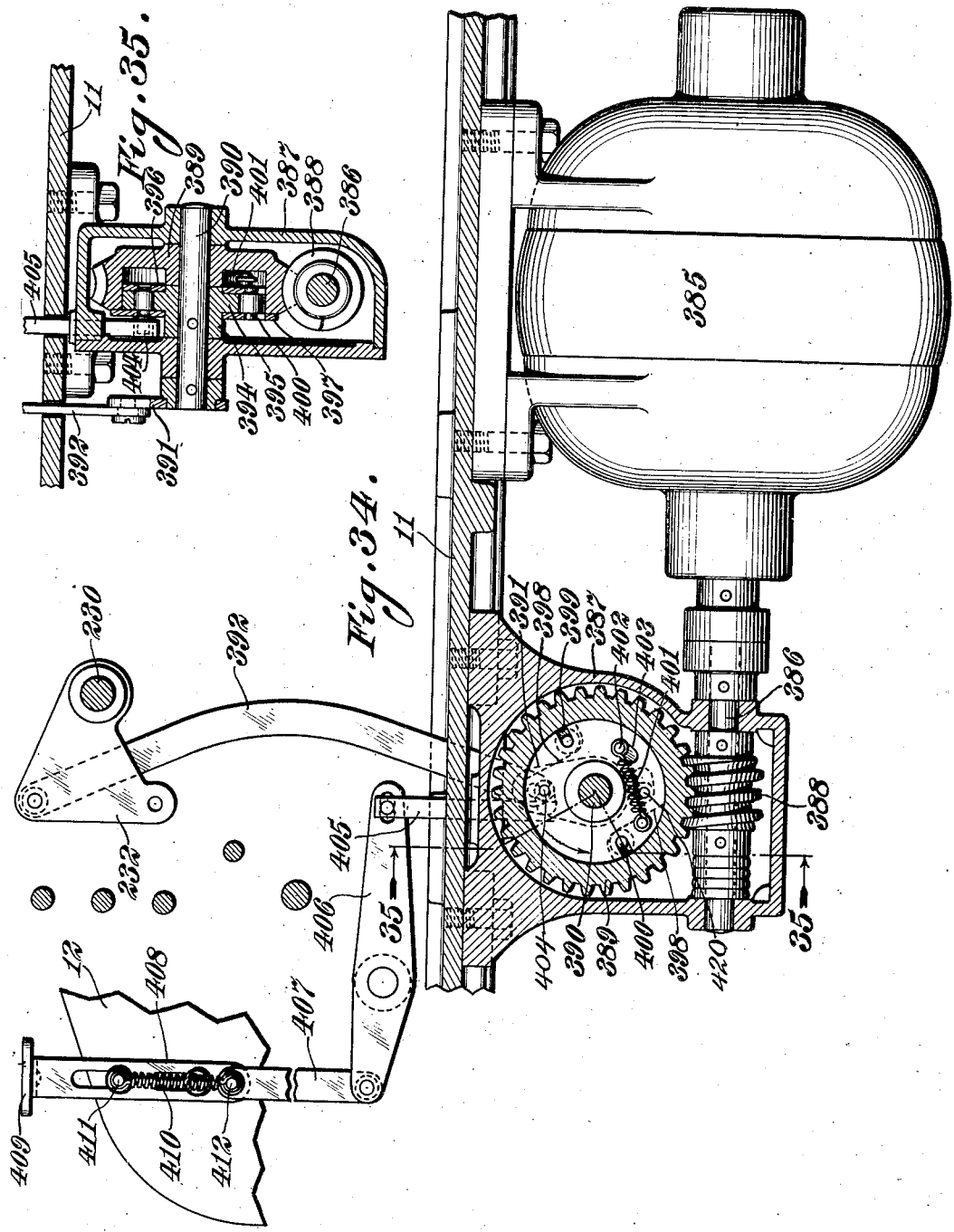
Inventors:
LUTHER A. WATTERS, AND SAMUEL F. LLOYD,
By
Their Attorney.

Patented Nov. 19, 1929

1,736,334

UNITED STATES PATENT OFFICE

LUTHER A. WATTERS AND SAMUEL F. LLOYD, OF EDWARDSVILLE, ILLINOIS, ASSIGN-ORS, BY MESNE ASSIGNMENTS, TO REMINGTON RAND INC., OF NEW YORK, N. Y., A CORPORATION OF DELAWARE

ACCOUNTING APPARATUS AND METHOD

Application filed April 22, 1918. Serial No. 229,996.

This invention relates to a method and apparatus for finding and auditing accounts.

In modern accounting systems, the accounts are kept on cards or sheets which are arranged in trays or ledgers. In order to facilitate finding of such accounts, these cards are arranged either alphabetically or numerically. In view of the fact, however, that the alphabetical system has only a limited application on account of the limited possible subdivisions, in the approved modern system, the numerical system, in which the cards are arranged in numerical order, and in which each card has a given number, is universally used. Where, however, there are a large number of accounts requiring a large number of cards, means must be provided to facilitate the finding of any particular account. Accordingly, there are provided pilot or index cards which locate and subdivide the accounting cards into groups and subdivisions of those groups, these pilot cards being usually provided with tabs which are arranged above the level of the accounting cards.

While the card system of accounting is a great improvement over the bound ledger system, in its present form it has many limitations on account of the manual operation required to find a given account. When it is desired to find a given account, the accountant must search through the different groups to find the group containing the account; he must then search through the subdivision of that group to find the subdivision containing the desired account; and he must then search through the cards of that subdivision to find the card containing the desired account. These operations not only require a good deal of time, but also require the handling and fingering of cards other than the desired card containing the account. Consequently, in view of the fact that a number of cards are always handled and fingered every time an account is to be found, the cards are subjected to unnecessary wear and soiling, therefore requiring frequent replacement of new cards with the attendant time required to copy the account or items on the replaced or renewed card.

When a card is to be returned, the accountant must again find the group and subdivision in order to replace the withdrawn account in its proper subdivision and group. This again not only requires considerable time, but also again subjects the other cards to handling and fingering, with the resultant waste of time and resultant wear. In such a manual system, the withdrawn card must also be placed in a definite unitary position in its subdivision, in order to facilitate the finding of the replaced card. This, of course, in itself, subjects all of the cards in a given subdivision to handling, with the attendant wear.

One of the objections to the loose leaf or card system is the possibility of an account becoming lost or misplaced, and this has somewhat retarded the adoption of this system, as distinguished from the bound ledger system, in which an account cannot, of course, be misplaced. In order to find a misplaced or lost account, it is frequently necessary to go over the entire system, involving a great deal of time, especially where the system contains thousands of accounts.

Where a card system is used, these cards cannot be packed closely, for the reason that sufficient space must be allowed to permit sufficient separation, in order that the card number may become readily visible during the search of the accountant in finding or replacing a card containing the desired account. Consequently, a tray of given dimensions cannot be filled to its limit, as would be the case if the cards could be closely packed; the space efficiency of the present manual card system, therefore, is rather low; this is an important item where the system contains thousands of accounts, and where space is, as is usually the case, an important item.

One of the objects of this invention therefore, is to provide a method of and apparatus for finding accounts which will overcome the objectionable features inherent to the present manual system.

In accordance with this invention, therefore, the present method comprises, generally stated, a series of successive steps of locating a group of accounting elements containing the account, locating in the located group the subdivision or unit containing the account, locating in the located subdivision or unit the accounting element containing the account, and isolating the located accounting element; these steps being carried out without handling of any cards or accounting elements, except the one to be found and isolated, and therefore entirely eliminating the fingering of all other cards or accounting elements.

In accordance with this invention, a series of pilot cards, one for each subdivision or unit, is utilized, and in accordance with this method the accountant proceeds to find an account in the following manner and by the following successive steps:—viz: locating a group of accounting elements containing the account, and the pilot elements of that group, locating in the located group the subdivision or unit thereof containing the account and the pilot element of that subdivision or unit, locating in the located subdivision or unit the accounting element containing the account, and isolating the located pilot and accounting elements; these successive steps being carried out without the handling of any accounting or pilot element, except the pilot element of the subdivision containing the desired account, and of the desired accounting element in that subdivision.

In accordance with this invention the withdrawn accounting element is replaced, by proceeding to find the subdivision or unit which should contain the account, in the same manner as if the element were in place; this will, of course, locate the subdivision or unit by the isolation of its pilot element, and the withdrawn accounting element can, therefore be replaced in this isolated subdivision or unit; in accordance with this invention, however, it is not necessary, as will hereinafter more fully appear, to replace the withdrawn accounting element in a given position in its subdivision or unit, but it can be placed in any position in that subdivision or unit.

Another object is to provide a method for auditing accounts, whereby a lost or misplaced card or accounting element can be readily found, and its replacement in its proper position in the system facilitated.

In accordance with this invention, therefore, the system is audited in accordance with and comprising the following successive steps, viz: locating in each unit or subdivision corresponding accounting elements, and isolating the located accounting elements; the pilot elements of the located units or subdivisions are also isolated to isolate these units; in this manner a misplaced accounting element will not only be found and its replacement in its proper subdivision or unit facilitated, but the accountant is apprised of the fact that an accounting element is missing, and its replacement or renewal can thereby be facilitated.

Another object is to provide an accounting apparatus or machine which will operate mechanically to find the desired account, the operations being entirely automatic, the accountant being only required to manipulate keys, or other suitable means, corresponding to the designation or denomination of the accounting element or card containing the account.

In accordance with this invention, therefore, the machine employs selectors or means for selecting accounting elements, together with controlling means comprising keys or the like, adapted for locating an individual element among a group of these elements, and adapted to isolate the located element. The mechanism operates by a series of eliminations of groups, subdivisions and elements, to first locate the group containing the desired accounting element, then a subdivision or unit of that group, and then an element of that subdivision or unit. Accordingly, the selector means is first located with respect to a group of assembled elements, then with respect to a selected subdivision or unit of that group, and then with respect to a selected element of that subdivision or unit, in order to locate the desired accounting element; the located element is then isolated.

Another object is to provide an accounting apparatus or machine employing pilot elements or cards, separating the accounting elements or cards, which will find the pilot element for the desired account, and isolate this pilot element in such a manner as to facilitate replacement, as well as finding, of a given account.

In accordance with this invention, therefore, a series of pilot elements are provided, each corresponding to a unit or subdivision of accounting elements. The selecting and controlling means operate to find the desired pilot element in the same manner as, and preferably concurrently with, the finding of the accounting element, also by a series of eliminations. Accordingly, these selecting and controlling means operate to locate a group of these pilot elements corresponding to a group of accounting elements, and then a pilot element in that group corresponding to a subdivision or unit of accounting elements, and this pilot element is then isolated to isolate the selected subdivision or unit; the accounting element of that subdivision or unit is located and isolated to permit its withdrawal. In this way the pilot element will isolate the subdivision or unit from which the desired accounting element is to be or is withdrawn, and in that manner facilitates the withdrawal and replacement of a given accounting element.

Another object of this invention is to provide an accounting apparatus or machine by means of which the accounts may readily be audited to locate a misplaced or missing account or accounts.

In accordance with this invention the selecting and controlling means are susceptible of operation to isolate the units or subdivisions of accounting and pilot elements, and a corresponding element in each unit is then isolated. If now an account is missing, its absence in a unit or subdivision will be noted; while if an account is misplaced it can readily be found by the fact that two accounting elements will be shown in isolated positions in a single unit or subdivision. Accordingly, a misplaced or missing account can be readily replaced or renewed.

Another object of this invention is to provide an accounting apparatus or machine in which the isolated subdivision or unit, or the pilot element for that subdivision or unit, is left isolated after the accounting element has been located or withdrawn, in order to facilitate the replacement of the withdrawn accounting element.

In accordance with this invention, therefore, the selecting and controlling means is so constructed and operated that the selecting means is set by means of the controlling keys or the like, and the located subdivision or unit and its pilot element are isolated upon such setting; while the machine is cleared, upon operation of a handle or the like, so as to restore the selecting means, and therefore, the isolated subdivision or unit and its pilot element. In this way the subdivision or unit and its pilot element can remain isolated until the withdrawn accounting element can be returned.

In accordance with this invention the accounting elements or cards can be closely packed or stacked, thereby resulting in maximum space efficiency. This, however, under ordinary conditions would render the withdrawal or replacement of an accounting element rather difficult or inconvenient.

Another object of this invention, therefore, is to provide an accounting apparatus or machine, employing a series of closely packed accounting elements or cards, provided with means adapted to unpack a selected unit or subdivision of accounting elements chosen by the selecting means.

In accordance with this invention, mechanism is provided which is rendered operative upon selection and isolation of a chosen unit or subdivision of accounting elements, to unpack that unit or subdivision so as to permit the chosen accounting element to be readily withdrawn or replaced.

In some establishments the accounts aggregate many thousands, and frequently hundreds of thousands in number. Where these accounts are arranged in trays, it is impractical to place more than a limited number of accounting elements in a single tray; accordingly it is necessary to utilize a series of trays.

Another object of this invention, therefore, is to provide an accounting apparatus or machine employing a series of trays, which is provided with account finding, replacing and auditing mechanisms, as heretofore referred to, and which is adapted to cooperate with any of these trays, and with the accounting elements therein.

In accordance with this invention, therefore, the accounting elements are arranged in a series of trays, and the selecting and controlling mechanism is mounted on a movable carrier adapted to be shifted from tray to tray, and adapted to be positioned in cooperative relation with the selected tray, to permit the mechanism on the carrier to cooperate with the accounting elements in the tray. Accordingly, each tray is provided with a suitable number of accounting elements or cards, say one thousand in number, and since the units, tens and hundreds in the different trays will be arranged in the same relative positions, the selecting mechanism is adapted to cooperate with corresponding groups, subdivisions and elements in these trays.

Another object of this invention is to provide an accounting apparatus or machine in which the accounting elements or cards, together with their pilot elements, are arranged in fixed relation in the tray, and with respect to the selecting mechanism, in order to insure proper cooperative relation of said selecting mechanism with said accounting and pilot elements.

In accordance with this invention, therefore, the accounting elements are arranged in fixed units or subdivisions arranged in fixed spaced relation along the tray. This is accomplished by the employment of partitions separating the accounting elements into subdivisions or units, and by the employment of pilot elements, one for each subdivision or unit. The accounting elements of each subdivision can, therefore, be arranged and placed loosely in the spaces or compartments provided by the partitions, so as to always be in proper cooperative relation with respect to the selecting means.

Another object is to provide an accounting element which is adapted for operation by the selecting means, which is so constructed and arranged as to permit the same to be readily shifted without binding, and which is reversible so as to permit accounts to be kept on both sides.

Another object is to provide a set of accounting elements which are simple in construction, and which, while adaptable to be used in a series of great number, are so constructed that the variations in kinds of accounting elements are reduced to a minimum.

In accordance with this invention, the accounting element or card is provided with selector engaging portions arranged in a pair along the card, so as to be adapted for concurrent engagement by a pair of like selectors. These selector engaging portions are symmetrically arranged, the portions on the elements being of the same ground of classification and corresponding to a single item. On account of the symmetrical arrangement of the selector engaging portions, the card can be reversed, but when reversed will be maintained in proper cooperative relation with the selecting means.

In accordance with this invention the accounting elements of a unit or subdivision are provided with variant selector engaging portions, that is, the selector engaging portions on one card vary in position with respect to the selector engaging portions on the other cards, so as to insure individual selection of a selected element by its corresponding selector. The accounting elements of one unit or subdivision, however, correspond to the accounting elements of the other units or subdivisions, in the arrangement of the selector engaging portions. Consequently, where a unit or subdivision comprises a series of ten cards, the number of different cards in a system will not exceed ten, irrespective of what may be the aggregate of the cards in the system. This will, of course, cheapen the manufacture of these cards, since it is only necessary to provide for ten different dies or other forming means for producing these cards. The pilot elements, while also provided with selector engaging portions, are invariable and identical, so that only a single forming die or means is necessary for the production of such a pilot element. In view of the fact that both the pilot element and the accounting element are provided with a pair of selector engaging portions arranged symmetrically, these elements are moved by engagements therewith at spaced points, so that tipping and binding of the element are avoided.

Further objects will appear from the detail description taken in connection with the accompanying drawings, in which, Figure 1 is a plan of an accounting machine embodying this invention;

Figure 2 is a side elevation, showing in dotted lines the mechanism for auditing the accounts;

Figure 3 is a section on the line 3—3, Figure 2, showing the selector carriage and the mechanism for moving the selectors transversely of the carriage, the other mechanism being omitted;

Figure 4 is a view similar to Figure 2, but with the encasing sides of the frame removed, and showing the carriage, together with the controlling mechanism for shifting the carriage and for raising the selectors on the carriage, all other parts being omitted;

Figure 5 is a section on the line 5—5, Figure 4, showing the mechanism for shifting the selectors transversely of the carriage, and the mechanism for rendering a pair of selectors operative, all other mechanisms being omitted;

Figure 6 is a section on the line 6—6, Figure 5, showing the parts illustrated in Figure 5, as well as the key operated controlling mechanism;

Figure 7 is an enlarged elevation of the front end of the machine, showing the keys and the mechanism operated thereby, together with the transmitting carriage, parts of the mechanism being omitted;

Figure 11 is a section on the line 11—11, Figure 8, showing more particularly the mechanism for shifting the transmitting carriage to its different positions, the mechanism for shifting the selectors transversely of the carriage, the mechanism for raising the selectors on the carriage, the key operated mechanism for the "0" position, and of parts of the mechanism for clearing the machine;

Figure 12 is a detail section on the line 12—12, Figure 11, showing the stops for arresting the selectors in their transverse movements;

Figure 13 is a section on the line 13—13, Figure 9, showing the mechanism for arresting the carriage in its longitudinal movement;

Figure 14 is a section on the line 14—14, Figure 11, showing the operative bars, together with their latches, and the mechanism for shifting the selectors transversely of the carriage;

Figure 15 is a section on the line 15—15, Figure 11, showing the controlling mechanism operated by the keys;

Figure 18 is a detail of the mechanism for rendering a pair of selectors operative in order to locate a group of elements:

Figure 19 is a similar view, but showing the mechanism for positioning the carriage to locate a subdivision of the selected group of elements;

Figure 20 is a similar view showing the mechanism for positioning the selectors to locate a selected accounting element, and for isolating the selected pilot and accounting elements;

Figure 21 is a plan of Figure 20;

Figure 22 is a diagrammatic front elevation of the accounting and pilot elements and the selectors therefor, corresponding to the positions indicated in Figures 19 and 20;

Figure 23 is a view similar to Figure 22, but showing the parts in the positions indicated in full and dotted lines in Figure 20;

Figure 24 is a detail side elevation of Figure 16, showing the mechanism for unpacking the accounting elements;

Figure 25 is a section on the line 25—25, Figure 24;

Figure 26 is a detail section on the line 26—26, Figure 8, showing more fully the mechanism for rendering the machine operative for auditing the accounts;

Figure 27 is a section on the line 27—27, Figure 26;

Figure 28 is a section on the line 28—28, Figure 26;

Figure 29 is a detail section on the line 29—29, Figure 13; showing the auditing mechanism;

Figure 30 is a side elevation of Figure 29;

Figure 31 is a detail showing the accounting and pilot elements;

Figure 32 is a front elevation of an accounting system comprising a number of trays;

Figure 33 is an enlarged section on the line 33—33, Figure 32;

Figure 34 is a side elevation partly in section showing motor driven mechanism for operating the machine; and, Figure 35 is a section on the line 35—35, Figure 34.

Figure 8:
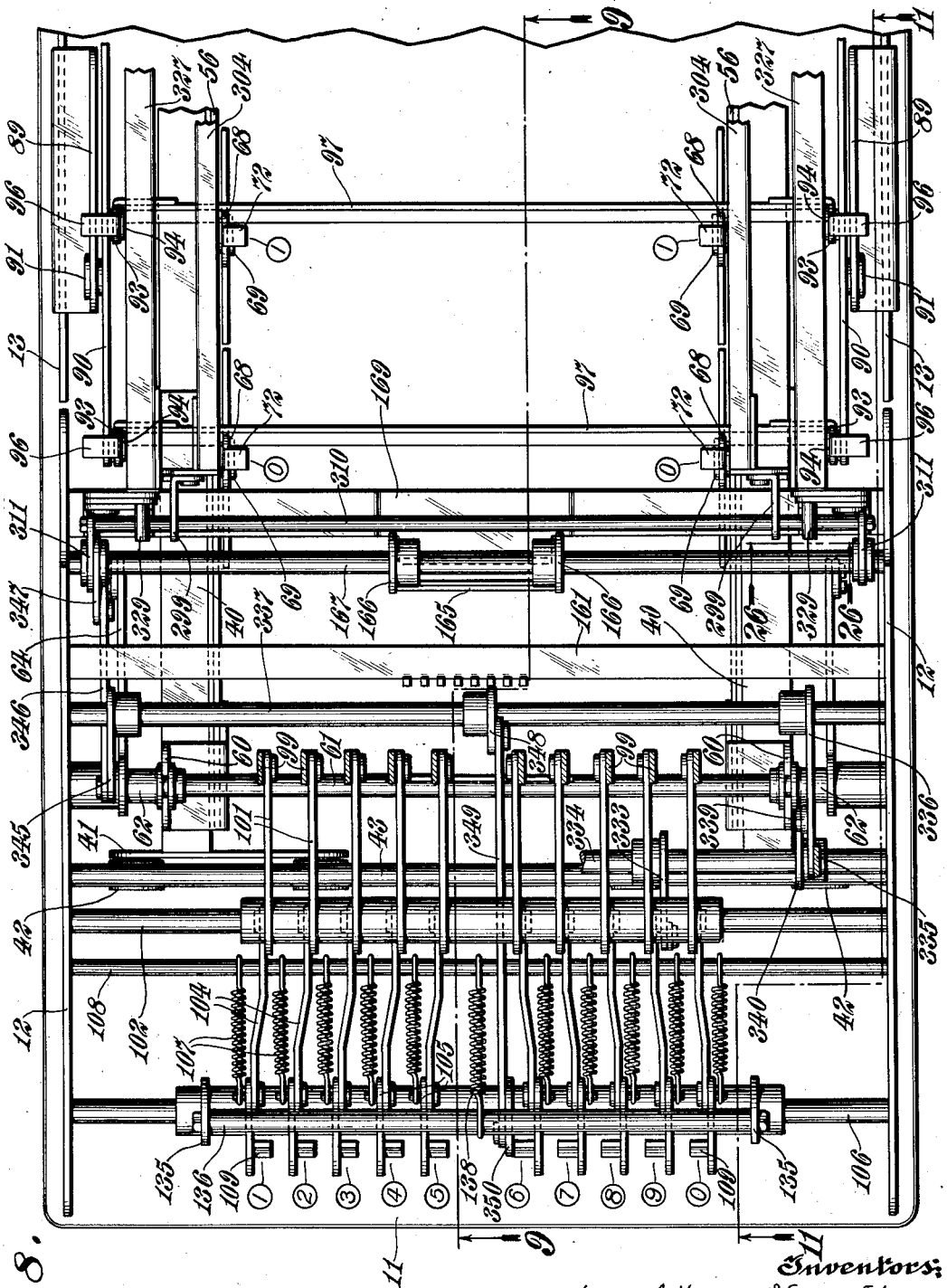
Figure 8 is a section on the line 8—8, Figure 7, showing also the selector carriage.

It will be noted that in many of the views of the drawings parts have been omitted; this has been done for the purpose of promoting clearness, in view of the fact that if all of the mechanisms behind the plane at which a view is taken were shown, the mechanism, in addition to that on which stress is laid in a particular view, would obscure the particular mechanism under consideration.

The frame or body

Referring to the accompanying drawings, and more particularly Figures 1 to 7 inclusive, the frame of the machine comprises a base 11 which may be of cast metal, and to this base are fixed a pair of side plates or standards 12 of sheet metal, and a pair of side plates 13 also of sheet metal, these plates being connected by cross-pieces to form a braced skeleton structure, and these plates forming the standards or supports in which the cross-shafts and studs carrying the operating mechanism are mounted. The side plates may be faced with panels 14 of wood or any other suitable material, as shown more particularly in Figure 1, this being more a matter of design than construction. There is thus formed a main supporting frame which carries all of the operative parts of the mechanism.

Mounted on the main supporting frame is a tray support or frame for the tray which carries the accounting elements or cards. This tray support comprises a pair of sides 15 of wood or any other suitable material, and ends 16, the whole being secured together to form a suitable frame or support. This tray support comprises a pair of sides frame and inside of the panels 14, as more clearly shown in Figure 16, the said panels 14 being formed as shown, to provide supporting ledges 19 for the sides of the tray. In order to support the tray against longitudinal movement with respect to the main frame, the side panels 14 may be provided with positioning blocks or lugs 17 engaging the ends of the tray. In this manner the tray is accurately positioned and supported in the main frame, to accurately position and maintain the accounting elements or cards and their plungers in correct cooperative relation with respect to the selecting means supported in the main frame, as hereinafter described. It will, of course, be understood that the tray may be of metal and may be supported directly from the metal side members of the main frame. In order to brace the tray support, the ends 16 may be connected by tension rods 18, as shown more particularly in Figure 16.

The accounting and pilot elements and their supporting tray

Referring now to Figures 1, 2, 9, 16, 22, 23 and 31, the sides 15 of the tray support have attached to the inside faces thereof, brackets 20 which extend therealong and are of channel form, and attached also to these sides and to the brackets 20, are positioning members 21 which are of L-section. Mounted on the brackets 20 and positioned between the side members 21, is a tray for receiving the accounting and pilot elements. This tray is preferably constructed of sheet metal and comprises sides 22 and ends 23, the front end being supported and lying against the front end 16 of the tray support. These sides extend inwardly at the bottom, as shown at 24, so as to form supporting ledges for the accounting elements, as hereinafter described. The sides 22 flare outwardly, as shown more clearly in Figures 16, 22 and 23, so as to permit ready insertion of the cards or accounting elements, as hereinafter described.

Figure 9:
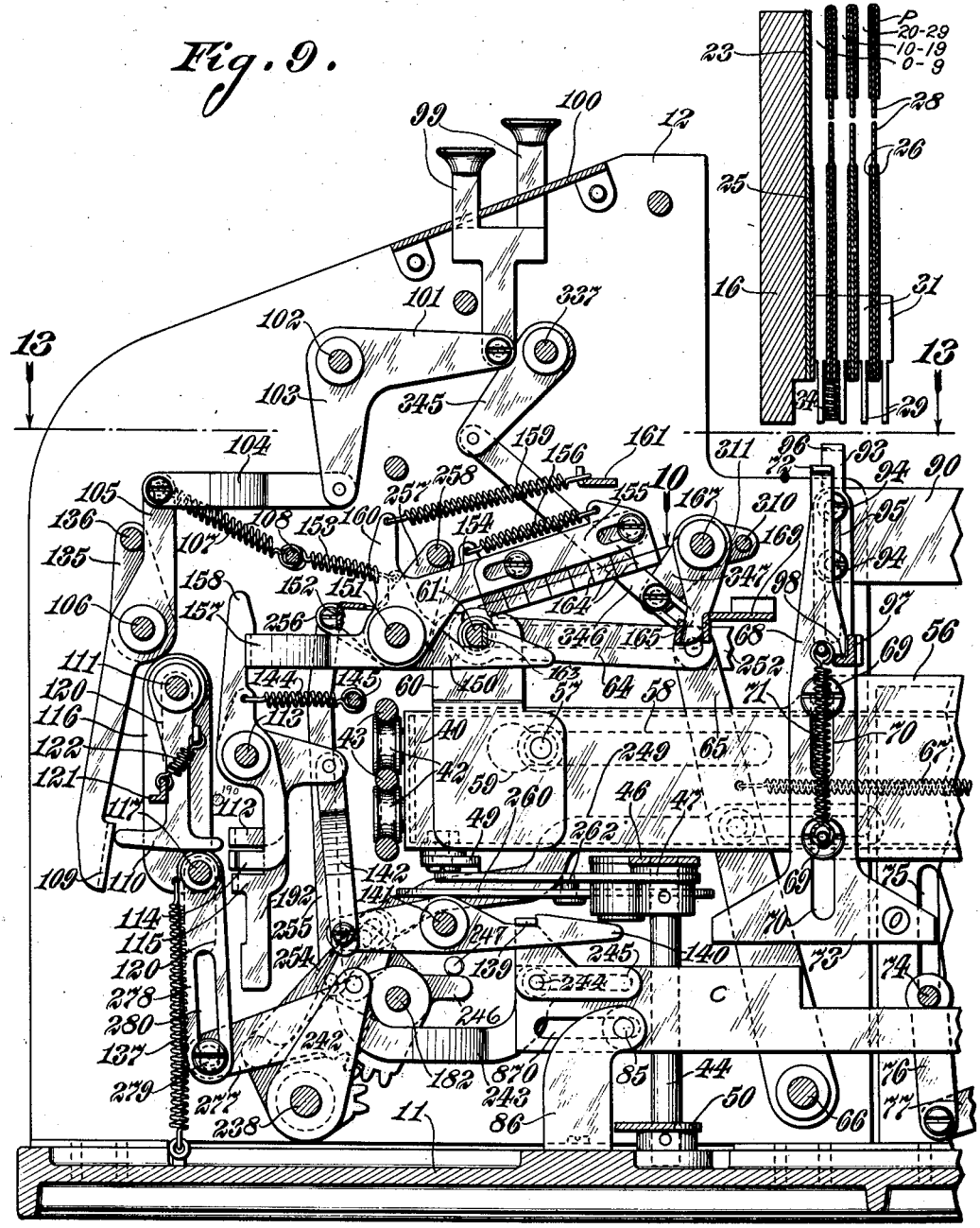
Figure 9 is a section on the line 9—9, Figure 8, showing more particularly mechanism for rendering a pair of selectors operative, the mechanism for releasing and arresting the selector carriage, the key operated mechanism, and parts of the mechanism for returning the different elements to clear the machine.
Figures 16, 17:
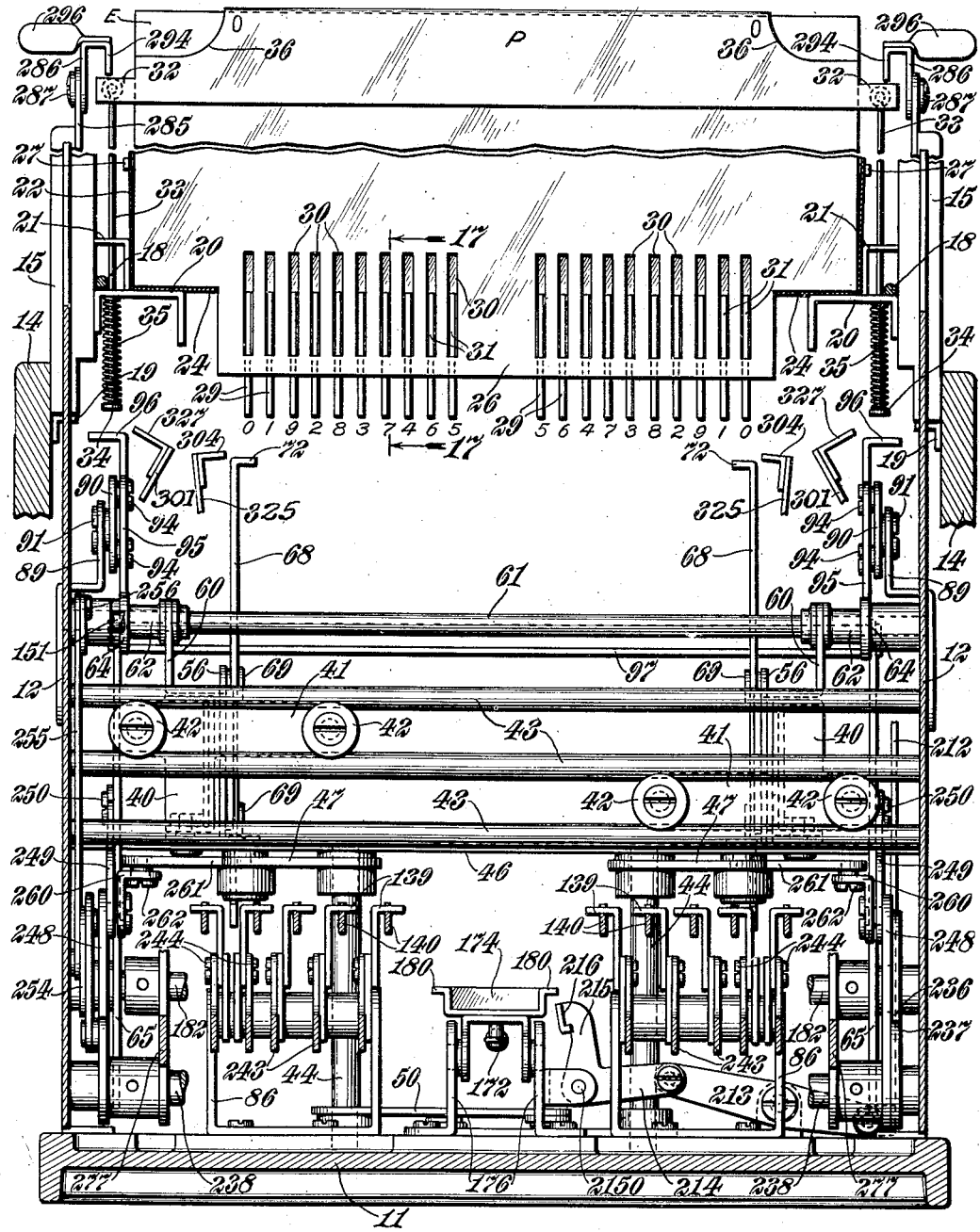
Figure 16 is a section on the line 16—16, Figure 11, showing more particularly the mechanism for auditing the accounts, the plungers for operating the accounting elements, and the mechanism for unpacking the accounting elements.
Figure 17 is a detail section on the line 17—17, Figure 16, showing the construction and mounting of the plungers.

The ends 23 of the tray are provided with guide plates 25, as shown in Figures 9 and 16, while a series of guide plates 26 are arranged transversely of the tray in spaced relation, and pairs of these guide plates separate or divide the tray into a series of spaces or compartments for units of cards, as hereinafter described. The guide plates 25 and 26 are provided with ears 27, which enter apertures in the sides 22 of the tray to retain these guide plates in position. Arranged between each pair of guide plates 26 is a flexible partition 28 of sheet metal, which is positioned and retained by a pair of guide plates 26. The width of these partitions 28 is equal to the width of the inside of the tray at the bottom, so that these partitions are firmly supported laterally in the tray. The partitions 28 are also preferably provided with ears 27 entering the same apertures in the sides 22 as the ears on the guide plates 26.

Arranged between each adjacent pair of guide plates 25 and 26, are a series of plungers 29, as shown in Figures 9, 16 and 17, and to guide and retain these plungers in position, these guide plates are provided with elongated vertical slots 30, adapted to receive the laterally extending wings 31 on the plungers. In this way the plungers are supported and guided for limited vertical movement, the downward movement of these plungers being limited by engagement of the shoulders formed on the plungers with the bottoms of the slots 30. These plungers, therefore, normally project beyond the bottom of the guide plates 25 and 26. The top faces of the plungers are arranged in a horizontal plane slightly below the bottom of the tray, as shown in Figure 16.

In this embodiment of the invention, a tray is adapted to receive one thousand (1000) cards in one hundred (100) subdivisions or units of ten (10) cards each. Accordingly, there are provided one hundred (100) partitions 28 which, together with the front end 23 of the tray, divide the tray into one hundred (100) compartments, each of which has sides formed by the partitions, arranged in fixed relation with respect to the tray. Each one of these compartments is adapted to receive a unit of ten (10) cards E, Figure 17, and arranged in the bottom of each compartment are a series of twenty (20) plungers arranged in ten (10) pairs, the plungers of a pair being arranged symmetrically with respect to the center of the compartment. A pair of these plungers are arranged to be operated in unison to isolate the card or accounting element in a manner and for a purpose hereinafter to be described.

Referring now to Figures 22, 23 and 31, the accounting element or card E is shown of the width equal to the width of the tray at the bottom thereof, and this card may be formed of paper or any other suitable material. A series or unit of ten of these cards are arranged in a compartment, and each card is provided with plunger or selector engaging portions or selector coactable characteristics corresponding to its pair of plungers. These selector engaging portions are indicated in Figure 31 by the reference numerals "0" to "9" inclusive, and constitute projecting lugs formed by cutting the bottom of the card. It will be noted that these selector engaging portions or characteristics are arranged in pairs, the portions or characteristics of a pair being arranged symmetrically on opposite sides of the center line of the card. The selector engaging portions or characteristics on a set or unit of ten cards are spaced variably along the bottom of the card, so that the selector engaging portions or characteristics on the different cards will be in different or variant positions along the cards corresponding to the positions of the plungers in the bottom of a compartment, which plungers are similarly designated in Figures 16 and 22.

It will be noted that the width of a plunger is equal to the combined thickness of a set or unit of ten cards; due to the fact, however, that the selector engaging portions or characteristics on the different cards are arranged to correspond to the positions of their actuating selectors or plungers, the actuation of a pair of plungers will only operate to raise a single card whose selector engaging portions or characteristics correspond in position to the position of the pair of plungers. Thus, if the pair of plungers "2" are arranged as shown in Figure 23, these plungers will only raise card number "2", while the other cards of the set will not be disturbed. Accordingly, the actuation of a selected pair of plungers will raise the corresponding card in its compartment above the other cards therein, so as to isolate the selected card from the other cards of the set or unit. It will be understood that the cards in one compartment correspond to the cards in each and every other compartment in structure, so that the different cards in a system will never exceed ten (10), no matter what may be the aggregate number of the cards in the system. Accordingly, the cards in the first compartment will be numbered "0" to "9" inclusive, in the second compartment "10" to "19" inclusive, and so on, as shown in Figure 9.

Each compartment is provided with a pilot element for the purpose of isolating the compartment containing a unit or subdivision of cards. This pilot element P (see Figures 9, 16, 22, 23 and 31) is preferably constructed of sheet metal and is a U-shaped structure folding over and engaging the top of the partition 28, so as to slide vertically thereon. It is provided at its ends with ears 32 having pins, engaging eyes in a pair of vertical plunger rods 33, guided in the bracket 20 and the side members 21. The projecting ends of these rods are provided with heads 34, and between each head and the bracket 20 is arranged a spring 35 which normally holds the pilot element at the lower limit of its movement, and in engagement with the top edge of the partition 28. When, however, the pilot element is raised through the engagement of suitable selectors with the the plunger heads 34, this pilot element will be projected above its partition and above the set or unit of cards in the compartment in front of the partition, so as to isolate the subdivision or unit of cards in that compartment. As hereinafter more fully described, the movement of the pilot element is in excess of that of the card or accounting element, and a selected pilot element and a selected accounting element are raised in unison, with the result, however, that the final position of the pilot element will be above the final position of the selected accounting element, thereby not only isolating the accounting element from its subdivision or unit, but also isolating the pilot element from the accounting element. It will, of course, be understood that there are one hundred (100) of these pilot elements in a tray of one thousand (1000) cards containing one hundred (100) subdivisions or units of ten (10) cards each. The ends of the pilot element are cut away, as shown at 36, so as to expose the upper corners of the cards, as shown in Figure 23, and these pilots may be provided with suitable numerals designating the number of the subdivision, as shown in Figure 23. By thus making the top of the pilot element shorter than the accounting element or card, its position, when raised, will be more clearly indicated.

*The selector supporting carriage*

Referring to Figures 3, 4, 5, 6, 9, 11, 13, 19 and 21, 40 designates a pair of side bars of channel form, which extend along the machine and form together a carriage for the selectors, as hereinafter described. Each of these side bars has fixed to each end thereof, a cross-head 41, provided with rolls 42 engaging a series of cross-bars 43, mounted between and fixed to the side plates or standards 12 of the frame. These cross-bars 43 therefore form tracks or guideways in which the cross-heads slide, so as to permit movement of these cross-heads and side bars 40 towards and from each other. Upon reference to Figure 16, it will be seen that the cross-head of one side bar is arranged below the cross-head of the other side bar; this permits the side bars to be moved close together, as the cross-heads can pass each other, and therefore permits the rolls 42 on the cross-head to be spaced an appreciable distance apart in order to furnish firm bearings for rigidly supporting the side bars against twisting movement.

Pairs of rock-shafts 44 and 45 (Figures 3, 16 and 21) are mounted in the front and the rear of the machine respectively, these shafts having bearings at their lower ends in the base 11, and at their upper ends in cross-pieces 46, supported by the side plates 12 and 13 respectively. Fixed to the rock-shafts 44 are arms 47, and fixed to the rock-shaft 45 are arms 48 connected by links 49 with the cross-heads 41. The rock-shafts 44 and 45 have fixed to their lower ends arms 50, (Figures 5 and 6) these arms being also arranged in pairs and crossing one another. An arm 50 of each pair is connected by a pair of links 51, these links being joined together at the center of the base by a pin 52, the pins 52 being fixed to a cross-head 53 provided with a slot engaged by guide pins 54 on the base 11, as shown in Figure 5, so as to guide this cross-head. A strong spring 55 is attached at one end to a pin on the cross-head, and at its other end to a pin on the base 11. This spring 55 is normally under tension and acts normally to move the links 51 to the right, Figure 5, so as to swing the arms 50 to the right, thereby tending to rotate the rock-shafts 44 and 45 of a pair in opposite directions, so as to swing the arms 47 and 48 inwardly and towards each other; this will tend to move the side bars 40 from their extreme outer limit, as shown in Figure 3, to their extreme inner limit or toward each other. The side bars are normally retained in the position shown in Figure 3, by suitable latching means, and upon the release of this latching means the spring 55 will operate through the connections heretofore described, to move the side bars 40 inwardly, all in a manner as hereinafter described.

*The accounting element selector carriers*

Referring now to Figures 3, 4, 5, 6, 9, 13 and 21, mounted on the inside faces of the side bars 40 are a pair of side bars 56 forming the carriers for the accounting element selectors, these carriers being mounted for sliding movement by means of pins 57 fixed to the carriers and engaging slots 58 in the side bars 40. The outer ends of the pins 57 are headed, as shown in Figures 6 and 9, so as to maintain the carriers 56 against lateral movement with respect to said bars 40, but permitting free sliding movement of these carriers. In order to permit the carriers to be placed in operative position on the side bars 40, the ends of the slot 58 are enlarged as shown at 59, to the diameters of the heads of the pins 57. The forward ends of the carriers 56 are provided with cross-heads 60 arranged in sliding engagement with a cross-bar 61, through the medium of collars 62 embracing the cross-head 60, but sliding on the cross-bar 61. The ends of the cross-bar 61 slide in ways or slots 63 in the side plates 12, as shown in Figures 4 and 21. The cross-bar 61 has mounted thereon at each end, a pair of links 64 connected at their outer ends with a pair of arms 65 mounted on a rock-shaft 66 between the side plates 12, and springs 67 connected at one of their ends to the arms 65, and at their other ends to the side plates 13, normally tend to move the arms 65 to the right, Figure 9, thereby tending to slide the carriers 56 to the right on the side bars 40. The carriers 56 are normally retained in the position shown in Figures 9 and 21, against the tension of a spring 67, through the medium of latching means engaging the cross-bar 61, so that when the cross-bar 61 is released, these springs will move the carrier 56 to the right, Figure 9, for a purpose and as hereafter more fully described.

*The accounting element selectors*

Referring now particularly to Figures 6, 9, 13 and 21, mounted on the carriers 56 are a series of selectors 68. These selector pairs are in this case ten in number, corresponding to the primary division or group of one hundred (100) cards each in the tray containing one thousand (1000) cards. Each of these selectors is guided for vertical movement on its carrier by means of headed pins 69 engaging slots 70 in the selectors, thereby retaining these selectors against lateral movement on the inside faces of the carriers 56, but permitting free vertical movement of these selectors on their carriers. The selectors are retained in their lowermost positions, as shown in Figure 9, by means of a spring 71 on each selector, attached at its upper end to a pin on the selector, and to its lower end to one of the headed pins 69. The upper ends of these selectors are turned inwardly, as shown at 72, Figures 9, 22 and 23, so as to furnish extended bearing surfaces for engaging the plungers 29 mounted in the tray. It will, however, be seen that the upper faces of these selectors are of such length and width as to engage only one pair of plungers.

*The selector actuators*

The lower end of each selector is enlarged as shown in Figure 9, to provide a head 73, adapted to be engaged by a cross-bar 74 travelling in vertical slots 75 in the side plates 13. This cross-bar is mounted in a pair of links 76 supported at the outer end of arms 77, fixed to a rock-shaft 78, Figures 5 and 11, mounted in the side plate 13. One of these arms is in the form of a bell-crank lever having an arm 79 provided with a laterally projecting pin 80, adapted to be engaged by a lug on an actuator bar 81 (Figures 4, 11 and 20) mounted for sliding movement on the right side plate 13, by headed pins 82 on the side plates 13, engaging slots 83 in the actuator. A spring 84, Figure 4, is connected at one end to the actuator, and at its other end to the side plate 13, and normally tends to move its actuator to the right, Figure 4, while the actuator is retained in set position against the tension of its actuating spring by latching means, as hereinafter described. The actuator is provided with a series of projecting lugs indicated by the reference characters "0" to "9" inclusive, and corresponding to the ten groups of cards in the tray, as heretofore described. These projecting lugs are adapted to engage the pins 80 on the bell-crank levers 77—79, in a manner and for a purpose hereinafter described.

*The effectual bars*

Referring now to Figures 5, 6, 9, 14 and 18, arranged on the base 11 are a series of bars C for rendering the bell-crank levers 77—79 effective to be operated by the actuator 81, these bars being numbered "0" to "9" inclusive, Figures 5 and 14, and corresponding in number to the number of groups of cards of one hundred (100) each in the tray. Each of these bars is guided for movement on the base 11, as shown in Figures 5, 6 and 9, by pins 85 on brackets 86 mounted on the base, engaging slots 870 in the bar. Each of these bars has connected thereto a spring 87, which at its outer end is connected with a bracket so as to normally tend to move the bar to the right, Figure 6, and the bar is retained in normal position by latching means as hereinafter more fully described. Each bar has a cam face 88, adapted to engage a corresponding cross-bar 74, when the bar is released. The engagement of the cam face 88 with its corresponding cross-bar 74 will operate to raise this cross-bar and swing its connected bell-crank lever 77—79, thereby moving the pin 80, which is normally in the position clear of the corresponding actuating lug on the actuator bar 81, into the path of this lug, as shown more fully in Figure 18. If now the actuator bar 81 is released, the actuating lug thereon will, upon engagement with the pin 80, swing the bell-crank lever 77—79, and this will operate through its link connections with the cross-bar 74, to raise this cross-bar still further, and the raising of this cross-bar 74 will, through its engagement with the head 73, on the pair of corresponding selectors 68, raise these selectors as shown in dotted lines, Figure 20.

It will be seen that there are a set of ten pairs of actuators, and a set of ten effectual bars operable to render the actuators effective for operation, these ten sets corresponding to the ten primary groups of cards of one hundred (100) each in the tray of one thousand (1000) cards. It will also be noted that on account of the provision of the enlarged head 73 on the selector, having also a loose connection with the cross-bar 74 for actuating the selector, this selector is permitted to move with its carrier 56 along the machine, as well as with the side bar transversely of the machine, but still maintain its operative relation with the actuator bar 74.

The pilot selectors and carriers

Referring now to Figures 3, 4, 9, 13, 16, 20 and 21, mounted on the side plates 13 are a series of brackets 89, and mounted on these brackets are a pair of side bars 90, forming the carriers for the pilot selectors as hereinafter described, these carriers being mounted for sliding movement on their brackets by means of headed pins 91 on the carrier, engaging slots 92 in the brackets. Mounted on these carriers are pairs of pilot selectors 93, the connections being made by pins 94 on the carriers 95 engaging slots in the selectors, so as to permit vertical movements of these pilot selectors on their carriers. Each of these selectors is extended laterally at its upper end, as shown at 96, so as to furnish an extending bearing surface adapted to engage its corresponding pilot plunger 34. The pilot selectors 93 are arranged opposite the corresponding card selectors, but slightly to one side thereof, as shown in Figure 9, and each pair of pilot selectors is connected by a cross-bar 97 having a rib 98 engaging corresponding recesses in the card selectors 68. In this way the pilot selectors will move vertically with the card selectors, and the pilot selector carriers will move along the machine with the card selector carriers, at the same time the connection is loose so as to permit inward sliding movement of the card selectors with their carriers, while the pilot selectors remain laterally stationary.

The key mechanism

Referring now to Figures 1, 6, 7, 8, 9, 14 and 15, the key board as shown, comprises a series of ten keys numbered from "0" to "9" inclusive, and an audit key A. The key shanks 99 are mounted to slide in slots in a guide plate 100 mounted between the side plates 12. The key mechanism for the different keys "0" to "9" inclusive, is similar, except some of the connections referred to for the "0" key. Each key shank 99 is connected to one arm 101 of a bell-crank lever, there being a series of ten of these bell-crank levers arranged in suitable spaced relation on a shaft 102, mounted in the side plates 12. The other arm 103 of each bell-crank lever is connected by a link 104 with an arm 105, there being a series of ten arms arranged in suitable spaced relation on a shaft 106 mounted between the side plates 12. A spring 107 is connected at one end to a lever 105, and at its other end to a cross-bar 108 mounted in the side plates 12. The lower end 109 of the lever 105 is turned laterally to form an extended lateral bearing surface, adapted to engage a transmitting element 110, pivoted at its upper end on a shaft 111, and adapted to engage the arm 112 of a bell-crank lever pivoted on a shaft 113, which is mounted in the side plates 12. A series of ten transmitting elements 110 are arranged in suitable spaced relation on the shaft 111, in positions to be engaged by the ends 109 of the levers 105, and a series of ten bell-crank levers 112 are arranged in suitable spaced relation on the shaft 113, in position to be engaged by the transmitting element 110.

In addition to a series of ten bell-crank levers 112, there are also pivoted on the shaft 113, two additional series of ten bell-crank levers each, the arms 114 and 115 of which are arranged below the arms 112 of the upper set of bell-crank levers. These bell-crank levers 114 and 115 are each pivoted in suitable spaced relation on the shaft 113, and the ends thereof are turned laterally as shown in Figure 15, so that the ends of these bell-crank levers 112, 114 and 115 will be in vertical rows, with the ends arranged in the same vertical planes as the ends of the intermediate elements 110. In order, however, to enable the transmitting element 110 to cooperate with any of the three bell-crank levers 112, 114 and 115, it must be shifted vertically to align the end thereof with these respective bell-crank levers, and the end 109 of the lever 105 must be extended, as shown in Figure 9, so as to permit its cooperation with the transmitting element 110 in any of its vertical positions.

The transmitting element carrier

Referring to Figures 7, 9, 11 and 13, the shaft 111, upon which the transmitting elements 110 are pivoted, is mounted in a carrier comprising a pair of side members 116, connected by the shaft 111, and by a cross-bar 117, both of which are mounted to slide vertically in slots 120 in the side plate 12, and to additionally brace this carrier, the side members 116 thereof are connected by a cross-piece 121. This cross-piece 121 also forms an abutment against which the transmitting members 110 are retained by springs 122, which are each connected at one end to the cross-bar, and at their other ends to the transmitting element.

Mechanism is provided for shifting the carrier to its different positions to align the transmitting elements thereon, successively with the series of bell-crank levers 112, 114 and 115. In accordance with this invention, as hereinafter described, the series of bell-crank levers 112 are connected to locate the selectors with respect to a group of one hundred (100) accounting elements or cards; the series of bell-crank levers 114 are connected to locate the selectors with respect to a subdivision of the selected group, that is, with respect to ten cards; while the series of bell-crank levers 115 are connected to locate the selectors with respect to an accounting element or card of that subdivision. Consequently, the series of bell-crank levers 112, 114 and 115 are arranged and operate in accordance with the successive denomination, and by successive eliminations into a group, a subdivision of that group, and an accounting element of that subdivision. In view of the fact, however, that there are only a single set of ten keys, means must be provided to automatically shift the transmitting element to cooperate with a series of bell-crank levers of a lower denomination, and this means must operate to shift after depression of a key, and upon return movement of the actuating lever 105.

In accordance with this invention, as shown more particularly in Figures 7, 11, 18, 19 and 20, the shaft 111 and the cross-bar 117 have mounted thereon a ratchet plate 123 which is provided on opposite sides with oppositely facing sets of ratchet teeth 124 and 125, adapted to be engaged by pawls 126 and 127 respectively, pivoted at 128 on a bracket 129 on the base 11. The pawls are connected by a spring 130, which tends to hold each pawl in engagement with its corresponding ratchet. The pawl 126 has fixed thereto an arm 131, while the pawl 127 has fixed thereto an arm 132. These arms engage opposite sides of a pin 133, mounted on the lower end of an arm 134, fixed to the rock-shaft 106, which in turn has fixed thereto, arms 135 connected by a cross-bar 136 in the path of and adapted to be engaged by any one of the series of levers 105. Springs 137 (see Figures 7 and 9) are connected at their upper ends to the side members 116, and at their lower ends to the base 11, and these springs tend to move the carrier downwardly when the pawl 127 is tripped. A spring 138 (see Figures 7 and 11) is connected at one end to the cross-bar 136, and at its other end to the cross-bar 108, and this spring operates to return the arm 134. This spring is, however, stronger than the spring 130.

Upon reference to Figure 11, it will be noted that when any key is depressed to shift the lever 105, so as to cause it to operate through the transmitting element 110, to shift a bell-crank lever 112 of the first series, this lever 105 will act, by engagement with the cross-bar 136, to shift the rock-shaft and its connected arm 134, thereby causing the pin 133 thereon, by its engagement with the arm 131, to move the pawl 126 to the right, Figure 11, out of engagement with the lower ratchet tooth 124; but this causes the pawl 127, on account of its spring connection with the pawl 126, to move therewith and into engagement with lower ratchet tooth 125, the construction being such that this pawl 127 engages under the lower tooth 125 before the pawl 126 leaves the lower tooth 124. Consequently, the carrier will now be retained against shifting by the pawl 127. It will, however, be observed that the pawl 127 is slightly shorter than the pawl 126, so that the carrier will drop a slight distance, sufficient, however, so that when the pawl 126 again returns it will not again slip under the lower tooth 124, but against the top face of this tooth. After the depressed key is released, thereby causing the spring 107 to return its connected lever 105, the spring 138 will return the arm 134, thereby moving the pawl 127 out of engagement with the lower tooth 125, the spring 130 yielding during such movement, and as soon as the pawl 127 leaves the lower tooth 125, the springs 137 will move the carrier down until it is stopped by engagement of the second tooth 124 with the pawl 126. This will position the carrier with the transmitting element 110 opposite the intermediate series of bell-crank levers 114 controlling the setting of the selectors to locate a subdivision of accounting elements. When a key is now depressed, one of the bell-crank levers 114 of the intermediate series will be operated.

Upon and after the second depression of any key, the pawls 126 and 127 will be shifted in a manner heretofore described, and the carrier will again be shifted downwardly another step until it is arrested by the engagement of the upper tooth 124 with the pawl 126, which will position the transmitting element 110 on the carrier in proper cooperative relation with respect to the third series of bell-crank levers 115, which control the setting of the selectors, in order to locate an accounting element in a subdivision previously selected. If a key is now again depressed it will, through the connections previously described, operate one of the bell-crank levers 115 controlling the setting of the selectors to locate an accounting element in the selected subdivision.

It will, therefore, be noted that with this key mechanism a single set of ten keys can be utilized, and these keys can be depressed in any desired sequence corresponding to a given number, as the transmitting mechanism operates automatically to adjust itself in accordance with the denominations, so as to selectively position the selectors to locate successively a group of accounting elements, a subdivision of that group, and an accounting element in that subdivision. A single key, however, controls all corresponding mechanisms of the three orders of selection, for instance, the "5" key will control the location of the selectors for the "500" group, the "50" subdivision, and the "5" card or accounting element.

The mechanism for rendering a pair of selectors operative

Referring now to Figures 6, 9, 14 and 18, each of the effectual bars C is provided with a laterally extending lug 139 engaged by a latch 140, there being a series of ten primary latches corresponding to the ten bars C spaced by suitable collars on a shaft 141, mounted in the side plates 12. Each of these latches 140 is connected by a link 142 with an arm 143 of a bell-crank lever 112, previously described. Each of these bell-crank levers is connected with one end of a spring 144, which is connected at its other end to a cross-bar 145, mounted between the side plates 12. The springs 144 operate to maintain the latches 140 in latching engagement with their respective bars, so as to retain these bars set against the tension of their springs 87.

Upon depression of any key as a primary key, the mechanism as heretofore described, will operate to swing the bell-crank lever 112 corresponding to the depressed key, and this will, through the connections with the latch 140, move this latch to dotted position, Figure 18, thereby causing this latch to release its bar C, and this bar will now be actuated by its spring 87, so as to engage the cam thereon with the cross-bar 74, and move this cross-bar in its guides in the side plates to dotted position, Figure 18. This will in turn swing the bell-crank lever 77—79 on its pivot, so as to move it to dotted position, thereby moving the pin 80 on the arm 79 into the path of the lug on the actuator bar 81. This will render a pair of selectors opposite the positioned cross-bar, effective for actuation vertically, when the actuator bar 81 is thereafter released.

In Figure 18 the parts are shown in position when the "1" key has been depressed, so as to render the second pair of selectors effective for operation. This is shown in Figure 19. In view of the fact that the second pair of selectors correspond to the one hundred (100) group of accounting elements, the depression of the "1" key will render the proper selectors operative and effective to primarily locate these selectors with respect to the one hundred (100) group of accounting elements, and also the pilot elements thereof, while all of the other selectors are left undisturbed.

The mechanism for positioning the selectors to locate a subdivision of a selected group Referring now to Figures 9, 10, 13, 15 and 19, the cross-bar 61 which, as heretofore described, connects the side bars or accounting element carriers 56, forms one of the elements with which cooperate the latching means, and the positioning means for positioning the pairs of accounting element and pilot element selectors to locate a subdivision or unit of a selected group. This cross-bar is engaged by a pair of latches 150 loosely mounted on the shaft 151, and connected by a cross-bar 152. These latches are held in engagement with the cross-bar by means of springs 153 connecting projecting arms on the latches and the cross-bar 108. Pivoted in properly spaced relation on the shaft 151, are a series of nine stop arms 154 having each slidably mounted thereon by pin and slot connections, a stop 155, each of which is connected by a spring 156 with the arm, so as to yieldingly hold the stop in retracted position, as shown in Figures 9 and 19. The arms 154 are each provided with an extension 157, adapted to engage the cross-bar 152 and adapted for engagement with a latch 158, forming each an arm of one of the bell-crank levers 114, heretofore described. A spring 159 connects an extension 160 on an arm 154 with a cross-bar 161 connecting the side plates 12. It will, of course, be understood that the springs 159 are stronger than the springs 153, and that the springs 67 are stronger than the springs 156. The cross-bar 61 is faced with the plate 163 of hardened steel, so as to reduce wear.

Figure 10:
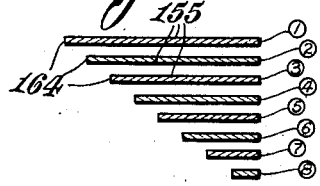
Figure 10 is a detail section on the line 10 Figure 9, showing the stops for arresting the carriage in its longitudinal movement.

The stops 155, as shown in Figure 10, are provided with stop shoulders 164, which are arranged as shown, so as to provide means for stopping the selector carriers at variable distances along their supporting carriage 40, so as to position the selectors at variable distances longitudinally of the machine, in order to secondarily locate the selectors in alignment with the proper row of plungers corresponding to the selected subdivision or unit of accounting elements and the pilot element therefor.

When a selected key is depressed as a secondary key, thereby actuating a selected bell-crank lever 114, through the mechanism heretofore described, assuming, of course, that the transmitter carriage has been shifted to position the transmitting element 110 opposite the end of this bell-crank lever, the latch 158 will be moved to dotted position, Figure 19, thereby releasing the stop arm 154 and causing its spring 159 to move it to dotted position, Figure 19. During this movement of the stop arm 154, its extension 157 will engage the cross-piece 152 connected with the latches 150, and move these latches to dotted position, so as to release the cross-bar 61. This will position the stop shoulder 164 on the depressed stop 155 in the path of the cross-bar 61 connected with the selector carrier, so that when this cross-bar is released by its latches 150, the springs 67 will move the carriers with their attached cross-bar to dotted position, Figure 19, until arrested by engagement with the stop shoulder 164. The springs 67 will thereupon move the stops 155 still further overcoming the tension of the spring 156, until the left end of the slots on this stop engage the pins on the arm 154, whereupon the cross-bar 61 and the carriers connected therewith will be positively arrested. This will place the carriers, together with all the selectors connected therewith, in the position shown in dotted lines, Figure 19, so as to secondarily position those pairs of selectors, which have been rendered operative for actuation or primarily located, as heretofore described, in proper cooperative relation with respect to the selected set of plungers 29 and heads 34 of a selected subdivision or group of accounting and pilot elements. In Figure 19, the parts are in locating relation corresponding to the secondary depression of the "2" key, and it will be noted that the pair of selectors "1", corresponding to the first or one hundred (100) group, has been shifted two spaces so as to position the selectors in proper cooperative relation with respect to the accounting and pilot elements in the second or twenty (20) group, at the same time maintaining the operative connections between the cross-bar 74 and the heads 73 of the pair of selectors "1."

It will be noted in this connection that there are only eight stop shoulders and only nine stop arms 154. This is for the reason that when "0" key is depressed, the selectors need not move forwardly, for the reason that they are normally in a position, when the carriers on the selectors are retracted and latched, with the selectors thereon in cooperative relation with the "0" subdivision of accounting elements and pilot elements. Accordingly, the selector carriers need not be released at this time. Accordingly, the "0" lever 114 is omitted, as shown in Figure 13.

In view of the fact that the travel of the selector carriers upon depression of the "9" key is a maximum, th stop shoulder as well as the stop on the "9" arm 154, can be omitted. In order, however, to arrest the selector carriers upon depression of the "9" key, a stop 165 (see Figures 9 and 19) is provided which is in the form of a cross-piece connecting a pair of arms 166 on a rock-shaft 167, which is held yieldingly in the positions shown in Figure 9, and full lines in Figure 19, by the weight of the arm 207 or by a spring 170 connected to an arm 207 on the rock shaft 167, (Figure 11) as hereinafter described. The movement of the yielding stop 165 is arrested by a fixed stop 168 extending forwardly between the arms 166, as shown in Figures 9, 13 and 19, and fixed to a cross-bar 169 mounted on the side plates 12. Upon the depression of the "9" key, therefore, the release of the cross-bar 61 will cause this cross-bar to engage the yielding stop 165, and the springs 67 will move the selector carriers and the cross-bar further to the right, Figure 19, until the yielding stop 165 is arrested by the fixed stop 168, whereupon the selector carriers and the carriers mounted thereon will be arrested with the selectors in proper cooperative relation with respect to the accounting elements and pilot elements in the "9" subdivision. The purpose of the yielding construction of the stops 165 and 168 will be more fully described hereinafter. Upon depression of any other key except an "0" or "9" key as a second key, the operation is as follows, (Figures 9 and 19). The proper stop arm 154 will be released and will move to dotted position, Figure 19, so as to place the stop shoulder 164 on the slide or stop 155 in the path of the cross bar 161 and with the end of the slide 155 adjacent the yielding stop 165. Upon release of the cross bar, it will press against the shoulder 164, the spring 156 yielding so that the slide will press against the yielding stop 165 carrying this stop with it, until arrested by the fixed stop 168. The operation is otherwise as takes place upon the depression of the "9" key.

*The mechanism for positioning the selectors to locate an accounting element*

Referring now to Figures 5, 11, 12, 14, 15, 16, 20, 21 and 22, the cross-head 53 (Figure 5) has secured thereto an extension 175 which extends forwardly along the base of the machine and is supported in guides 173 and in guide brackets 176 mounted on the base, the extension 175 being provided with guide pins 177 engaging guideways 178 in the brackets. Fixed to the extension 175 is a plate 179 having a shoulder 174 provided with a pair of laterally extending lugs 180, engaged by a pair of latches 181, pivoted on a shaft 182, and connected by a cross-piece 183, so as to be operable in unison. Springs 184, each connected at one end to an arm 185 on one of the latches, and connected at its other end to one of the brackets 176, operate to maintain the latches normally in operative engagement with the shoulders 180, in order to retain and latch the cross-head 53 (Figure 5) in retracted position against the tension of the spring 55, with the side bars of the carriage at the outside limit of their movements, and with the accounting element selectors in position to normally cooperate with the "0" accounting element plungers, as shown in Figure 22.

Loosely mounted on the shaft 182 are a series of nine stop arms 186, eight of which are provided with stop shoulders 187, as shown in Figure 12, corresponding to "1" to "9" positions, except that the stop shoulder on the "5" arm is omitted. These arms 186 are provided with extensions 188 extending underneath the cross-bar 183, and the end of each extension is connected with a spring 189 anchored on a cross-bar 190, mounted on the side plates 12, the spring 189 being stronger than the spring 184. The end of each extension has a laterally turned lug 191, forming an enlarged bearing, adapted to be engaged by an extension 192 on the bell-crank lever 115, pivoted on the shaft 113, as heretofore described, and maintained in engagement with the lug 191 by a spring 193 anchored to a cross-bar 145 on the side plates 12.

The plate 179 has slidingly mounted thereon, by pin and slot connections, as shown in Figures 14, 20 and 21, a plate 195 which is yieldingly retained in position by a spring 172 connecting the plates, for a purpose hereinafter to be described, and which is provided with a shoulder 196 adapted to be arrested by one of the stop shoulders 187 on one of the stop arms 186.

Upon operation of a selected key as a tertiary key (it being understood that at this time the transmitting carrier has been shifted to its third or tertiary position to shift the transmitting element 110 in a position to cooperate with the end of the lever 115), the lever 115 is moved to dotted position, Figure 20, thereby releasing the corresponding stop arm 186 and moving the stop shoulder 187 thereon, into the path of the stop shoulder 196. The extension 188 on the stop arm will, upon its movement to dotted position, engage the cross-bar 183 and move the latches 181 to dotted position, Figure 20, thereby releasing the extension 175 which will now, under the action of its spring 55, (Figure 5) move the cross-head 53, and the connected extension 175 rearwardly or to the right, Figures 11 and 20, carrying the shoulders 174 and 196 with it. The parts will continue in their movements until the shoulder 196 is arrested by the stop shoulder 187. The plate 195 will thereupon remain stationary, while the plate 179 will continue in its movement until the shoulder 174 abuts against and is arrested by the shoulder 196, as shown in dotted lines, Figure 20. The parts will thereupon be arrested.

As heretofore described, the spring 55 (Figure 5) will, upon release of the cross-head 53, through the link and arm connections, move the side bars 40 of the selector carriage inwardly until the cross-head 53 is arrested. This cross-head is arrested as just described, and the side bars 40 and the accounting element selectors connected therewith will, therefore, move inwardly to tertiary positions corresponding to the depressed key. In the position of parts, as shown in dotted lines in Figures 20, 22, and 23, the accounting element selectors have been moved inwardly to align with the plungers "2" corresponding with the depressions of key number "2," so as to finally locate an accounting element in the subdivision or unit of accounting elements. These selectors will now be in properly located positions, and upon actuation, as hereinafter described, will isolate the accounting and pilot elements.

It will be noted that the "0" stop arm, together with the "0" arm 115, have been omitted. This is for the reason that, as heretofore described, the accounting element selectors are normally in a position opposite the "0" plungers, as shown in Figure 22, and also in Figure 16. Consequently, the depression of the "0" key will have no effect in adjusting the accounting element selectors.

It is not necessary to provide a stop shoulder 187, or even a stop arm 186 for the "5" key, for the reason that the "5" plungers, as shown in Figure 22, are at their innermost positions, so that the selectors, upon depression of the "5" key, should be given their maximum movement. Accordingly, a fixed stop 197, Figure 20, is provided, which stop is in the form of a bridge embracing and connected to the brackets 176, which forms a stop for the shoulder 196. The arm 186 for the "5" position can, therefore, be entirely omitted.

*The selector actuating mechanism*

Referring to Figures 4, 8, 9, 11, 16, 20, 21 and 23, the actuator bar is shown as provided with a laterally turned lug 200, engaged by a pair of latches or pawls 201 and 202, pivoted on a stud 203 on the right side plate 12, Figure 21. The pawl 201 is held by a spring 204, connected to an extension on the pawl and anchored on a pin 205 on the right side plate 12, Figure 21, in engagement with the lug 200. A link 206 connected with the pawl 201 has a lost-motion connection with an arm 207 fixed to the rock-shaft 167. The connection is, therefore, such that upon release of the cross-bar 61, as heretofore described, and upon movement of the yielding stop 165, taking place at the time that the second key is depressed to position the selectors to locate a subdivision of the selected group of accounting elements, the movement of the yielding stop 165 to the right, Figure 9, will rock the shaft 167 and raise the pawl 201, as shown in Figure 20, so as to release it from engagement with the lug 200 on the actuator bar 81. It will be understood that springs 67 are strong enough to overcome springs 170 and 204.

As heretofore described, the depression of a "0" key, as the second or secondary key to be depressed, does not release the cross-bar 61, and therefore the yielding stop 165 will not be actuated at this time. Auxiliary mechanism must, therefore, be provided to take care of this contingency. Accordingly, as shown in Figure 11, and also in Figure 13, the "0" arm 114 is provided with an extension 208, which has connected thereto a link 209 having a lost-motion pin and slot connection with an arm 210 fixed to the rock-shaft 167. With this construction, actuation of the "0" key to position the selectors in order to locate the subdivision or unit of accounting elements, will rock the shaft 167 in a counter-clockwise direction, thereby raising the arm 207 and with it the pawl 201, so as to release it from the lug 200 on the actuator bar 81.

The actuation of the pawl 201, releasing it from the actuator bar 81 will, of course, leave the pawl 202 still in operative engagement with the actuator bar, and the bar will, therefore, remain locked. This pawl 202 is, therefore, tripped after and upon depression of the third or tertiary key, and after the selectors have been finally positioned to locate the accounting elements of a selected unit or subdivision. Accordingly, as shown in Figures 11, 13, 14, 16, 20 and 21, the pawl 202 is provided with a laterally projecting pin 211, which engages a slot in the upper end of a link 212, which in turn is connected to one end of the lever 213, Figure 16, pivoted intermediate its ends on the base 11, and connected to one arm 214 of a bell-crank lever, pivoted at 2150 on one of the brackets 176, and having an arm 215 connected by a cross-bar 216, with an arm 217 also pivoted on the bracket. The pawl 202 is held in engagement with the actuator bar by means of a spring 218, Figure 21, connected to an upwardly extending arm on the pawl and anchored on the pin 205 on the side plate 12. This spring operates through link and lever connections to hold the cross-bar 216 in the position shown in Figures 14 and 16, and in full lines in Figure 21.

As shown in Figures 11, 14, 16, 20 and 21, the plate 179 has pivoted thereon a bell-crank lever, one arm 219 of which is connected by a link 220 with the yielding plate 195, and the other arm 221 of which is arranged in the path of the connecting bar 216. Upon movement of the selectors transversely to positions to locate an accounting element, at which time the plate 179 is carried forward by the strong spring 55, the bell-crank lever 219—221 will be carried with plates 179—195, until the plate 195 is arrested by the stopping mechanism positioning the selectors, as heretofore described. Thereafter, the plate 179 will continue in its movements, carrying the bell-crank lever with it, and since the link 220 is now anchored on the arrested plate 195, the further movement of the plate 179, under the action of the strong spring 55, will swing the bell-crank on its pivot, thereby causing its arm 221 to move outwardly to dotted position, Figure 21, into engagement with and along the cross-pieces 216, thereby swinging the arms 215 and 217 on their pivots, which will, through the connections of the arm 214, lever 213, and link 212, raise the second pawl 202 to dotted position, Figure 20, thereby completely releasing the actuator bar 81, as shown in dotted position, Figure 20.

As heretofore described, the depression of the "0" key as the third or tertiary key will have no effect upon shifting of the selectors laterally of the machine, as the pawl 181 is not disturbed at this time. Auxiliary mechanism must, therefore, be provided for lifting the pawl 202 upon depression of the "0" key. Accordingly, as shown in Figure 11, and also in Figures 13 and 15, the arm 115 has an extension 222 connected with a link 223, having a lost motion pin and slot connection with an arm 224 on the pawl 202. The depression of the "0" key as the third key will, therefore, through the link connection, raise the pawl 202, to release the actuator bar 81.

Operation

As heretofore described, the depression of the first or primary key will render a pair of accounting element selectors, and a pair of corresponding pilot element selectors, operative for actuation by positioning the pin 80 on a bell-crank lever in proper cooperative relation with a proper shoulder on the actuator bar, and to position the proper cross-bar 74 in cooperative relation with the heads 73 on the proper accounting element selectors. In the position of the parts as shown in Figure 20, the first or primary key depressed is a "1" key, so that the parts will be in proper cooperative relation to actuate the accounting and pilot element selectors in the one hundred (100) group. Upon release of the actuator bar 81, as hereinbefore described, the strong spring 84, Figure 4, will operate to move the actuator bar 81 to the right, Figure 20, and to dotted position, thereby causing the "1" actuating lug to engage the pin 80 on the bell-crank lever 77—79, thereby swinging this bell-crank lever on its pivot and raising the links 76 and the cross-bar 74 connected therewith, to dotted position, thereby raising the accounting and pilot element selectors to dotted line position, Figure 20, and to full line position, Figure 23, so as to raise the accounting element or card "122", and raising the corresponding pilot element. Now it will be noted that, as shown in Figures 16 and 23, the lost motion between the accounting element selectors 68 and the plungers 29, is greater than the lost motion between the pilot element selectors 93 and the plunger heads 34 connected with the pilot element. Accordingly, the pilot element is raised a greater distance than the accounting element, with the result that the pilot element will project some distance above the raised accounting element or card.

It will thus be seen that the mechanism operates by a series of eliminations to first or primarily locate the selectors with respect to a group of elements, then to secondarily locate these selectors with respect to a subdivision or unit of that group, then to tertiarily locate the selectors with respect to an element in that subdivision or unit, and thereafter these selectors are actuated to isolate the located accounting and pilot elements. The first or primary location is one of rendering a pair of selectors operative, and the other locations are obtained by the positioning of a pair of selectors, first by a movement of these selectors jointly along the assembled elements, and second, by the movement of these selectors relatively and along an element. The pilot element of the unit or subdivision containing the accounting element, is located at the same time and by the same operations, and the selectors are actuated to isolate the pilot element at the same time that the selectors are actuated to isolate the accounting element.

*The mechanism for clearing the machine*

Referring now to Figures 1, 2, 3, 4, 7, 9, 11, 13, 14, 15, 16, and 18, fixed to a stub shaft 230 in the right side plate 12, Figure 15, is a main crank arm 231, which has fixed thereto on the inside of the side plate 12, a crank 232. This crank has connected therewith a link 233, which has a lost motion pin and slot connection with an arm 234 fixed to a rock-shaft 182, extending across the machine and having bearing in the side plates 12. The arm 234 has a toothed segment 236 meshing with a segment 237 on a rock-shaft 238 extending across the machine and having bearing in the side plates 12, and a similar pair of meshing segments connect the shafts at their opposite ends (Figure 9). A link 239 also connects the crank 232 with a cam 240 on a stub shaft 241, having a bearing in the right side plate, Figure 15.

Fixed to the rock-shaft 238 are pairs of spaced arms 242 (see Figures 7, 9 and 15) each of which has connected thereto a set of five links 243, having lost motion connections with the effectual bars C which render the selectors effective for operation, as heretofore described. This lost motion connection comprises a pin 244 in each bar C, engaging a slot 245 in each link, as shown in Figure 9. The connections are, therefore, such that when a selected bar C is released by actuation of its latch 140, this bar is permitted to travel to dotted position, Figure 18, on account of the pin and slot connection with the link 243, without disturbing the other bars of the set. If now the crank arm 231 is moved forwardly, it will, through the connections described, move all of the links 243 forwardly by causing the link of the released bar C to be returned in engagement with its latch 140, as shown in Figures 9 and 18 in full line position, so as to be locked thereby, while the lost motion connections of the other links to the other bars will permit free movement without disturbing the other bars. The crank arm 231 can now be again returned to normal position, as shown in Figure 4, and in order to stop the parts in normal position, the rock-shaft 182 is provided with a lug 246 fixed thereto, engaging a stop 247 on the left side plate, Figure 13.

The rock-shaft 238 has fixed thereto a pair of arms 248, one at each end, each of which has connected therewith a link 249 having lost motion connections with the arms 65, connected with the selector carriers 56, as heretofore described. This lost motion connection comprises a pin 250 on each arm 65 engaging a slot 251 in each link 249, Figures 11 and 14. Each arm 65 is connected as shown in Figures 4, 9 and 13, by a link 252 with a projecting lug 253 on a pilot carrier 90. The rock-shaft 182 has also fixed thereto an arm 254 connected by a link 255, with an arm 256 on the rock-shaft 151 (see Figures 9, 13 and 15). This rock-shaft has fixed thereto a pair of arms 257 connected by a cross-bar 258 arranged in back of the extensions 160 on the stop arms 154, and having a lost motion with respect thereto.

When the crank arm 231 is moved forwardly, it will operate through the connections described, to move the accounting element and pilot element selector carriers 56 and 90 forwardly until the cross-bar 61 engages the latches 150, so as to latch these carriers in their normal position, as shown in Figure 9, and also in full lines in Figure 19. Concurrently the connections with the cross-bar 258 will operate to swing the released stop arm 154, by engagement of the cross-bar with the extension 160, on its pivot until the extension 157 snaps under and is engaged by the latch 158, thereby latching the released stop arm in normal position against the tension of its actuating spring 159, as shown in Figure 9, and also in full lines in Figure 19.

The arms 248 (see Figures 11, 14 and 16) have connected thereto links 260 which have lost motion connections with arms 261, Figure 3, by a pin 262 in each arm engaging a slot 263 in each link. These arms 261 are mounted for rocking movements on the cross-bar 46, and are provided with segments 264 meshing with segments 265 on the arms 47, Figure 3. Fixed to the rock-shaft 182 is a pair of arms 266 connected by a cross-bar 267, Figures 11, 15 and 20, which are arranged in the path of extensions 268, one on each stop arm 186.

When the crank arm 231 is moved forwardly, it will operate through the connections described, to move side bars 40 of the selector carriage outwardly against the tension of the strong spring 55, Figure 5, until the lugs 180 engage with the latches 181. Concurrently, cross-bar 267 will engage the extension 268 on the release stop arm 186, and swing this stop arm to full line position, Figure 20, thereby raising this arm, and moving the extension 188 under extension 192 on the lever 115, thereby latching the released stop arm in normal raised position. This will return the side bars of the selector carriage to normal positions with their selectors to "0" position, as shown in Figure 22, and the parts will then be retained in this position.

Referring now to Figures 11 and 15, the cam 240 is provided with a cam face 269 engaging a pin or cam roll 270 on the arm 271 of a bell-crank lever, pivoted on shaft 66 between the side plates 12, Figure 15. The other arm 273 of the bell-crank lever is connected to a link 274, which has a lost motion connection with the actuator bar 81, by means of a pin 275 on the bar, engaging a slot 276 in the link.

When the crank arm 231 is moved forwardly, the movement of the cam 240 in a counter-clockwise direction, Figure 11, will operate through the connections described, to move the actuator bar 81 forwardly against the tension of its spring 84. Now the connections are such, relative to the connections for returning the stop arms 154 and 186, and for returning the selector carriers 56 and 90, and the selector carrier 40, and the extension 175 connected therewith, that these parts have been returned just prior to the forward limit of movement of the crank arm 231. Therefore, the stop arm 154 will have been released from the yielding stop 165, Figure 9, thereby permitting the arm 166 to return to normal position and consequently permitting the latch 201 to be returned to normal position, as shown in Figures 11 and 18. Furthermore, the return of the extension 175 and the plate 179 connected therewith, will have caused the plate 195 to have returned to normal position on the plate 179, thereby causing the bell-crank lever 220—221 to be returned to normal full line position, Figure 21; this permits the latch 202 to be returned by its spring 218 to normal position, Figure 20. Consequently, both latches 201 and 202 being now returned to normal positions, they will hook over the lug 200 on the actuator bar 81, and latch this actuator bar in normal position against the tension of its actuating spring 84.

Referring now to Figures 7, 9 and 11, the rock-shaft 182 has fixed thereto a pair of arms 277 having lost motion connections with links 278, connected in turn with the cross-bar 117 on the transmitter carriage 116. This lost motion connection is through pins 279 on the arms 277, engaging slots 280 in the links 278.

When the crank arm 231 is moved forwardly to clear the machine, it will operate through the connections described, to raise the transmitter carriage and return it to normal position, the pawl 126 snapping over the teeth 124 until it engages and takes under the lowest tooth, thereby locking the transmitter carrier in normal position with the transmitter elements 110 in normal position to engage the levers 112 of the first order.

Prior to the movements of the selectors transversely and longitudinally of the machine, it is necessary that these selectors shall have been dropped back to normal positions shown in full lines in Figures 20 and 22, and as shown in dotted lines in Figure 23. Accordingly, the clearing connections must be such that the actuator bar 81 is returned before any of the other mechanisms operate to any appreciable extent, and before their pin and slot connections take up the lost motion to these parts. Now it will be noted upon reference to Figure 11, that the cam face 269 of the cam 240 has a very sharp rise at one end, and that the arm 271 is short, while the arm 273 is long. Accordingly, movement of the cam 240, through a very small angle, will therefore return this bar to normal position. The connections are such that this bar 81 will be moved back to normal position, so as to permit the selectors to drop to clear the actuated plungers before the connections for shifting the selector carriers longitudinally and transversely of the machine become effective.

It will thus be seen that all of the parts are turned back to normal positions with all of these parts latched in their normal positions against the tension of their actuating springs, thereby permitting the machine again to be set to successively position the selectors to final locating position. The lost motion connections are, of course, provided to permit the release of any returnel element to take place without affecting the other elements.

*The means for unpacking the accounting elements*

In view of the fact that the cards are closely packed in order to economize space, it is desirable that some means be provided for unpacking a selected subdivision or unit of cards, so as to permit a selected card to be readily removed or replaced. Means are, therefore, provided to permit expansion of a compartment.

Referring to Figures 1, 2, 9, 16, 24, and 25, it will be noted that the partitions 28 are arranged between a pair of guide plates 26. These guide plates, however, terminate some distance below the end of the partitions, and since these partitions are flexible, and unsupported above the guide plates 26, these partitions can each be bent back on the terminus of the guide plates 26 as an axis. It will also be noted that the guide plates 26 are beveled at their upper edges to permit ready insertion of a withdrawn card. On account of the fact that the space between the inside faces of the partition plates 26, bounding a particular compartment, is less than the distance between the inside faces of the adjacent guide plates 28, and in view of the fact that these guide plates bounding a compartment are spaced a distance apart equal to the combined thickness of a set or unit of ten cards, the space between the inside faces of a pair of adjacent partition plates bounding that compartment is greater than the combined thickness of the set of cards, as the pilots are in practice of very thin stock. Consequently, with all of the cards in place, any selected partition plate 28 can be bent back to widen the compartment in front of that plate.

In order to permit such unpacking mechanically, the sides 15 have mounted on each side thereof, a pair of brackets 285 which slidingly support a pair of bars 286, this sliding movement being obtained by pins 287 on the bars 286 engaging slots 288 in the brackets 285. In order to hold these plates in normal position, that is, forwardly, the side bars are connected to a pair of arms 289 fixed on a rock-shaft 290, mounted in bearings in the sides 15, and this rock-shaft has connected therewith an arm 291 which has attached thereto a spring 292 anchored on a cross-bar 293, connecting the sides 15. This spring will operate to hold the bars 286 in their normal forward positions, but these bars can be shifted rearwardly against the tension of the spring.

The bars 286 are of channel form, and the inside flange of each channel is formed to provide a series of tapering lugs 294, forming wedge-shaped recesses 295. There is a recess 295 opposite each ear 32 on a pilot element P, and in the normal depressed position of the pilot element, these ears will be below the lugs 294, so as to be out of engagement therewith.

When a selected pilot element is raised to isolate a selected subdivision or unit in a compartment, as heretofore described, the upward movement of this pilot element will cause the ears 32 thereon to enter the recesses 295 between the adjacent pair of lugs 294 in the bars 286, the tapered construction of these lugs permitting ready engagement and ready entrance of the ears into these recesses. If now the bars 286 are moved rearwardly, these bars being provided with suitable finger pieces 296 to permit such manipulation, these bars will, by their engagement with the isolated pilot element, move this pilot element, and with it the flexible partition 28, rearwardly, so as to expand or open up the compartment, and therefore, unpack the unit of cards therein. The isolated or raised accounting element or card in this compartment can, therefore, be readily withdrawn and can be readily replaced. It will, of course, be understood that the cards rearwardly of the selected compartment, can be compressed sufficiently, which is permitted by the flexible construction of the partitions, to permit the selected partition to be moved rearwardly a considerable distance. It will be observed, moreover, that upon actuation of the bars 286, only the selected compartment containing the selected and isolated card and pilot, is expanded, while all of the other compartments and the partitions therefor are left undisturbed.

*Summary of operation*

Assuming all the parts in their normal positions, and that the auditor desires to select a certain card bearing a certain number, for instance card number "122," the operations will be as follows:

The auditor will successively depress keys numbers "1", "2" and "2", key number "2" being depressed twice. This will operate the mechanisms to locate and isolate card number "122", together with the pilot element in the compartment having a unit or subdivision of ten cards containing the selected card. The selected card being raised above the remaining cards, as shown in Figure 2 and also in Figure 23, and its corresponding pilot element being also raised, the position of this isolated card is readily observed. The isolated card number "122" can now be withdrawn for inspection or other purposes, and can then be returned to its proper subdivision or unit in its proper compartment. It will be observed that the parts remain in position with both the card and pilot selectors raised, until the machine is cleared by pulling the crank arm 231 forwardly. Accordingly, after the selected and isolated card has been withdrawn, the corresponding pilot will remain in raised position to indicate the subdivision or unit in the compartment from which the card has been withdrawn. Therefore, when the auditor desires to return the card, he does not have to search to find the proper compartment, as its position is indicated. Moreover, the unpacking means operated upon the movement of the side bars to expand the isolated compartment, furnishes a convenient arrangement whereby the return of the withdrawn card is facilitated. By providing, therefore, mechanism for setting the selecting means by the depression of the keys corresponding to the number of the desired card, and by returning the selecting means upon movement of a manually operated element, such as the handle or crank arm, the return of a card to its proper compartment is facilitated, for the reason that the pilot remains in raised position to isolate the subdivision or compartment from which the card has been withdrawn, until the handle is operated to clear the machine. If this handle were operated to isolate the card and its pilot element, and would upon its return movement clear the machine, then the selectors would again have to be set when it would be desired to return the card to its proper subdivision or compartment.

If a card has been withdrawn and kept out for any length of time, or if a series of cards are successively withdrawn, thereby necessitating that the machine be cleared, the cards can be returned to their respective positions by successively setting the mechanism upon depression of the keys corresponding to the numbers of the cards, and such depression will successively raise the pilot to isolate the subdivisions or compartments from which the cards have been withdrawn, so that these cards may readily be replaced in their respective compartments.

Upon reference to Figures 22, 23 and 31, it will be noted that each card has a pair of selector engaging portions, corresponding in positions along the cards to the positions of the plungers along the compartment in which a set of cards are located. Upon reference to Figures 9 and 17, it will also be noted that the width of each plunger is equal to the width of the compartment, and therefore, equal to the combined thickness of a set or subdivision of ten cards. Accordingly, the cards of a set need not necessarily be placed in their numerical order in their compartment, because no matter where, for instance, card number "122" is placed in its compartment, its selector engaging portions will always be in a position to be engaged by their cooperating plungers. Accordingly, a withdrawn card can be placed in any position in its compartment, and upon depression of the keys corresponding to the number of the card, this card will always be elevated to isolate it from the remaining cards of the set in that compartment. Consequently, the auditor need not search even through the cards in any compartment, whether a given card is to be withdrawn or replaced. Consequently, the only card which is handled or fingered is the card which is to be withdrawn or replaced.

Upon the depression of a set of keys to isolate a given card, for instance card number "122" (it being noted that this card is in the second or one hundred group, the third or twenty subdivision, and the third card in this subdivision), the operations of the mechanism to locate and isolate that card, together with its corresponding pilot, will be briefly as follows, referring more particularly again to Figures 18 to 23 inclusive:

The depression of the "1" key as the primary key will release the corresponding effectual bar C, so as to render the second set of selectors effective for actuation, by positioning the transmitting bell-crank lever link connection in cooperative relation with respect to the "1" set of selectors, and with respect to the "1" lug on the actuating bar (see Figures 18, 19 and 20); the remaining selectors and the remaining transmitting connections remain ineffective. This will render the "1" selectors corresponding to the second group of one hundred (100) cards, together with their accounting elements, effective for operation, and will, therefore, primarily locate this group of cards.

Upon depression of the "2" key as the secondary key, the selector carriers will be released, thereby carrying all the selectors rearwardly until arrested by the "2" stop. Accordingly, all of the pairs of selectors will move rearwardly two spaces, as shown in Figure 19. In view of the fact, however, that only the second set of selectors are rendered effective for actuation, as heretofore described, only this set of selectors is effectively positioned to secondarily locate the third or twenty subdivision of cards in the second or one hundred (100) group. The card or accounting element selectors are, therefore, properly located secondarily with respect to the twenty compartment, and the plungers therein, while the pilot selectors are properly located with respect to this compartment and the pilot plungers therefor.

When the key "2" is again or tertiary depressed, the selector carriage will be released so as to move all of the card selectors thereon laterally of the machine, until tertiarily arrested by the "2" stop, the pilot selectors remaining, however, stationary. Accordingly, the card selectors are moved inwardly until they are opposite and align with the "2" plungers, as shown in dotted lines, Figures 22 and 23; the pilot selectors need not, of course, be shifted inwardly, for the reason that there is only a single pilot for each subdivision or compartment.

After the selectors have thus been tertiarily or finally positioned to locate the selected card number "122", and the pilot corresponding thereto, the latches retaining the actuator bar are released upon completion of the final adjustment of the selectors. This will cause the adjusted selectors to be raised so as to raise the selected card number "122", and the corresponding pilot of its compartment, as shown in Figures 20 and 23, thereby isolating the selected and located card and its pilot.

It will be observed that the actuator bar 81 is retained by two latches 201 and 202, as heretofore described, and that these latches are raised by different trains of mechanism, one operated upon depression of the secondary key when the selectors are shifted to locate a subdivision, while the latch 202 is operated after depression of the tertiary key, and when the selectors are positioned to locate the desired card. It will also be noted that neither of these latches is raised until the corresponding shifting movement of the selectors has been completed. Accordingly, the actuator bar is not released to raise the selectors until both adjustments of the selectors have been finally completed. This is ar important feature, for the reason that the selectors have variable movements in both directions, and that there is a time element involved in each of these movements. If, therefore, the first latch 201 were omitted, and for instance the keys be rapidly depressed in the order 1—9—1, the lateral movement of the selectors would be completed before the longitudinal movement would be completed, and accordingly the actuator bar would be released before the selectors would be in final adjusted position along the assembled cards. By, however, providing two latches controlled and actuated only upon release of the setting mechanisms connected therewith, it is insured that the selectors will reach their final adjusted positions transversely as well as longitudinally of the machine before these selectors are actuated.

As heretofore described, the transmitter carriage is released and positioned upon the depression of the first and second keys, to successively permit actuation of the different mechanisms by a single set of ten (10) keys.

*The auditing mechanism*

It frequently becomes necessary to audit the system of accounts in order to determine whether an account has been misplaced or is missing. In accordance with this invention there is provided an audit key which, upon depression, will throw into action, auxiliary selectors which are adapted to actuate all of the pilot elements for all of the subdivisions of accounting elements or cards in the tray. Upon depression of the selected key upon the main key board, the auxiliary accounting element selectors are then positioned with respect to a pair of plungers in each subdivision or compartment corresponding to the depressed key, so as to locate an accounting element or card in each subdivision or compartment. Upon actuation of these auxiliary selectors, the mechanism therefore operates to isolate all of the pilot elements in the tray, and so as to isolate an accounting element in each subdivision or compartment corresponding to the depressed key on the main key board. If now an accounting element or card is missing in any subdivision or compartment, its absence will be noted by the absence of a raised card in that compartment; and if this card has been misplaced, it can readily be found by the fact that two cards will now be raised in a single compartment. The misplaced card, upon being found can, therefore, readily be replaced in its proper compartment. In this way by successively setting the auxiliary selectors, and by successively depressing keys "0" to "9" inclusive on the main key board, the entire tray can be audited.

Referring now to Figures 1, 2, 3, 4, 7, 8, 11, 16 and 26 to 30 inclusive, mounted on the side bars 40 of the selector carriage are pairs of brackets 300, one pair at each end of the carriage. Mounted on each of these brackets is an arm 301, the arm being pivoted at the lower end of the bracket by means of a lug 302 engaging a bearing aperture 303 in the bracket. A pair of said arms along a side bar 40 are connected by an auxiliary selector bar 304, which is normally in full line position, Figure 26, but which, upon pivotal movement of its supporting arms 301, is adapted to be moved over a series of accounting element selectors 68 mounted on their carriers 56, which are in turn mounted upon the side bars 40, as heretofore described. The arms 301 and the auxiliary selector bar 304, mounted thereon, are normally retained in full line position, Figure 26, and out of the path of movement of the selectors 68, by means of a spring 305 connected at its upper end to a laterally projecting lug 306 on the arm 301, and anchored at its lower end on the side bar 40. The bracket 300 has slidingly mounted thereon, a plate 307, which is provided with slots engaging pins 308 on the bracket, and a spring 309 connected with this plate and anchored to the side bar 40, normally retains this plate in depressed position. This plate is provided with a lug 299 and is raised vertically against the tension of its spring by engagement of the lug by a cross-bar 310 connecting a pair of arms 311 loosely mounted on the rock-shaft 167 and operated by the audit key as hereinafter described. The forward arm 301 of each bar is provided with a forwardly extending lug 312 adapted to be engaged by a cam face 313 on the plate 307, so that upon vertical movement of the cross-bar 310, Figure 26, the vertical movement of the plates 307 will cause the arms 301 and their connected auxiliary selector bars 304 to be moved from full line to dotted position, Figure 26, over the end of the accounting element selectors 68. It will be understood, of course, that in view of the fact that the brackets carrying the auxiliary selectors are mounted on and move laterally of the machine with the cross-bars 40 of the selector carriage, the auxiliary selectors will move with this carriage and the accounting element selectors thereon, so as to be positioned in cooperative relation with the selected pairs of plungers. The brackets 300 are provided with vertically arranged slots 314 forming continuations of the bearing apertures 30. so that when the auxiliary selectors are moved over the accounting element selectors, these auxiliary selectors are capable of movement vertically with the accounting element selectors to engage and move a series of plungers arranged along the tray, the slots in the plates 307 permitting such movement.

Mounted on the cross-bar 169, and on a cross-bar 320 connecting the side plates 13 at the rear of the machine, Figure 3, are pairs of brackets 321. Each of these brackets has pivoted thereon at 322, an arm 323 provided with a laterally extending flange 324, on which is slidingly mounted a plate 325 by a pin 326 on the flange engaging a slot in the plate, as shown in Figure 28, and a pair of these plates along the machine are connected by an auxiliary selector bar 327 adapted to take over a set of pilot element selectors 93. A spring 328 connects each forward plate 325 at its upper end with the bracket 321, and this spring not only operates to hold the arm 323 in normal full line position, Figure 26, with the selector bar 327, out of cooperative relation with the pilot selectors 93, but also operates to hold this selector bar at the lower limit of its movement. Each forward arm 323 is provided with a forwardly projecting pin 329, arranged in the path of and adapted to be engaged upon the cross-bar 310. When the cross-bar 310 is raised it will, by the engagement of the pin 329, swing the arms 323 to dotted position, Figure 26, so as to move the selector bars 327 over the pilot selectors 93. If now these pilot selectors are raised as hereinafter described, they will operate to raise the pilot selector bars 327, and by engagement with the pilot element plungers, raise all of the pilot elements in the tray.

Mounted in the plate 100 is an audit key A, the shank 335 of which is connected with an arm 336, Figure 11, fixed to a rock-shaft 337 mounted in the side plate 12. A spring 338, connected at one end to the arm 336, and at its other end to the guide plate 100, operates to retain the audit key A in raised position. A link 339 connects the arm 336 with an arm 340 on a shaft 334 mounted in the side plates, and having an arm 333 connected by a link 360 with the "0" lever 208, (Figure 11), there being a pin and slot connection to permit independent operation of this lever by the "0" key in the usual operation. The arm 333 is further connected by a link 341 with links 342 on the adjacently located "0" and "9" levers 112 (Figures 29 and 30) which, as heretofore described, are connected by links 142 with the latches 140, so as to control the release of the "0" and "9" effectual bars C. The connection between the link 341 and the links 342 is through a pin 343 engaging slots 344 in the links 342. This lost motion connection permits independent movement of the "0" and "9" levers 112, by their individual keys. The connections are, therefore such that upon depression of the audit key, the connections described will operate to raise the first latch 201 and to release the "0" and "9" latches 140, so as to release the "0" and "9" effectual bars C. Now it will be observed from Figure 2, that the "0" and "9" effectual bars C have their cams engaging the cross-bar 74 on the "0" and "9" bell-crank levers 77—79, arranged at the forward and rear end of the machine respectively. Accordingly, actuation of the audit key will render the "0" and "9" pairs of selectors effective for actuation.

The rock-shaft 337 has an arm 345 (see Figure 11) which is connected by a link 346 through a pin and slot connection to an arm 347 loosely mounted on the rock-shaft 167 and connected with one of the arms 311 (Figure 8) which, as heretofore described, carries the cross-bar 310. Upon depression of the audit key, therefore, the cross-bar 310 will be raised to move the auxiliary selector bars 304 and 327 over all of the accounting element and pilot selectors, and therefore, over the "0" and "9" selectors arranged at the extreme ends of the machine.

The rock-shaft 337 has also fixed thereto an arm 348 which is connected by a link 349, with a lever 350 loosely mounted on the rock-shaft 106. Fixed to the pawl 126 is an arm 351 provided with a pin 356 engaging the lower arm of the lever 350. Loosely mounted on the bracket 129 is an arm 352, which has a tooth 353 adapted to engage a stop shoulder 354 on the right side, Figure 7, of the rack 123, and this arm 352 is connected by a spring 355 with the pawl 126.

Upon depression of the audit key the lever 350 will swing to the right, Figure 11, and by engagement with the pin 356 will operate to move the pawl 126 out of engagement with the teeth 124, but the spring connection 355 with the pawl 126 will operate to move the arm 352 to the right, Figure 11, thereby moving its tooth 353, which is slightly raised above the tooth 127 in the path of the stop 354, so that upon the release of the transmitter carrier by the pawl 126, its actuating spring will operate to drop the transmitter carrier until the elements 110 thereon, are in alignment with the levers 115, which as is heretofore described, control the movement of the selector carriage laterally to position the pairs of selectors thereon in cooperative relation with the corresponding pairs of plungers, so that upon depression of any key, operative-rendered selectors will be released as heretofore described.

The audit key is provided with a recess or notch 357 adapted to engage the edge of the guide plate 100, so that when the audit key is depressed and pushed forwardly, as will happen in the natural movement of the finger or thumb in depressing this key, the notch 357 will engage the plate, thereby latching the audit key in depressed position.

Operation of auditing mechanism

Upon depression of the audit key, the mechanism heretofore described will operate to release the "0" and "9" bars C, thereby positioning the "0" and "9" bell-crank levers which, as heretofore described, are at the forward and rear ends of the machine, respectively, in operative relation with respect to the actuator bar, and so as to position the "0" and "9" cross-bars in cooperative relation with respect to the "0" and "9" pairs of selectors (both accounting and pilot) which, as heretofore described, are also arranged at the forward and rear ends of the machine. Moreover, the connections will operate, as heretofore described, to swing the accounting element and pilot element selector bars into cooperative relation over and to be engaged by the accounting element selectors, and the pilot element selectors. This will position the pilot element selector bars in position to engage all of the pilot element plungers. The connections will also operate to shift the transmitter carrier, in order to position the transmitting elements opposite and in cooperative relation with respect to the lower set of levers controlling the release of the accounting element selectors, in order to position these selectors laterally of the machine. The connections with the "0" lever 114 will, of course, operate, through the connections heretofore described, to raise the first latch 201 out of engagement with the actuator bar, so that this actuator bar will only be retained by the latch 202, which is controlled upon the depression of the final key.

After depression of the audit key, therefore, the selector bars will be positioned so as to be in actuating relation with all of the plungers (accounting and pilot) in two pairs of rows longitudinally of the machine. If now, for instance, the auditor desires to raise all of the cards ending in "2", he will depress the "2" key, and this will operate through the connections heretofore described, and as in the ordinary selecting operation, to first position the selector carriage transversely of the machine until the accounting element selectors, and the selector bars positioned thereover, are in cooperative relation with all of the "2" plungers longitudinally of the machine, so as to be in cooperative relation with all of these plungers. Thereafter, the release of the actuator bar will cooperate with the "0" and "9" bell-crank levers, arranged at the ends of the machine to raise the "0" and "9" accounting and pilot element selectors. This will raise the accounting and pilot selector bars so as to actuate the accounting and pilot plungers to raise all of the pilot elements, and so as to raise the card ending in "2" in each subdivision or compartment. This operation can be repeated successively with each key on the main keyboard, it being understood that the machine is cleared each time. The auditor can, therefore, in a very few minutes, audit all of the one thousand (1000) accounts in a tray.

It will be observed that on account of the fact that the "0" and "9" selectors are operated, which selectors are arranged at the ends of the machine, the accounting and pilot selector bars are raised by movements at the ends thereof, so that these bars will not bind.

The multiple tray construction

As heretofore pointed out, this invention provides an accounting apparatus or machine employing a series of trays, and means are, therefore, provided to support the mechanism to cooperate with the accounting elements in any of these trays. This is shown in Figures 32 and 33. Mounted in a frame or cabinet comprising a pair of side members 365, are a series of trays T, each of which may contain one thousand (1000) cards, each tray being constructed as heretofore described, and provided with partitions dividing the tray into compartments, and provided with accounting element and pilot element plungers. The mechanism is mounted to slide on this frame, and for that purpose the frame is provided with tracks 366 engaged by wheels 367 on brackets 368 connected with the body of the mechanism, the mechanism body, brackets 368 and the wheels 367 forming a carrier for suspending the mechanism, so that the selecting mechanism is movable along the frame and beneath the trays. A shaft 369 mounted in the brackets 368 is provided with pinions 370 engaging racks 371 formed on the bottom faces of the tracks 366, so as to keep the carrier and the mechanism thereon in transverse alignment with the trays. The carrier and the mechanism thereon are, therefore, movable along the frame to position the selectors thereof in proper cooperative relation with the plungers and the accounting and pilot elements in the trays. In order to accurately position the carrier and the mechanism thereon in proper alignment with the selected tray, the forward frame side member 365 is provided with keepers 372 adapted to be engaged by the toe of a latch 364, pivoted on one side of the machine and normally retained in engagement with its keeper and with a stop 373, by a spring 374, this latch being provided with a finger piece 375 to facilitate its manipulation. By moving the latch out of engagement with its keeper, and by sliding the carrier thereon along the frame, the selecting mechanism can be positioned in cooperative relation with any of the trays, the latch snapping into the proper keeper.

When the auditor desires to raise, for instance, card number "1122", he will position the carrier in cooperative relation with respect to the one thousand (1000) tray, and by pressing the keys in the order 1—2—2, the selecting mechanism will operate to select the one hundred twenty-secondth card in that tray which in the thousand tray is card number "1122". This will raise card number "1122", and will raise the pilot element of its group in the manner heretofore described. Similarly the accounts in different trays can be audited in the same manner as heretofore described. This invention is, therefore, adapted to accounting systems employing many trays of cards, and requires the use of only a single machine.

The motor drive mechanism

In accordance with this invention, mechanism is provided which, upon depression of a bar or key, will operate to clear the machine. Referring now to Figures 34 and 35, the base 11 has mounted thereon a suitable electric motor 385, which has coupled to its armature shaft, a shaft 386 mounted in bearings in the casing on bracket 387, attached to the base 11. This shaft 386 has a worm 388 meshing with a recessed worm-wheel 389 loosely mounted on a shaft 390, having bearings in the bracket, and provided with a crank 391 connected by a link 392 with the crank 232, heretofore described. The worm wheel and the shaft 390 are connected by a clutch as follows: The shaft 390 has fixed thereto a hub 394 provided with a flange 395 of slightly smaller diameter than the inside diameter of the recess of the worm wheel 389. Arranged on the hub 394, and on opposite sides of the flange 395, are plates 396 and 397. The flange 395 is provided with tapering recesses 398 in which are mounted rolls 399, having pintles 400 mounted for movement in radial slots in the plates 396 and 397. A spring 401 connects the plate 396 with the pin 402 fixed to the flange 395 and travelling in a circumferential slot 403 in the disk 396. This spring tends to move the connected plates 396 and 397, and the rolls 399 thereon, relatively, so as to tend to move the rolls in firm wedging engagement with the inner face of the worm-wheel 389, thereby clutching this worm-wheel to the shaft 390. When such clutching takes place, the motor will drive the shaft 390, so as to cause the crank 391 thereon, during its revolution, to oscillate the crank 232, and to clear the machine in the manner heretofore described.

In order to stop the movement of the crank 232, the plates 396 and 397 are connected by a pin 404, moving in a circumferential slot in the flange 395; the pin carries a roll arranged to be engaged by the end of a stop 405, movable vertically in the bracket 387, and connected with one end of a lever 406, the other end of which is connected by a link 407 with one of a pair of side bars 408, slidably mounted by pin and slot connections on the side plate 12 of the machine, and connected by a cross-bar 409. A spring 410 connected at one end to one of the guide pins 411 on the side plate, and at its other end to a pin 412 connecting the link 407 with the bar 408, normally holds the parts in the position shown in Figure 34, with the stop 405 in the path of the pin 404, thereby holding the clutching means out of engagement and permitting the motor to drive the worm 389 loosely on its driven shaft 390. A second pin 420 (Figure 34) connects the plates 396 and 397, and travels in a circumferential slot in the flange 395 so as to assist the pin 404 to hold the plates together. This pin 420 does not, however, project beyond the plate 397.

When the auditor desires to clear the machine, he will depress the bar 409, which will move the stop 405 out of the path of the pin 404, thereby permitting the springs 401 to throw the rolls 399 into clutching position, so that the motor will now, through the connections heretofore described, oscillate the crank 232 and with it the rock-shaft 230, so as to clear the machine in a manner heretofore described. The auditor will, in practice, give the bar 409 a quick depression and will then release it, this release taking place before the shaft 390 has completed a revolution, so that the stop 405 will have moved into the path of the pin 404, in order that the engagement of this pin with the stop will return the rolls 399 out of clutching engagement with the worm 389. This, therefore, furnishes motor driven mechanism for clearing the machine, and operated upon the depression of a bar or button.

Conclusion.

It will, therefore, be seen that the invention accomplishes its objects. It permits the utilization of the card system, thereby retaining all of its advantages, and providing additional advantages. The auditor can, by the simple depression of a series of keys corresponding to the desired card, immediately isolate this card from the other cards in the tray, and this card can, therefore, not only be quickly found and withdrawn, but can also be quickly replaced. Moreover, the accounts can be quickly and accurately audited without the possibility of a mistake. The invention is adapted to a system containing any number of cards or accounts, without any limit whatsoever.

The method employing this invention is carried out without handling of any cards or accounting elements, except the one to be found and isolated, and therefore, entirely eliminating the fingering of all other cards or accounting elements, except the one to be selected, withdrawn, or replaced. The auditing method is also a great advantage over the preceding methods, in that a lost or misplaced card can be readily found, and its replacement in proper position in the system facilitated without handling of the cards by hand, and in view of the fact that these operations are accomplished in a predetermined and accurate manner, the possibility of mistakes is avoided.

The mechanism is entirely automatic and mechanical in its action, and the accountant is only required to manipulate keys in accordance with, and corresponding to, the element or elements to be selected, which not only facilitates the operations, but also saves wear and reduces soiling of the cards.

On account of the mechanical selection, the cards can be closely packed or stacked, thereby resulting in maximum space efficiency; the unpacking or expanding provisions, however, provide means whereby a card can be readily withdrawn or replaced. The cards themselves are so constructed that they can be isolated without binding, in view of the engagement of the selecting means therewith at spaced points along the cards, and this operation is also advantageously provided for in the construction and arrangement of the pilot elements. The construction of the cards and of the mechanism is such that the number of different cards is reduced to the absolute minimum, for no matter how many cards the system may contain, the number of different cards does not exceed ten.

It will be obvious that various changes may be made in the details of the method or apparatus without departing from the spirit of this invention. It is, therefore, to be understood that this system is not to be limited to the specific details described and shown.

Having thus described the invention, what is claimed is:

1. In an accounting apparatus, the combination with means for selecting accounting elements, of means for controlling said selecting means, adapted to locate a group of said elements and then locate a subdivision of said group.

2. In an accounting apparatus, the combination with means for selecting accounting elements, of means for controlling said selecting means, adapted to locate a unit of said elements and then locate an element of said unit.

3. In an accounting apparatus, the combination with means for selecting accounting elements, of means for controlling said selecting means, adapted to successively locate a group of said elements, a subdivision of said group and a selected element of said subdivision.

4. In an accounting apparatus, the combination with means for selecting accounting elements, of means for controlling said selecting means, adapted to successively locate a unit of said elements and a selected element of said unit, and means for isolating said located element.

5. In an accounting apparatus, the combination with means for selecting accounting elements, of means for controlling said selecting means, adapted to successively locate a group of said elements, a subdivision of said group and a selected element of said subdivision, and means for isolating said located element.

6. In an accounting apparatus, the combination with means for selecting accounting elements, of means for controlling said selecting means, adapted to successively locate a unit of said elements and a selected element of said unit, and means operated upon location of said element adapted to isolate said element.

7. In an accounting apparatus, the combination with means for selecting accounting elements, of means for controlling said selecting means, adapted to successively locate a group of said elements, a subdivision of said group and a selected element of said subdivision, and means operated upon location of said element adapted to isolate said element.

8. In an accounting apparatus, the combination with means for selecting accounting elements, of means for locating said selecting means with respect to a unit of said elements, and means for locating said selecting means with respect to a selected element of said unit.

9. In an accounting apparatus, the combination with means for selecting accounting elements, of means for locating a component of said selecting means related to a group of said elements, and means for locating said component with respect to a selected subdivision of said group.

10. In an accounting apparatus, the combination with means for selecting accounting elements, of means for locating a component of said selecting means related to a group of said elements, means for locating said component with respect to a selected subdivision of said group, and means for locating said component with respect to a selected element of said subdivision.

11. In an accounting apparatus, the combination with means for selecting accounting elements, of means for locating a component of said selecting means related to a unit of said elements, means for locating said component with respect to a selected element of said unit, and means for operating said selecting means adapted and in order to isolate the located element.

12. In an accounting apparatus, the combination with means for selecting accounting elements, of means for locating a component of said selecting means related to a group of said elements, means for locating said component with respect to a selected subdivision of said group, means for locating said component with respect to a selected element of said subdivision, and means for operating said selecting means adapted and in order to isolate the located element.

13. In an accounting apparatus, the combination with means for selecting accounting elements, of means for locating said selecting means with respect to a unit of said elements, and means for locating said selecting means with respect to a selected element of said unit, together with cooperating means adapted to effect isolation of the located element from said unit.

14. In an accounting apparatus, the combination with means for selecting accounting elements, of means for locating a component of said selecting means related to a group of said elements, means for locating said component with respect to a selected subdivision of said group, and means for locating said component with respect to a selected element of said subdivision together with cooperating means adapted to effect isolation of the located element from said subdivision.

15. In an accounting apparatus, the combination with a tray having a series of assembled accounting elements, of means for selectively locating an individual element among a group of said assembled elements, and means for isolating said located element.

16. In an accounting apparatus, the combination with a tray having a series of assembled accounting elements, of means for locating an individual element among a group of said assembled elements, and means operated upon location of said element adapted to isolate said element.

17. In an accounting apparatus, the combination with means for selecting accounting elements, of means for locating said selecting means with respect to an individual element among a group of said elements, and means for operating said selecting means adapted and in order to isolate said located element.

18. In an accounting apparatus, the combination with a group of accounting elements, of selecting means cooperating therewith, means for locating said selecting means adapted to locate an individual element among a group of said elements, and means for isolating said located element.

19. In an accounting apparatus, the combination with a group of accounting elements, of selecting means therefor, said accounting elements being constructed and arranged for individual selection by said selecting means, means for locating said selecting means adapted to locate an individual element among a group of said elements, and means for isolating said located element.

20. In an accounting system, an assembled unit of accounting elements having variant selector-coactable characteristics corresponding respectively to and defining the positions of the elements in the unit.

21. In an accounting system, an assembled group of accounting elements divided into subdivisions, and having variant selector-coactable characteristics, the characteristics in a subdivision corresponding respectively to and defining the positions of the elements therein.

22. In an accounting system, an assemblage of accounting elements divided into groups which are in turn divided into subdivisions and have variant selector-coactable characteristics, the characteristics in a subdivision corresponding respectively to and defining the positions of the elements therein.

23. In an accounting system, an assembled group of accounting elements divided into subdivisions and having variant selector-coactable characteristics, corresponding elements in the several subdivisions having the characteristics thereof in the same relation.

24. In an accounting system, an assemblage of accounting elements divided into groups which are in turn divided into subdivisions and have variant selector-coactable characteristics, corresponding elements in the several subdivisions having the characteristics thereof in the same relation.

25. In an accounting apparatus, the combination with a unit of accounting elements, of a cooperating selector having a thickness equal to the combined thickness of the elements of a unit, said elements having selector-engaging portions at variant positions transversely thereof, constructed and arranged to insure individual selection of a selected element by said selector.

26. In an accounting apparatus, a pair of selectors, means for operating said selectors concurrently, and an accounting element having selector-coactable characteristics adapted for concurrent engagement by said selectors in order to move said element in a direction transverse to a line connecting said characteristics.

27. In an accounting system, an accounting element having spaced selector-coactable characteristics both of which define the position thereof, said characteristics being adapted for selector engagement transversely to a line connecting them.

28. In an accounting apparatus having selecting means, an accounting element having a pair of spaced selector-engaging portions of the same ground of classification, said portions being adapted for selector engagement transversely to a line connecting them.

29. In an accounting apparatus having selecting means, an accounting element having a pair of symmetrically arranged spaced selector-engaging portions both of which define the position thereof.

30. In an accounting apparatus having selecting means, a unit of accounting elements having variant pairs of selector-engaging portions, the portions on an element being of the same ground of classification.

31. In an accounting apparatus having selecting means, a unit of accounting elements having variant pairs of selector-engaging portions, the portions on an element being symmetrically spaced.

32. In an accounting apparatus, the combination with means for selecting accounting elements, of means for locating said selecting means with respect to a unit of said elements, means for locating said selecting means with respect to a selected element of said unit, and keys adapted to control the operation of said locating means.

33. In an accounting apparatus, the combination with means for selecting accounting elements, of means for locating a component of said selecting means related to a group of said elements, means for locating said component with respect to a selected subdivision of said group, and keys adapted to control the operation of said locating means.

34. In an accounting apparatus, the combination with means for selecting accounting elements, of means for locating a component of said selecting means related to a group of said elements, means for locating said component with respect to a selected subdivision of said group, means for locating said component with respect to a selected element of said subdivision, and keys adapted to control the operation of said locating means.

35. In an accounting apparatus, the combination with means for selecting accounting elements, of means for locating said selecting means with respect to a unit of said elements, means for locating said selecting means with respect to a selected element of said unit, and means adapted to control the operation of said locating means, including a key adapted to control the operation of all corresponding locating means of both orders.

36. In an accounting apparatus, the combination with means for selecting accounting elements, of means for locating a component of said selecting means related to a group of said elements, means for locating said component with respect to a selected subdivision of said group, and means adapted to control the operation of said locating means, including a key adapted to control the operation of all corresponding locating means of both orders.

37. In an accounting apparatus, the combination with means for selecting accounting elements, of means for locating a component of said selecting means related to a group of said elements, means for locating said component with respect to a selected subdivision of said group, means for locating said component with respect to a selected element of said subdivision, and means adapted to control the operation of said locating means, including a key adapted to control the operation of all corresponding locating means of the three orders.

38. In an accounting apparatus, the combination with means for selecting accounting elements, of means for locating said selecting means with respect to a unit of said elements, means for locating said selecting means with respect to a selected element of said unit, and controlling means adapted to cooperate with said locating means successively.

39. In an accounting apparatus, the combination with means for selecting accounting elements, of means for locating a component of said selecting means related to a group of said elements, means for locating said component with respect to a selected subdivision of said group, and controlling means adapted to cooperate with said locating means successively.

40. In an accounting apparatus, the combination with means for selecting accounting elements, of means for locating a component of said selecting means related to a group of said elements, means for locating said component with respect to a selected subdivision of said group, means for locating said component with respect to a selected element of said subdivision, and controlling means adapted to cooperate with said locating means.

41. In an accounting apparatus, the combination with means for selecting accounting elements, of means for locating said selecting means with respect to a unit of said elements, means for locating said selecting means with respect to a selected element of said unit, a set of keys adapted to control the operation of said locating means, and means adapted to cause said keys to cooperate with said locating means.

42. In an accounting apparatus, the combination with means for selecting accounting elements, of means for locating a component for said selecting means related to a group of said elements, means for locating said component with respect to a selected subdivision of said group, a set of keys adapted to control the operation of said locating means, and means adapted to cause said keys to cooperate with said locating means.

43. In an accounting apparatus, the combination with means for selecting accounting elements, of means for locating a component of said selecting means related to a group of said elements, means for locating said component with respect to a selected subdivision of said group, means for locating said component with respect to a selected element of said subdivision, a set of keys adapted to control the operation of said locating means, and means adapted to cause said keys to cooperate with said locating means.

44. In an accounting apparatus, the combination with a tray having assembled accounting elements therein, of means for locating a plurality of accounting elements, and means for controlling said selecting means adapted to select an individual element among said elements, and adapted to leave the remaining elements undisturbed.

45. In an accounting apparatus, the combination with a tray having assembled accounting elements therein, of means, for locating a plurality of accounting elements, and means for controlling said selecting means adapted to select an individual element corresponding to a single ground of classification among said elements, and adapted to leave the remaining elements undisturbed.

46. In an accounting apparatus, the combination with means for selecting accounting elements, of means for locating said selecting means adapted to locate an individual element among a group of said elements, and means for isolating said located element by a movement in one direction.

47. In an accounting apparatus, employing accounting elements and pilot elements, the combination with means for selecting pilot elements, of means for controlling said selecting means adapted to select an individual pilot element among a group of said elements.

48. In an accounting apparatus employing accounting elements and pilot elements, the combination with means for selecting pilot elements, of means for locating said selecting means adapted to locate a pilot element among a group of said pilot elements, and means for isolating said located pilot element.

49. In an accounting apparatus employing accounting elements and pilot elements, the combination with means for selecting pilot elements, of means for controlling said selecting means adapted to select and isolate a pilot element from the accounting elements.

50. In an accounting apparatus employing accounting elements and pilot elements, the combination with means for selecting pilot elements, of means for locating a component of said selecting means related to a group of said pilot elements, and means for locating said component with respect to a selected pilot element of said group.

51. In an accounting apparatus employing accounting elements and pilot elements, the combination with means for selecting pilot elements, of means for locating a component of said selecting means related to a group of said pilot elements, means for locating said component with respect to a selected pilot element of said group, and means for isolating said selected pilot element.

52. In an accounting apparatus employing accounting elements and pilot elements, the combination with means for selecting pilot elements, of means for locating a component of said selecting means related to a group of said elements, means for locating said component with respect to a selected element of said group, and keys adapted to control the operation of said locating means.

53. In an accounting apparatus employing accounting elements and pilot elements, the combination with means for selecting pilot elements, of means for locating a component of said selecting means related to a group of said elements, means for locating said component with respect to a selected element of said group, and means adapted to control the operation of said locating means, including a key adapted to control the operation of all locating means of the same order.

54. In an accounting apparatus employing accounting elements and pilot elements, the combination with means for selecting pilot elements, of means for locating a component of said selecting means related to a group of said elements, means for locating said component with respect to a selected element of said group, and controlling means adapted to cooperate with said locating means successively.

55. In an accounting apparatus employing accounting elements and pilot elements, the combination with means for selecting pilot elements, of means for locating a component of said selecting means related to a group of said elements, means for locating said component with respect to a selected element of said group, a set of keys adapted to control the operation of said locating means, and means adapted to cause said keys to cooperate with said locating means successively.

56. In an accounting apparatus employing accounting elements and pilot elements, the combination with means for selecting pilot elements, of means for controlling said selecting means adapted to locate a group of said elements and then locate an element of said group.

57. In an accounting apparatus employing accounting elements and pilot elements, the combination with selecting means, of means for controlling said selecting means, adapted to select an accounting element and its corresponding pilot element.

58. In an accounting apparatus employing accounting elements and pilot elements, the combination with selecting means, of means for controlling said selecting means, adapted to select an accounting element and its corresponding pilot element, and means for isolating the selected pilot element.

59. In an accounting apparatus employing accounting elements and pilot elements, the combination with selecting means of means for controlling said selecting means, adapted to select an accounting element and its corresponding pilot element, and means for isolating the selected accounting element and its corresponding pilot element.

60. In an accounting apparatus employing accounting elements and pilot elements, the combination with selecting means, of means for controlling said selecting means, adapted to select an accounting element and its corresponding pilot element, and means for isolating the selected accounting element and its corresponding pilot element, adapted to isolate the pilot element from the accounting element.

61. In an accounting apparatus employing accounting elements and pilot elements, the combination with selecting means, of means for controlling said selecting means, adapted to locate a unit of said accounting elements, and a pilot element for said unit.

62. In an accounting apparatus employing accounting elements and pilot elements, the combination with selecting means, of means for controlling said selecting means, adapted to locate a unit of said accounting elements and a pilot element for said unit, and adapted to then locate an accounting element of said unit.

63. In an accounting apparatus employing accounting elements and pilot elements, the combination with selecting means, of means for controlling said selecting means, adapted to locate a unit of said accounting elements and a pilot element for said unit, and means for isolating said pilot element.

64. In an accounting apparatus employing accounting elements and pilot elements, the combination with selecting means, of means for controlling said selecting means, adapted to locate a unit of said accounting elements and a pilot element for said unit, and adapted to then locate an accounting element of said unit, and means for isolating said located elements.

65. In an accounting apparatus employing accounting elements and pilot elements, the combination with selecting means, of means for controlling said selecting means, adapted to locate a unit of said accounting elements and a pilot element for said unit, and adapted to then locate an accounting element of said unit, and means for isolating said located elements, adapted to isolate said pilot element from said accounting element.

66. In an accounting apparatus employing accounting elements and pilot elements, the combination with selecting means, of means for controlling said selecting means, adapted to locate a group of said accounting elements, and adapted to then locate a subdivision together with a pilot element of said subdivision.

67. In an accounting apparatus employing accounting elements and pilot elements, the combination with selecting means, of means for controlling said selecting means, adapted to locate a group of said accounting elements together with its pilot elements, and adapted to then locate a subdivision of said group of accounting elements together with a pilot element of said subdivision.

68. In an accounting apparatus employing accounting elements and pilot elements, the combination with selecting means, of means for controlling said selecting means, adapted to successively locate a group of said accounting elements, a subdivision of said group together with a pilot element of said subdivision, and a selected accounting element together with a pilot element of said subdivision.

69. In an accounting apparatus employing accounting elements and pilot elements, the combination with selecting means, of means for controlling said selecting means, adapted to successively locate a group of said accounting and pilot elements, a subdivision of said group together with a pilot element of said subdivision, and a selected accounting element of said subdivision.

70. In an accounting apparatus employing accounting elements and pilot elements, the combination with selecting means, of means for controlling said selecting means, adapted to successively locate a group of said accounting elements, a subdivision of said group together with a pilot element of said subdivision, and a selected accounting element of said subdivision, and means for isolating said located accounting and pilot elements.

71. In an accounting apparatus employing accounting elements and pilot elements, the combination with selecting means, of means for controlling said selecting means, adapted to successively locate a group of said accounting and pilot elements, a subdivision of said group together with a pilot element of said subdivision, and a selected accounting element of said subdivision and means for isolating said located accounting and pilot elements.

72. In an accounting apparatus employing accounting elements and pilot elements, the combination with selecting means, of means for locating said selecting means with respect to a group of said accounting elements and with respect to a pilot element of said group, and means for locating said selecting means with respect to a selected accounting element of said group.

73. In an accounting apparatus employing accounting elements and pilot elements, the combination with selecting means, of means for locating a component of said selecting means related to a group of said accounting and pilot elements, and means for locating said component with respect to a subdivision of said group and with respect to a pilot element of said subdivision.

74. In an accounting apparatus employing accounting elements and pilot elements, the combination with selecting means, of means for locating a component of said selecting means related to a group of said accounting and pilot elements, and means for locating said component with respect to a subdivision of said group and with respect to a pilot element of said subdivision, and means for locating said component with respect to a selected accounting element of said subdivision.

75. In an accounting apparatus employing accounting elements and pilot elements, the combination with selecting means, of means for locating said selecting means with respect to a unit of said accounting elements and with respect to a pilot element of said unit, means for locating said selecting means with respect to a selected accounting element of said unit, and means for isolating said selected accounting and pilot elements.

76. In an accounting apparatus employing accounting elements and pilot elements, the combination with selecting means, of means for locating a component of said selecting means related to a group of said accounting and pilot elements, means for locating said component with respect to a subdivision of said group and with respect to a pilot element of said subdivision, and means for isolating said located pilot element.

77. In an accounting apparatus employing accounting elements and pilot elements, the combination with selecting means, of means for locating a component of said selecting means related to a group of said accounting and pilot elements, means for locating said component with respect to a subdivision of said group and with respect to a pilot element of said subdivision, means for locating said component with respect to a selected accounting element of said subdivision, and means for isolating said located accounting and pilot elements.

78. In an accounting apparatus, the combination with means for selecting accounting elements, of means for setting and operating said selecting means adapted and in order to select an element or elements, and means for returning said selecting means adapted to clear the apparatus.

79. In an accounting apparatus, the combination with means for selecting acocunting elements, of means for setting and operating said selecting means, adapted and in order to isolate an accounting element, and means for returning said selecting means, adapted to clear the apparatus.

80. In an accounting apparatus, the combination with means for selecting accounting elements, of keys connected to set said selecting means so as to select an accounting element, and means for returning said selecting means, adapted to clear the apparatus.

81. In an accounting apparatus, the combination with means for selecting accounting elements, of keys connected to set and operate said selecting means to select an accounting element, adapted and in order to isolate an accounting element, and means for returning the said selecting means, adapted to clear the apparatus.

82. In an accounting apparatus employing accounting elements and pilot elements, of selecting means, keys connected to set and operate said selecting means adapted and in order to select a pilot element, and means for returning said selecting means, adapted to clear the apparatus.

83. In an accounting apparatus employing accounting elements and pilot elements, of selecting means, keys connected to set and operate said selecting means to select a pilot element, adapted and in order to isolate an accounting element, and means for returning said selecting means, adapted to clear the apparatus.

84. In an accounting apparatus, the combination with means for selecting accounting elements, of keys connected to set said selecting means to select an accounting element and a pilot element, and means for returning said selecting means, adapted to clear the apparatus.

85. In an accounting apparatus, the combination with means for selecting accounting elements, of keys connected to set and operate said selecting means to select an accounting element and a pilot element, adapted and in order to isolate an accounting element, and means for returning said selecting means, adapted to clear the apparatus.

86. In an accounting apparatus, the combination with a series of trays for accounting elements, of a carrier adapted to cooperate with said trays, and means on said carrier, adapted to select accounting elements when in cooperative relation with one of said trays.

87. In an accounting apparatus, the combination with a series of trays for accounting elements, of a carrier adapted to cooperate with said trays, and means on said carrier, adapted to select an accounting element among the elements in a selected tray.

88. In an accounting apparatus, the combination with a series of trays for accounting elements, of a carrier adapted to cooperate with said trays, and means on said carrier, adapted to select a group of accounting elements among the elements in a selected tray.

89. In an accounting apparatus, the combination with a series of trays for accounting elements, of a carrier adapted to cooperate with said trays, and means on said carrier, adapted to locate a group of accounting elements in a selected tray and then locate an element in said group.

90. In an accounting apparatus, the combination with a series of trays for accounting elements, of a carrier adapted to cooperate with said trays, and means on said carrier, adapted to locate a group of accounting elements in a selected tray and then locate a subdivision of said group.

91. In an accounting apparatus, the combination with a series of trays for accounting elements, of a carrier adapted to cooperate with said trays, and means on said carrier, adapted to successively locate a group of accounting elements in a selected tray, a subdivision of said group and a selected element of said subdivision.

92. In an accounting apparatus, the combination with a series of trays for accounting elements, of a carrier adapted to cooperate with said trays, means on said carrier, adapted to select accounting elements when in cooperative relation with one of said trays, and means for positioning said carrier in cooperative relation with one of said trays.

93. In an accounting apparatus, the combination with a series of trays for accounting elements, of a carrier adapted to cooperate with said trays, means on said carrier, adapted to successively locate a group of accounting elements in a selected tray, a subdivision of said group and a selected element of said subdivision, and means for positioning said carrier in cooperative relation with a selected tray.

94. In an accounting apparatus having selecting means, an accounting element having a pair of selector-engaging portions corresponding to a single ground of classification.

95. In an accounting apparatus having selecting means, an accounting element having selector-engaging means constructed and arranged to permit reversal of said element while maintaining said selector-engaging means in proper cooperative relation with respect to the selecting means.

96. In an accounting apparatus having selecting means, an accounting element having a pair of selector-engaging portions constructed and arranged to permit operative reversal of said element in the apparatus.

97. In an accounting apparatus having selecting means, an accounting element having a pair of selector-engaging portions corresponding to a single ground of classification, constructed and arranged to permit operative reversal of said element in the apparatus.

98. In an accounting apparatus having selecting means, an accounting element having a pair of symmetrically arranged spaced selector-engaging portions, constructed and arranged to permit operative reversal of said element in the apparatus.

99. In an accounting apparatus having selecting means, a unit of accounting elements having variant selector-engaging portions, constructed and arranged to permit operative reversal of an element with respect to the selecting means.

100. In an accounting apparatus having selecting means, an assembled unit of accounting elements having variant pairs of selector-engaging portions corresponding respectively to the positions of the elements in said unit.

101. In an accounting apparatus having selecting means, a unit of accounting elements having variant pairs of selector engaging portions, the pair of selector-engaging portions on an element being constructed and arranged to permit operative reversal of an element with respect to the selecting means.

102. In an accounting apparatus having selecting means, a unit of accounting elements having variant pairs of symmetrically arranged spaced selector-engaging portions, constructed and arranged to permit operative reversal of an element with respect to the selecting means.

103. In an accounting apparatus having selecting means, a unit of accounting elements having variant pairs of selector-engaging portions, the pair of selector-engaging portions on an element corresponding to a single ground of classification, and the selector-engaging portions being constructed and arranged to permit operative reversal of an element with respect to the selecting means.

104. In an accounting apparatus having selecting means, a pilot element having means adapted for engagement by the selecting means.

105. In an accounting apparatus having selecting means, a pilot element having a pair of selector-engaging portions.

106. In an accounting apparatus having selecting means, a unit of accounting elements and a pilot element for said unit, said elements having means adapted for engagement by the selecting means.

107. In an accounting apparatus having selecting means, a unit of accounting elements and a pilot element for said unit, said accounting elements having variant selector-engaging portions, and said pilot element having invariant selector-engaging means.

108. In an accounting apparatus having selecting means including selectors, a unit of accounting elements and a pilot element for said unit, said accounting elements being adapted for engagement by corresponding selectors, and said pilot element being adapted for engagement by corresponding selectors.

109. In an accounting apparatus having selecting means, a unit of accounting elements and a pilot element for said unit, said accounting elements having variant pairs of selector-engaging portions, and said pilot element having a pair of selector engaging portions.

110. In an accounting apparatus having a tray, a series of selector-coactable pilot elements, and means for mounting said elements for movement in spaced relation in said tray.

111. In an accounting apparatus having a tray, a series of selector-coactable pilot elements, means for mounting said elements for movement in spaced relation in said tray, and units of accounting elements arranged between said pilot elements.

112. In an accounting apparatus having a tray, a series of pilot elements, means for mounting said elements in fixed spaced relation in the tray, and units of accounting elements arranged between said pilot elements, said accounting elements having variant selector-engaging portions.

113. In an accounting apparatus having selecting means, a series of pilot elements, and means for mounting said elements in spaced relation in cooperative relation with respect to said selecting means.

114. In an accounting apparatus having selecting means, a series of pilot elements, and means for mounting said elements in spaced relation in cooperative relation with respect to said selecting means, and units of accounting elements arranged between said pilot elements.

115. In an accounting apparatus having selecting means, a series of spaced pilot elements, means for mounting said elements in spaced relation and in cooperative relation with respect to said selecting means, and units of accounting elements arranged between said pilot elements, in cooperative relation with respect to said selecting means.

116. In an accounting apparatus having selecting means, a tray, a series of pilot elements arranged in fixed spaced relation therein, and units of accounting elements in said tray having variant selector-engaging portions.

117. In an accounting apparatus having selecting means, a tray, a series of pilot elements arranged in fixed spaced relation therein, and units of accounting elements in said tray having variant selector engaging portions, each of said pilot elements having selector-engaging portions.

118. The method of finding accounts mechanically, comprising the following successive steps; viz: locating a group of accounting elements containing the account, locating in the located group the accounting element containing the account, and isolating the located accounting element.

119. The method of finding accounts mechanically, comprising the following successive steps, viz: locating a group of accounting elements containing the account, locating in the located group the subdivision containing the account, and isolating the located subdivision.

120. The method of finding accounts mechanically, comprising the following successive steps, viz: locating a group of accounting elements containing the account, locating in the located group the subdivision containing the account, locating in said located subdivision the accounting element containing the account, and isolating the located accounting element.

121. The method of finding accounts mechanically, comprising the following successive steps, viz: locating a group of accounting elements containing the account, and the pilot element of that group, and isolating the located pilot element.

122. The method of finding accounts mechanically, comprising the following successive steps, viz: locating a group of accounting elements containing the account, and the pilot element of that group, locating in the located group the accounting element containing the account, and isolating the located pilot and accounting elements.

123. The method of finding accounts mechanically, comprising the following successive steps, viz: locating a group of accounting elements containing the account, and the pilot elements of that group, locating in the located group the subdivision thereof containing the account and the pilot element of that subdivision, and isolating the located pilot element.

124. The method of finding accounts mechanically, comprising the following successive steps, viz: locating a group of accounting elements containing the account, locating in the located group the subdivision thereof containing the account and the pilot element of that subdivision, locating in the located subdivision the accounting element containing the account, and isolating the located pilot and accounting elements.

125. The method of finding and replacing accounts, comprising the following successive steps, viz: locating by mechanical means a unit of accounting elements containing the account, similarly locating in and manually withdrawing from the located unit the accounting element containing the account, relocating the located position of the unit, and manually returning to the relocated unit the withdrawn accounting element.

126. The method of finding and replacing accounts, comprising the following successive steps, viz: locating by mechanical means a group of accounting elements containing the account, similarly locating in the located group the subdivision containing the account, similarly locating in and manually withdrawing from the located subdivision the accounting element containing the account, relocating the subdivision, and manually returning to the relocated subdivision the withdrawn accounting element.

127. The method of finding and replacing accounts, comprising the following successive steps, viz: locating by mechanical means a unit of accounting elements containing the account, similarly locating in the located unit the accounting element containing the account, identifying the located unit, manually withdrawing the located accounting element, and manually returning to the identified unit the withdrawn accounting element.

128. The method of finding and replacing accounts, comprising the following successive steps, viz: locating by mechanical means a group of accounting elements containing the account, similarly locating in the located group the subdivision containing the account, similarly locating in the located subdivision the accounting element containing the account, identifying the located subdivision manually, withdrawing the located accounting element, and manually returning to the identified subdivision the withdrawn accounting element.

129. The method of finding and replacing accounts, comprising the following successive steps, viz: locating by mechanical means a unit of accounting elements containing the account, and the pilot element of that unit, similarly locating in the located unit the accounting element containing the account, isolating the located pilot and accounting elements, manually withdrawing the isolated accounting element, and manually returning to the unit the withdrawn accounting element.

130. The method of finding and replacing accounts, comprising the following successive steps, viz: locating by mechanical means a group of accounting elements and the pilot elements of that group, similarly locating in the located group the subdivision of accounting elements containing the account, and the pilot element of that subdivision, similarly locating in the located subdivision the accounting element containing the account, isolating the located pilot and accounting elements, manually withdrawing the isolated accounting element, and manually returning to the isolated subdivision the withdrawn accounting element.

131. In an accounting apparatus, the combination with means for selecting accounting elements adapted to cooperate with an accounting element at spaced points, of means for locating said selecting means with respect to an individual element among a unit of said elements, and means for isolating said located element.

132. In an accounting apparatus, the combination with means for selecting accounting elements adapted to cooperate with an accounting element at spaced points, of means for locating said selecting means with respect to an individual element among a unit of said elements, and means for actuating said selecting means, adapted and in order to isolate said located element.

133. In an accounting apparatus, the combination with means for selecting accounting elements adapted to cooperate with an accounting element at spaced points, of means for locating said selecting means with respects to a unit of said elements, and means for locating said selecting means with respect to a selected element of said unit.

134. In an accounting apparatus, the combination with means for selecting accounting elements adapted to cooperate with each accounting element at spaced points, of means for locating a component of said selecting means related to a group of said elements, and means for locating said component with respect to a selected subdivision of said group.

135. In an accounting apparatus, the combination with means for selecting accounting elements adapted to cooperate with each accounting element at spaced points, of means for locating a component of said selecting means related to a group of said elements, means for locating said component with respect to a selected subdivision of said group, and means for locating said component with respect to a selected element of said subdivision.

136. In an accounting apparatus, the combination with means for selecting accounting elements adapted to cooperate with an accounting element at spaced points, of means for locating said selecting means with respect to a unit of said elements, means for locating said selecting means with respect to a selected element of said unit, and means for actuating said selecting means, adapted and in order to isolate said located element.

137. In an accounting apparatus, the combination with means for selecting accounting elements adapted to cooperate with each accounting element at spaced points, of means for locating a component of said selecting means related to a group of said elements, means for locating said component with respect to a group of said elements, means for locating said component with respect to selected subdivision of said group, means for locating said component with respect to a selected element of said subdivision, and means for actuating said selecting means, adapted to isolate said located element.

138. In an accounting apparatus, the combination with a selector for accounting elements, of means for positioning said selector to cooperate with an individual element among an assembled unit of said elements, including selective manipulative means adapted to predetermine the position of said selector, and means for actuating said selector, adapted and in order to isolate said element.

139. In an accounting apparatus, the combination with a selector for accounting elements, of means for positioning said selector to cooperate with a unit of said elements, and means for positioning said selector to cooperate with an element of said unit.

140. In an accounting apparatus, the combination with a selector for accounting elements, of means for rendering said selector effective with respect to a group of said elements, of means for positioning said selector to cooperate with a subdivision of said group, and means for positioning said selector to cooperate with an element of said subdivision.

141. In an accounting apparatus, the combination with a selector for accounting elements, of means for positioning said selector to cooperate with a unit of said elements, means for positioning said selector to cooperate with an element of said unit, and means for actuating said selector, adapted and in order to isolate said element.

142. In an accounting apparatus, the combination with a selector for accounting elements, of means for rendering said selector effective with respect to a group of said elements, means for positioning said selector to cooperate with a subdivision of said group, means for positioning said selector to cooperate with an element of said subdivision, and means for actuating said selector, adapted and in order to isolate said element.

143. In an accounting apparatus, the combination with a pair of selectors adapted to cooperate with an accounting element at spaced points, of means for positioning said selectors to cooperate with an individual element among a unit of said elements, and means for actuating said selectors, adapted and in order to isolate said element.

144. In an accounting apparatus, the combination with a pair of selectors adapted to cooperate with an accounting element at spaced points, of means for positioning said selectors to cooperate with a unit of said elements, and means for positioning said selectors to cooperate with an element of said unit.

145. In an accounting apparatus, the combination with a pair of selectors adapted to cooperate with an accounting element at spaced points, means for rendering said selectors effective with respect to a group of said elements, means for positioning said selector to cooperate with a subdivision of said group, and means for positioning said selectors to cooperate with an element of said subdivision.

146. In an accounting apparatus, the combination with a pair of selectors adapted to cooperate with an accounting element at spaced points, of means for positioning said selectors to cooperate with a unit of said elements, means for positioning said selectors to cooperate with an element of said unit, and means for actuating said selectors, adapted and in order to isolate said element.

147. In an accounting apparatus, the combination with a pair of selectors adapted to cooperate with an accounting element at spaced points, means for rendering said selectors effective with respect to a group of said elements, means for positioning said selectors to cooperate with a subdivision of said group, means for positioning said selectors to cooperate with an element of said subdivision, and means for actuating said selectors, adapted and in order to isolate said element.

148. In an accounting apparatus, the combination with a selector for accounting elements, of means for adjusting said selector to cooperate with a unit of said elements, and means for adjusting said selector along an element of said unit to cooperate with said element.

149. In an accounting apparatus, the combination with a selector for accounting elements, of means for rendering said selector effective to cooperate with a group of said elements, means for adjusting said selector to cooperate with a subdivision of said group, and means for adjusting said selector along an element of said subdivision to cooperate with said element.

150. In an accounting apparatus, the combination with a selector for accounting elements, of means for adjusting said selector to cooperate with a unit of said elements, means for adjusting said selector along an element of said unit to cooperate with said element, and means for actuating said selector, adapted and in order to isolate said element.

151. In an accounting apparatus, the combination with a selector for accounting elements, of means for rendering said selector effective to cooperate with a group of said elements, means for adjusting said selector to cooperate with a subdivision of said group, means for adjusting said selector along an element of said subdivision to cooperate with said element, and means for actuating said selector, adapted and in order to isolate said element.

152. In an accounting apparatus, the combination with a selector for accounting elements, of means for adjusting said selector along the assembled elements in order to cooperate with a unit of said elements, and means for adjusting said selector along an element of said unit in order to cooperate with said element.

153. In an accounting apparatus, the combination with a selector for accounting elements, of means for adjusting said selector along the assembled elements in order to cooperate with a unit of said elements, means for adjusting said selector along an element of said unit to cooperate with said element, and means for actuating said selector, adapted and in order to isolate said element.

154. In an accounting apparatus, the combination with a pair of selectors adapted to cooperate with an accounting element at spaced points, of means for adjusting said selectors relatively in order to cooperate with an element among a unit of said elements.

155. In an accounting apparatus, the combination with a pair of selectors adapted to cooperate with an accounting element at spaced points, of means for adjusting said selectors along an element of a unit of elements in order to cooperate with said element.

156. In an accounting apparatus, the combination with a pair of selectors adapted to cooperate with an accounting element at spaced points, of means for adjusting said selectors along the assembled elements in order to cooperate with a unit of said elements, and means for adjusting said selectors along an element of said unit in order to cooperate with said element.

157. In an accounting apparatus, the combination with a pair of selectors adapted to cooperate with an accounting element at spaced points, of means for adjusting said selectors jointly to cooperate with a unit of said elements, and means for adjusting said selectors relatively to cooperate with an element of said unit.

158. In an accounting apparatus, the combination with a pair of selectors adapted to cooperate with an accounting element at spaced points, of means for adjusting said selectors jointly along the assembled elements to cooperate with a unit of said elements, and means for adjusting said selectors relatively along said unit to cooperate with an element of said unit.

159. In an accounting apparatus, the combination with a pair of selectors adapted to cooperate with an accounting element at spaced points, of means for adjusting said selectors relatively in order to cooperate with an element among a unit of said elements and means for actuating said selectors, adapted and in order to isolate said element.

160. In an accounting apparatus, the combination with a pair of selectors adapted to cooperate with an accounting element at spaced points, of means for adjusting said selectors along an element of a unit of elements in order to cooperate with said element, and means for actuating said selectors, adapted and in order to isolate said element.

161. In an accounting apparatus, the combination with a pair of selectors adapted to cooperate with an accounting element at spaced points, of means for adjusting said selectors jointly along the assembled elements to cooperate with a unit of said elements, means for adjusting said selectors relatively along said unit to cooperate with an element of said unit, and means for actuating said selectors, adapted and in order to isolate said element.

162. In an accounting apparatus, the combination with a selector for accounting elements, of means for adjusting said selector along the assembled elements, means for adjusting said selector along an element, and means for actuating said selector.

163. In an accounting apparatus, the combination with a selector for accounting elements, of means for rendering said selector effective, means for adjusting said selector along the assembled elements, means for adjusting said selector along an element, and means for actuating said selector.

164. In an accounting apparatus, the combination with a pair of selectors adapted to cooperate with an accounting element at spaced points, of means for adjusting said selectors along the assembled elements, means for adjusting the selectors along an element, and means for acuating said selectors.

165. In an accounting apparatus, the combination with a pair of selectors adapted to cooperate with an accounting element at spaced points, of means for rendering said selectors effective, means for adjusting said selectors along the assembled elements, means for adjusting said selectors along an element, and means for actuating said selectors.

166. In an accounting apparatus, the combination with a pair of selectors adapted to cooperate with an accounting element at spaced points, of means for adjusting said selectors relatively along an element, and means for actuating said selectors.

167. In an accounting apparatus, the combination with a pair of selectors adapted to cooperate with an accounting element at spaced points, of means for adjusting said selectors jointly, means for adjusting said selectors relatively, and means for actuating said selectors.

168. In an accounting apparatus, the combination with a pair of selectors adapted to cooperate with an accounting element at spaced points, of means for adjusting said selectors jointly along the assembled elements, and means for adjusting said selectors relatively along an element, and means for actuating said selectors.

169. In an accounting apparatus, the combination with a pair of selectors adapted to cooperate with an accounting element at spaced points, of means for rendering said selectors effective, means for adjusting said selectors relatively along an element, and means for actuating said selectors.

170. In an accounting apparatus, the combination with a pair of selectors adapted to cooperate with an accounting element at spaced points, of means for rendering said selectors effective, means for adjusting said selectors jointly, means for adjusting said selectors relatively, and means for actuating said selectors.

171. In an accounting apparatus, the combination with selectors adapted for cooperation with accounting elements and pilot elements, of means for adjusting said selectors, and means for actuating said selectors.

172. In an accounting apparatus, the combination with selectors adapted for cooperation with accounting elements and pilot elements, of means for rendering said selectors effective, means for adjusting said selectors, and means for actuating said selectors.

173. In an accounting apparatus, the combination with selectors adapted for cooperation with accounting elements and pilot elements, of means for jointly adjusting said selectors, means for adjusting said accounting element selector, and means for actuating said selectors.

174. In an accounting apparatus, the combination with selectors adapted for cooperation with accounting elements and pilot elements, of means for rendering said selectors effective, means for jointly adjusting said selectors, means for adjusting said accounting element selector, and means for actuating said selectors.

175. In an accounting apparatus, the combination with selectors adapted for cooperation with accounting elements and pilot elements, of means for adjusting said selectors along the assembled elements, and means for actuating said selectors.

176. In an accounting apparatus, the combination with selectors adapted for cooperation with accounting elements and pilot elements, of means for jointly adjusting said selectors along the assembled elements, means for adjusting said accounting element selector along an element, and means for actuating said selectors.

177. In an accounting apparatus, the combination with selectors adapted for cooperation with accounting elements and pilot elements at spaced points along an element, of means for adjusting said accounting element selectors, and means for actuating said pilot and accounting element selectors.

178. In an accounting apparatus, the combination with selectors, adapted for cooperation with accounting elements and pilot elements at spaced points along an element, of means for jointly adjusting said selectors, means for adjusting said accounting element selectors relatively, and means for actuating said selectors.

179. In an accounting apparatus, the combination with a series of selectors for accounting elements, of means for rendering a chosen selector effective, and means for actuating said selector.

180. In an accounting apparatus, the combination with a series of selectors for accounting elements, of means for rendering a chosen selector effective, means for adjusting said selector, and means for actuating said selector.

181. In an accounting apparatus, the combination with a series of selectors for accounting elements, of means for rendering a chosen selector effective, means for adjusting said selector along the assembled elements, and means for actuating said selector.

182. In an accounting apparatus, the combination with a series of selectors for accounting elements, of means for rendering a chosen selector effective, means for adjusting said selector along an element, and means for actuating said selector.

183. In an accounting apparatus, the combination with a series of selectors for accounting elements, of means for rendering a chosen selector effective, means for adjusting said selector along the assembled elements, means for adjusting said selector along an element, and means for actuating said selector.

184. In an accounting apparatus, the combination with a series of selectors for accounting elements, of means for rendering a chosen selector effective, means for adjusting said selector in accordance with one denomination, means for adjusting said selector in accordance with another denomination, and means for actuating said selector.

185. In an accounting apparatus, the combination with a series of selectors for accounting elements, of means for adjusting said selectors, and means for rendering a chosen selector effective for actuation.

186. In an accounting apparatus, the combination with a series of selectors for accounting elements, of means for adjusting said selectors along the assembled elements, and means for rendering a chosen selector effective for actuation.

187. In an accounting apparatus, the combination with a series of selectors for accounting elements, of means for adjusting said selectors along individual elements, and means for rendering a chosen selector effective for actuation.

188. In an accounting apparatus, the combination with a series of selectors for accounting elements, of means for adjusting said selectors along the assembled elements, means for adjusting said selectors along individual elements, and means for rendering a chosen selector effective for actuation.

189. In an accounting apparatus, the combination with a series of pairs of selectors for accounting elements, of means for rendering a chosen selector pair effective, and means for actuating said selector pair.

190. In an accounting apparatus, the combination with a series of pairs of selectors for accounting elements, of means for rendering a chosen selector pair effective, means for adjusting said selector pair, and means for actuating said selector pair.

191. In an accounting apparatus, the combination with a series of pairs of selectors for accounting elements, of means for rendering a chosen selector pair effective, means for adjusting the selectors of a pair relatively, and means for actuating said selector pair.

192. In an accounting apparatus, the combination with a series of pairs of selectors for accounting elements, of means for rendering a chosen selector pair effective, means for adjusting the said selector pair, means for adjusting the selectors of a pair relatively, and means for actuating said selector pair.

193. In an accounting apparatus, the combination with a series of pairs of selectors for accounting elements, of means for adjusting said selector pairs, and means for rendering a chosen selector pair effective for operation.

194. In an accounting apparatus, the combination with a series of pairs of selectors for accounting elements, of means for adjusting said selector pairs, means for adjusting the selectors of a pair relatively, and means for rendering a chosen selective pair effective for operation.

195. In an accounting apparatus, the combination with a series of pairs of selectors for accounting elements, of actuators for said respective pairs of selectors, and means for rendering a chosen actuator effective.

196. In an accounting apparatus, the combination with a series of pairs of selectors for accounting elements, of actuators for said respective pairs of selectors, means for rendering a chosen actuator effective on a chosen pair of selectors, and means for adjusting said selectors.

197. In an accounting apparatus, the combination with a series of pairs of selectors for accounting elements, of actuators for said respective pairs of selectors, means for rendering a chosen actuator effective on a chosen pair of selectors, means for adjusting said pair of selectors along the assembled elements, and means for adjusting said pair of selectors along an element.

198. In an accounting apparatus, the combination with a series of pairs of selectors for accounting elements, of actuators for said respective pairs of selectors, means for adjusting said selectors, and means for rendering a chosen actuator effective.

199. In an accounting apparatus, the combination with a series of pairs of selectors for accounting elements, of actuators for said respective pairs of selectors, means for adjusting said selectors along the assembled elements, means for adjusting said selectors along an element, and means for rendering a chosen actuator effective.

200. In an accounting apparatus, the combination with actuating means, of means for selecting accounting elements, means for adjusting the same, and means for controlling said selecting means and its actuating means, adapted to insure completion of the adjustment of said selecting means prior to the actuation thereof by said actuating means.

201. In an accounting apparatus, the combination with actuating means, of means for selecting accounting elements, means for adjusting the same, and means adapted to insure completion of the adjustment of said selecting means prior to the actuation thereof by said actuating means.

202. In an accounting apparatus, the combination with means for selecting accounting elements, of actuating means therefor, means for adjusting said selecting means in successive steps, and means adapted to insure final adjustment of said selecting means prior to the actuation thereof by said actuating means.

203. In an accounting apparatus, the combination with means for selecting accounting elements, of actuating means therefor, means for adjusting said selecting means in accordance with successive denominations, and means adapted to insure final adjustment of said selecting means prior to the actuation thereof by said actuating means.

204. In an accounting apparatus, the combination with means for selecting accounting elements, of actuating means therefor, means for adjusting said selecting means in successive steps of varying operative periods, and means adapted to insure final adjustment of said selecting means prior to the actuation thereof by said actuating means.

205. In an accounting apparatus, the combination with actuating means, of a selector for accounting elements, means for adjusting the same, and means adapted to insure completion of the adjustment of said selector prior to the actuation thereof by said actuating means.

206. In an accounting apparatus, the combination with a selector for accounting elements, of actuating means therefor, means for adjusting said selector in successive steps, and means adapted to insure final adjustment of said selector prior to the actuation thereof by said actuating means.

207. In an accounting apparatus, the combination with a selector for accounting elements, of actuating means therefor, means for adjusting said selector in successive steps of varying operative periods, and means adapted to insure final adjustment of said selector prior to the actuation thereof by said actuating means.

208. In an accounting apparatus, the combination with a selector for accounting elements, of means for adjusting said selector in successive steps, means for actuating said selector upon completion of the final step, and means for insuring completion of the preceding steps before actuation of said selector.

209. In an accounting apparatus, the combination with a selector for accounting elements, of actuating means therefor, means for adjusting said selector in successive steps, and means for actuating said selector upon completion of all adjustments of said selector.

210. In an accounting apparatus, the combination with a tray for accounting elements, of means cooperating with units of said elements adapted to unpack a selected unit.

211. In an accounting apparatus, the combination with selecting means for accounting elements, of means adapted to unpack a selected unit of said elements chosen by said selecting means.

212. In an accounting apparatus, the combination with selecting means for accounting elements, of means for locating said selecting means with respect to a unit of said elements, and means adapted to unpack said unit.

213. In an accounting apparatus, the combination with selecting means for accounting elements, of means for locating said selecting means with respect to a unit of said elements, and means operable upon location of said unit adapted to unpack said unit.

214. In an accounting apparatus, the combination with selecting means for accounting elements, of means for locating said selecting means with respect to one of said elements, and means adapted to unpack said element.

215. In an accounting apparatus, the combination with selecting means for accounting elements, of means for locating said selecting means with respect to a unit of said elements, means for locating said selecting means with respect to an element in said unit, and means adapted to unpack said unit.

216. In an accounting apparatus, the combination, of means for locating an individual element among a group of said elements, means for isolating said located element, and means for returning said locating and isolating means, adapted to clear the apparatus.

217. In an accounting apparatus, the combination with means for selecting accounting elements, of means for locating said selecting means with respect to a group of said elements, means for locating said selecting means with respect to a selected element of said group, keys adapted to control the operation of said locating means, and means for returning said locating means, adapted to clear the apparatus.

218. In an accounting apparatus, the combination with means for selecting accounting elements, of means for locating said selecting means with respect to said elements, and means for returning said locating means, adapted to clear the apparatus.

219. In an accounting apparatus, the combination with means for selecting accounting elements, of means for locating said selecting means with respect to said elements, means for returning said locating means, adapted to clear the apparatus, and a motor connected to operate said returning means.

220. In an accounting apparatus, the combination with means for selecting accounting elements, of means for locating said selecting means with respect to said elements, mechanism including a key adapted to control the operation of said locating means, means for returning said locating means, adapted to clear the apparatus, and a key adapted to control the operation of said returning means.

221. In an accounting apparatus, the combination with means for selecting accounting elements, of means for locating said selecting means with respect to said elements, mechanism including a key adapted to control the operation of said locating means, means for returning said locating means, adapted to clear the apparatus, a motor connected to operate said returning means, and a key adapted to control the operation of said returning means by said motor.

222. In an accounting apparatus, the combination with means for selecting accounting elements, of means for setting said selecting means, means for returning said selecting means, adapted to clear the apparatus, and a motor connected to operate said returning means.

223. In an accounting apparatus, the combination with means for selecting accounting elements, of means for setting said selecting means, a key adapted to control the operation of said setting means, means for returning said selecting means, adapted to clear the apparatus, and a key adapted to control the operation of said returning means.

224. In an accounting apparatus, the combination with means for selecting accounting elements, of means for setting said selecting means, a key adapted to control the operation of said setting means, means for returning said selecting means, adapted to clear the apparatus, a motor connected to operate said returning means, and a key adapted to control the operation of said returning means by said motor.

225. A selecting device for a plurality of accounting cards comprising an operating key, a selecting member operably related to said key, and a card-moving member operably related to said selecting member, said key when actuated adapted to cause said selecting member to actuate said card-moving member and move only one of said cards.

226. A selecting device for a plurality of accounting cards among which are arranged a plurality of cards bearing like identifying portions comprising a plurality of card-moving members, a plurality of operating keys operably related to said card-moving members, and means co-operable with said keys and said card-moving members, for actuating said members independently of one another, one of said members when moved being effective on only one of said like cards.

227. A selecting device for a plurality of accounting cards comprising a card-holder, cards arranged in subdivision mounted in said holder, means for identifying one card from another in each subdivision, reciprocally mounted members adapted to engage said cards, and selecting members operably related to said reciprocable members for selecting one subdivision of cards among said other groups of cards, and for selecting one card from said selected subdivision of cards.

228. A selecting device comprising a plurality of operating keys, separate mechanisms related to each of said keys, and means co-operable with said mechanisms whereby any one of said keys is adapted to operate any one of said mechanisms.

229. A selecting device comprising a plurality of operating keys, separate mechanisms related to each of said keys, and means cooperable with said mechanisms whereby any one of said keys is adapted to successively operate all of said mechanisms.

230. A selecting device of the character described, comprising a plurality of reciprocally mounted card-actuating members, a card located adjacent said members, adapted to be moved by one of said members, an to be inactive to the other of said members, and a selecting member for selecting the desired card-actuating member.

231. In a selecting device, an operating key, a plurality of movably mounted cards, a plurality of card-moving members for said cards, and selecting means for selecting one of said members to be actuated by said key, related to said key.

232. In a selecting device, an operating key, separate mechanisms to be operated by said key, a shifting device operably related to said key, said shifting device adapted to be successively moved to positions of actuation with each of said mechanisms.

233. In a selecting device, an operating key, separate mechanisms to be operated by said key, a shifting device operably related to said key, said shifting device adapted to be successively moved to positions of actuation with each of said mechanisms, and a plurality of card-moving members operably related to the last mechanism operated on by said shifting device.

234. In combination, a movably mounted index card and a movably mounted pilot card, and a card-moving member for moving said cards together.

235. In a selecting device, an operating key, separate mechanisms to be operated by said key, and a shifting device operably related to all of said mechanisms and said key, adapted to separate cooperation with each of said mechanisms.

236. In a selecting device, a plurality of accounting cards, separate mechanisms operably related to said cards, a shifting device adapted to be automatically moved to positions of engagement with said mechanisms successively and to operate the same, and an operating key for actuating said shifting device in any of its positions.

237. A selecting device for a plurality of accounting cards comprising an operating key, a pilot card for said accounting cards, a selecting member operably related to said key, and a card-moving member operably related to said selecting member, said key when actuated adapted to cause said selecting member to actuate said card-moving member and move one of said accounting cards and said pilot card.

238. A selecting device for a plurality of accounting cards comprising a card-holder, accounting cards mounted in said holder, a plurality of pilot cards arranged among said cards, reciprocally mounted members adapted to engage said accounting cards and said pilot cards, and selecting members operably related to said reciprocable members.

239. An indexing apparatus comprising a plurality of card-holding devices, each of said card-holding devices being for the reception of a number of accounting cards, and a selecting device cooperably related to the cards of said card-holding devices, adapted to be moved to positions of actuation relative to the cards of each card-holding device.

240. An indexing apparatus comprising a holder, accounting cards mounted in said holder, oppositely disposed engaging portions formed on each of said cards, reciprocal members arranged in pairs, for engaging said engaging portions of said cards, and a selecting mechanism for selecting a pair of said members for actuation relative to moving one of said cards.

241. An indexing apparatus comprising a holder, accounting cards mounted in approximately vertical positions in said holder, and an actuating mechanism for applying upward movement to said cards comprising a plurality of reciprocally mounted members, and selecting members operably related to said reciprocal members.

242. In a selecting device, the combination of a movably mounted index card, a pilot card, and a movable element for moving said cards together, said element also adapted to move said pilot card alone when said index card has been moved from thereadjacent.

243. In a selecting device, a unit of index cards and a pilot card related thereto, means for engagement with said index cards for moving said cards independently of each other, and means whereby when any one of said index cards are moved, said pilot card is moved therewith.

244. In a selecting device, a unit of index cards, a pilot card for said index cards, and a card-moving member for each of said index cards, each of said card-moving members being related to said pilot card relative to moving the same.

245. The combination of an index card and a pair of card-moving members, a pair of engaging portions carried by one edge of said card for engagement with said members, said card having its engaging portions arranged so as to always be in alinement with one or the other of said members when the position of said card is reversed.

246. In a selecting device, an index card having a pair of portions depending from the lower edge thereof forming abutting edges, each of said abutting edges being equally distant from the vertical center of the card, and a pair of simultaneously operating card-moving members for engagement with said abutting edges.

247. In a selecting device, a unit of index cards forming a series, each card of the series having a pair of depending portions formed on the lower edge thereof, each depending portion of each card being located equally distant from the vertical center of the card, each pair of depending portions of each card being at different distances apart than the pairs of depending portions of the other cards of the series, and a plurality of card-moving members arranged in pairs corresponding to the pairs of depending portions of said cards.

248. In a selecting device, a card receptacle, a unit of index cards forming a series mounted in said receptacle, each card of the series having a pair of depending portions formed on the lower edge thereof, said depending portions of each card being located equally distant from the vertical center of the card, each pair of depending portions of each card being at different distances apart than the pairs of depending portions of the other cards of the series, and a pair of card-moving members for engagement with the pair of depending portions of each card.

249. In a selecting device, a card receptacle, a unit of index cards forming a series mounted in said receptacle, each card of the series having a pair of depending portions formed on the lower edge thereof, said depending portions of each card being located equally distant from the vertical center of the card, each pair of depending portions of each card being at different distances apart than the pairs of depending portions of the other cards of the series, and a card-moving member operably related to each depending portion of each card, each of said card moving members extending the length of said series of cards.

250. A selecting device for a plurality of index cards comprising a plurality of operating keys, sets of selecting mechanisms co-operable with said keys, and card-moving members related to said cards and to a set of said mechanisms.

251. In a selecting device, a card holder, a plurality of cards located in said holder, a plurality of movably mounted plungers arranged beneath said cards, a plurality of selecting members co-operable with said plungers, and a plurality of keys co-operable with said selecting members for moving said plungers in pairs.

252. In a selecting device, a plurality of index cards, card-moving members related to said cards, a selecting mechanism for selecting certain of said card-moving members to be operated on, and an operating key cooperable with said selecting mechanism.

253. In a selecting device, a plurality of index cards, card-moving members related to said cards, a plurality of plungers for engagement with said card-moving members, a selecting mechanism operably related to said plungers, other selecting mechanisms operably related to said plungers, and a plurality of actuating keys each being independently related to each of said mechanisms.

254. In combination, a plurality of movably mounted index cards arranged in a unit, a pilot card for said unit of cards, and means for moving one of said index cards and said pilot card together.

255. In a selecting device for index cards, a plurality of card-moving members arranged in groups, selecting means for selecting a particular group of card-moving members relative to actuating one of the card-moving members of the selected group, means for selecting one of the card-moving members of the selected group, and means for actuating said selected card-moving member.

256. In a selecting device, a plurality of index cards arranged in groups, a set of reciprocally mounted plungers for each of said groups, and a selecting member for each of said plunger sets.

257. In a selecting device, a plurality of index cards arranged in groups, a set of reciprocally mounted plungers for each of said card groups, a selecting member for each of said plunger sets, and an operating key for each of said selecting members.

258. In an indexing system, a plurality of cards arranged in units of ten, each card of each unit having an identifying portion different than the other cards of its respective unit, the identifying portions of the cards of each unit being duplicates respectively of those of the cards of said other units.

259. In an indexing system, a plurality of cards arranged in units of ten, each card of each unit having a pair of identifying portions different than the identifying portions of the other cards of its respective unit, the identifying portions of different units of cards corresponding with one another.

260. A unit of index cards each having a pair of abutting portions extending from one edge thereof, the pair of abutting portions of each card being at different distances apart than the pairs of abutting portions of the other cards, pairs of card-moving members corresponding to the pairs of abutting portions of the respective cards, said abutting portions of all but one of said cards being out of the path of travel of the pair of card-moving members of said other card.

261. In a selecting device, a plurality of index cards arranged in groups, card-moving members for the individual cards of said groups, operating mechanisms related to said card-moving members, and means for selecting any particular group of operating mechanisms relative to a particular group of said card-moving members.

262. In an apparatus of the class described, a selector-carrier, a selector thereon, an actuator for said selector, stops adapted to variantly position said carrier, means for controlling said actuator including an actuated element in the path of said stops, and selective manipulative elements adapted to control said stops.

263. In an apparatus of the class described, a selector-carrier, a selector thereon, an actuator for said selector, stops adapted to variantly position said carrier, means for controlling said actuator including an actuated element in the path of said stops, and selective manipulative elements adapted to control said stops, one of said manipulative elements being adapted to directly control said actuator-controlling element.

264. In an apparatus of the class described, a selector-carrier, a selector thereon, an actuator for said selector, carrier-positioning elements, a series of which are adapted to variantly position said carrier, and means for controlling said actuator including an actuated element in the path of said series of carrier-positioning elements.

265. In an apparatus of the class described, a selector-carrier, a selector thereon, an actuator for said selector, carrier-positioning elements, a series of which are adapted to variantly position said carrier, and means for controlling said actuator including an actuated element in the path of said series of carrier-positioning elements, another of said carrier-positioning elements being adapted to directly operate said actuated element.

266. In an apparatus of the class described, a selector-carrier, a selector thereon, an actuator for said selector, carrier-positioning elements, a series of which are adapted to variantly position said carrier, means for controlling said actuator including an actuated element in the path of said series of carrier-positioning elements, and selective manipulative elements, a series of which are adapted to control said series of carrier-positioning elements, and another of which is adapted to directly operate said actuated element.

267. In a card finding and separating device, means for holding a plurality of cards in upright positions, a carriage bearing a pair of card-moving members arranged to travel longitudinally beneath said cards, and controllable means for moving said carriage forwardly and rearwardly beneath said cards.

268. In a card-selecting device, the combination of a card-holding means, cards having selective characteristics located in said card-holding means, and a structure mounted to travel longitudinally of said card-holding means, having means for selecting and raising a desired card from said card-holding means.

269. In a card-selecting device, the combination of a card receptacle, cards having selective characteristics located in said receptacle, and a structure mounted to travel longitudinally of said receptacle, having means for selecting and raising a desired card from said receptacle.

270. In an apparatus of the class described, a plurality of series of actuated elements of different orders, a set of main keys, a transmitter intermediate said elements and said keys, a shifting device cooperating with said transmitter and controlled by said keys, and an audit key adapted to control said device.

271. In an apparatus of the class described, a plurality of series of actuated elements of different orders, a set of main keys, a transmitter intermediate said elements and said keys, a shifting device cooperating with said transmitter and controlled by said keys so as to permit normal shift of said transmitter, and an audit key adapted to control said device so as to permit abnormal shift of said transmitter.

272. In an apparatus of the class described, a frame, a series of card trays thereon, selecting mechanism adapted to cooperate with the cards in any of said trays, and a carrier for said mechanism mounted to travel along said frame.

273. In a card separating device, the combination with a longitudinally movable member, a carriage adapted to longitudinal and transverse travel, a pair of card-moving members carried by said carriage having their card-engaging portions spaced apart a given distance, and means cooperable with said longitudinally movable member and said card-moving members for actuating said card-moving members.

274. In a card separating device, a receptacle containing a plurality of cards, a member movable longitudinally beneath said cards, a pair of card-moving members adapted to be moved longitudinally and transversely above said longitudinally movable member and held against movement towards or from each other, and cooperating means located between said longitudinally movable member and said card-moving members for allowing said longitudinally movable member to become active on said card-moving members.

275. A card separating device comprising a receptacle containing a plurality of cards, each having a pair of depending projections, the pairs of projections of each card being spaced equally apart, and a pair of card-moving members arranged beneath the projections of said cards, adapted to longitudinal and transverse travel for operating on the pairs of projections of said cards.

276. A card separating device comprising a receptacle containing a plurality of cards, each card having a pair of depending projections, the pairs of projections of each card being spaced equally apart, a pair of card-moving members arranged beneath the projections of said cards, adapted to longitudinal and transverse travel for operating on the pairs of projections of said cards, operating means for said card-moving members, and a longitudinally and vertically movable member arranged beneath said operating means for actuating said operating means.

277. A card separating device comprising a receptacle containing a plurality of cards, each having a pair of depending projections, the pairs of projections of each card being spaced equally apart, a pair of card-moving members arranged beneath the projections of said cards, adapted to longitudinal and transverse travel for operating on the pairs of projections of said cards, a vertically movable member arranged beneath said card moving member extending the length of the longitudinal travel of said card-moving member, and means for operating said vertically movable member.

278. In a card finding and separating device, a receptacle containing a plurality of cards, a member movable longitudinally beneath said cards bearing a series of upwardly movable elements, a pair of card-moving members located above each of said upwardly movable elements adapted to be moved longitudinally and transversely of the receptacle, and a series of vertically movable members, each being co-operable with a respective element of said first-mentioned movable member and a respective pair of card-moving members.

279. A card finding and separating device comprising a receptacle adapted to contain a plurality of index cards, a carriage adapted to be moved transversely and longitudinally beneath said cards, and a pair of transversely arranged card-moving members, reciprocally mounted in said carriage for operating on said cards.

280. In a card finding and separating device, a receptacle containing a plurality of cards each having a pair of equally distant spaced apart depending portions, a pair of transversely arranged card-moving members held apart a distance equal to the pairs of projections of each of said cards, and means for moving said pairs of card-moving members longitudinally and transversely beneath said cards.

281. In a card finding and separating device, a receptacle containing a plurality of cards each having a pair of equally distant spaced apart depending projections, the pairs of projections of said cards being in staggered relation to one another, a pair of transversely arranged card-moving members held apart a distance equal to that of the respective pairs of projections of said cards, and means for moving said pair of card-moving members together transversely beneath said cards so that said card-moving members can engage the pair of projections of any one of said cards.

282. In a card finding and separating device, a receptacle, a plurality of upright cards mounted in said receptacle, a series of pairs of card-moving members held an equal distance apart transversely, all of said members adapted to be moved in unison longitudinally and transversely beneath said cards, a vertically reciprocating member located beneath each pair of said card-moving members for engagement therewith, a longitudinally movable member arranged beneath said vertically movable members bearing parts for cooperation with each of said vertically movable members, means for shifting said longitudinally movable member so that the cooperating parts thereof can be moved to positions of cooperation relative to any of said vertically movable members, and means for moving said cooperable parts upwardly so that one of said vertically movable members will engage a pair of card-moving members.

283. In a card finding and separating device, a means for holding a plurality of cards in upright positions, a carriage bearing a pair of card-moving members arranged to travel longitudinally beneath said cards, controllable means for moving said carriage forwardly and rearwardly beneath said cards, and means for moving said carriage transversely of said cards.

284. In a card finding and separating device, means for holding a plurality of cards in upright positions, a carriage bearing a pair of card-moving members arranged to travel longitudinally beneath said cards, controllable means for moving said carriage forwardly and rearwardly beneath said cards, means for moving said carriage transversely of said cards, operating means for said card-moving members, a member to travel longitudinally beneath said card-moving members related to said operating means, and controllable means for moving said last-mentioned member forwardly or rearwardly.

285. In a card finding and separating device, a plurality of cards, means for holding said cards in upright positions, a pair of card-moving members arranged beneath said cards adapted to longitudinal and transverse travel, a movable member located beneath said card-moving members extending the length of the longitudinal travel of said card-moving members, and a second movable member for applying upward movement to said first-mentioned movable member.

286. In a card finding and separating device, means for holding a plurality of cards in upright positions, a carriage bearing a pair of card-moving members arranged to travel longitudinally beneath said cards, controllable means for moving said carriage forwardly and rearwardly beneath said cards, and locking means for holding said controllable means against movement.

287. In a card separating device, the combination of a longitudinally movable member, a carriage adapted to longitudinal and transverse travel, means for moving said carriage, a pair of card-moving members carrier by said carriage having their card-engaging portions spaced apart a given distance, means cooperable with said longitudinally movable member and said card-moving members for actuating said card-moving members, and locking means for preventing said carriage being moved during the operating of said card-moving members carried thereby.

288. In a card finding and separating device, a receptacle containing a plurality of cards, a series of pairs of card-moving members arranged beneath said cards adapted to longitudinal and transverse travel, an independently movable lifting member located beneath each pair of card-moving members, each having a portion extending the length of the longitudinal travel of its respective pair of card-moving members, a longitudinally movable member having portions which are adapted to upward movement, each portion of said longitudinally movable member being adapted to cooperate with a respective lifting member, and means provided whereby all of said lifting members may be moved together for moving all of said card-moving members together.

289. In a card finding and separating device, a receptacle containing a group of upright cards, a pair of card-moving members adapted to longitudinal and transverse travel beneath said cards to positions of engagement whereby said card-moving members can lift any one of said cards, and a lifting member for engagement with said card-moving members during any of the card-lifting positions of said card-moving members.

290. A mechanism for raising an edge of a desired card from a group of upright cards comprising a pair of related card-moving members adapted to transverse travel relative to the card group, a lifting member for said card-moving members, and means cooperable with said card-moving members and said lifting member whereby said lifting member is active on said card-moving members in any transverse location of said card-moving member.

291. A mechanism for raising the edge of a desired card from a group of upright cards, comprising a card-moving member having a transversely extending portion adapted to transverse travel relative to the card group, and a lifting member for engagement with said transversely extending portion of said card-moving member.

292. A mechanism for raising the edge of a desired card from a group of upright cards, comprising, a card-moving member having a transversely extending portion adapted to transverse and longitudinal travel relative to the card group, and a lifting member for engagement with said transversely extending portion of said card-moving member having a longitudinally extending portion for underlapping the transverse extending portion of said card-moving member during its longitudinal travel.

293. In a card finding and separating device, a receptacle containing a group of approximately vertically held cards, each of said cards having a pair of equidistantly spaced apart depending projections, the pairs of projections of said cards being in staggered relation to one another.

294. A mechanism for raising an edge of a desired card from a group of upright cards comprising a pair of relatably swingable card-engaging members adapted to transverse travel beneath the card group, and a rockable lifting member for actuating said swingable card-engaging members.

295. In a card finding and separating device, a plurality of cards, means for holding said cards in upright positions, a series of pairs of card-moving members arranged beneath said cards adapted to longitudinal and transverse travel, a lifting member located beneath each pair of said card-moving members for actuating said card-moving members, extending the length of the longitudinal travel of the respective pair of card-moving member for applying upward movement to each of said lifting members.

296. In a card-selecting device, the combination of a card-receptacle, card units having selective characteristics located in said receptacle, and a carriage mounted to travel longitudinally of said receptacle, having means for selecting and raising a desired unit from said receptacle.

297. In a card-selecting device, the combination of a card-receptacle, partitions in said receptacle dividing it into compartments, a group of cards with selective characteristics in each compartment, a support for said receptacle, means for positioning the receptacle thereon, a carriage mounted to travel on said support, and selecting members mounted on the carriage and adapted to be positioned thereby to operate in any of the compartments.

298. In a card selecting device, the combination of a card-receptacle, partitions in said receptacle dividing it into compartments, a group of cards with selective characteristics in each compartment, a support for said receptacle, means for positioning the receptacle thereon, a carriage mounted to travel on said support, selecting members mounted on the carriage and adapted to be positioned thereby to operate in any of the compartments, and means associated with the receptacle to prevent the selecting members from being operated unless they are properly positioned to operate on the cards in one of said compartments.

299. In a card selecting and raising device, the combination of a receptacle for cards, partitions in the receptacle adapted to divide the cards into groups, a selecting carriage adapted to travel from one of said card groups to another within the length of the receptacle, guiding means for the travel of said carriage, and a selecting and raising mechanism carried by said carriage for selecting and raising one or more cards in any one of the compartments.

300. A card selecting apparatus comprising a receptacle adapted to contain a plurality of approximately vertically arranged cards, a carriage adapted to travel the length of the receptacle, guiding means for said carriage, and a selective mechanism borne by said carriage adapted to select any one of the units or cards in the receptacle.

301. In a card selecting and raising device, a receptacle adapted to contain a plurality of card groups, a scale bearing a plurality of characters in register with respective card groups, a carriage movable along said scale bearing lifting members for operating on the cards of any card group, guiding means for the travel of said carriage, and an indicating hand borne by said carriage adapted to indicate on said scale the specific card group on which the lifting members of said carriage are to operate.

302. In a card selecting and raising device, the combination of a receptacle divided into transversely extended compartments, each compartment adapted to contain a number of cards, a carriage adapted to be moved from one compartment to another lengthwise of the receptacle, guiding and supporting means for said carriage, and selecting members borne by said carriage each adapted to select a respective card of each of said compartments.

303. In a card selecting and raising device, the combination of a card file, divided into compartments, each compartment adapted to contain cards, a carriage adapted to be moved from one compartment to another within the length of the card file by means of a thumb piece borne thereby, and guiding means for the travel of said carriage.

304. In a card selecting device, the combination of a plurality of card receptacles arranged in a horizontal row, card units having selective characteristics located in said receptacles, a horizontal track located adjacent said receptacles at the front end thereof, a support to be moved along said track, to positions wherein any one of said receptacles can be located thereon and a card-selecting device carried by said support for selecting and raising a card from any one of the receptacles.

305. A card selecting and raising apparatus, comprising a receptacle adapted to contain a plurality of cards arranged in groups of ten cards each, a carriage adapted to travel the length of the receptacle, guiding and supporting means for said carriage, and a selecting mechanism borne by said carriage having a lifting member for each card of a card group.

306. A card selecting and raising apparatus, comprising, a receptacle adapted to contain a plurality of vertically held cards arranged in ten card groups, a carriage adapted to travel the length of the receptacle, a selecting mechanism borne by said carriage, guiding means for said carriage, said mechanism having a series of card lifting members and there being a lifting member for each card of a card group, and means for preventing said lifting members being operated when the carriage is out of register with an elected card group.

307. In a card selecting and raising device, the combination of a receptacle divided into compartments, each compartment adapted to contain a group of cards, a carriage adapted to be moved from one compartment to another, means for guiding said carriage, selecting members mounted on the carriage to operate on the cards in any of the compartments, and means to prevent said carriage being moved from the compartment in which it is operating while any selecting member is being operated.

308. In an apparatus of the class described, the combination with selector means, of mechanism adjacent thereto and for direct cooperation therewith adapted to successively locate said selector means in accordance with the successive orders of a given system, and a frame having bearings for supporting said means and mechanism for cooperative relation.

309. In an apparatus of the class described, the combination with selector means, of mechanism adjacent thereto and for direct cooperation therewith adapted to successively location cate said selector means in accordance with the successive orders of a given system, selective manipulative elements adapted to control said mechanism, and a frame having bearings for supporting said means, mechanism and elements for cooperative relation.

310. In an apparatus of the class described, the combination with selector means, of mechanism adapted to successively locate said selector means in accordance with the successive orders of a given system, key mechanisms corresponding to the orders of the system and adapted to control said locating mechanism, and a frame having bearings for supporting said means, mechanisms and keys for cooperative relation.

311. In an apparatus of the class described, the combination with selector means, of mechanism adjacent thereto and for direct cooperation therewith adapted to diminishingly locate said selector means in accordance with the successive divisions of a given system, and a frame having bearings for supporting said means and mechanism for cooperative relation.

312. In an apparatus of the class described, the combination with selector means, of mechanism adjacent thereto and for direct cooperation therewith adapted to diminishingly locate said selector means in accordance with the successive divisions of a given system, selective manipulative elements corresponding to the system, adapted to control said mechanism, and a frame having bearings for supporting said means, mechanism and elements for cooperative relation.

313. In an apparatus of the class described, the combination with selector means, of mechanism adjacent thereto and for direct cooperation therewith, adapted to successively locate said selector means in accordance with the successive orders of the decimal system, and a frame having bearings for supporting said means and mechanism for cooperative relation.

314. In an apparatus of the class described, the combination with selector means, of mechanism adjacent thereto and for direct cooperation therewith, adapted to diminishingly locate said selector means in accordance with the hundreds and tens of the decimal system, and a frame having bearings for supporting said means and mechanism for cooperative relation.

315. In an apparatus of the class described, the combination with selector means, of mechanism adjacent thereto and for direct cooperation therewith, adapted to diminishingly locate said selector means in accordance with the hundreds, tens and units of the decimal system, and a frame having bearings for supporting said means and mechanism for cooperative relation.

316. In an apparatus of the class described, the combination with selector means, of mechanism adapted to successively locate said selector means in accordance with the successive orders of the decimal system, decimal key mechanisms adapted to control said locating mechanism, and a frame having bearings for supporting said means, mechanisms and keys for cooperative relation.

317. In an apparatus of the class described, the combination with a selector adapted for location in accordance with a given system, of means adjacent thereto and for direct cooperation therewith, for locating said selector in accordance with one order, means for locating said selector in accordance with another order, and a frame having bearings for supporting said selector and said means for cooperative relation.

318. In an apparatus of the class described, the combination with a selector adapted for locating in accordance with a given system, of means adjacent thereto and for direct cooperation therewith, for locating said selector in order to correspond to a division of that system, means for locating said selector in accordance with a subdivision of that division, and a frame having bearings for supporting said selector and said means for cooperative relation.

319. In an apparatus of the class described, the combination with a selector adapted for locating in accordance with a given system, of means for locating said selector in order to correspond to a division of that system, means for locating said selector in accordance with a subdivision of that division, means for locating said selector in accordance with a digit of that subdivision, and a frame having bearings for supporting said selector and said means for cooperative relation.

320. In an apparatus of the class described, the combination with a selector adapted for locating in accordance with a given system, of means for locating said selector in order to correspond to a division of that system, means for locating said selector in accordance with a subdivision of that division, sets of key mechanisms corresponding respectively to the divisions and subdivision and adapted to control said locating means, and a frame having bearings for supporting said selector, said means and said key mechanisms for cooperative relation.

321. In an apparatus of the class described, the combination with a selector adapted for locating in accordance with a given system, of means for locating said selector in order to correspond to a division of that system, means for locating said selector in accordance with a subdivision of that division, means for locating said selector in accordance with a digit of that subdivision, sets of key mechanisms corresponding respectively to the division and subdivision and digit and adapted to control said locating means, and a frame having bearings for supporting said selector, said means and said key mechanisms for cooperative relation 322. In an apparatus of the class described, the combination with selector means, of means for adjusting said selector means in order to effect a series of primary locations, means for adjusting said selector means to a series of secondary locations, and a frame having bearings for supporting said means for cooperative relation.

323. In an apparatus of the class described, the combination with selector means, of means for adjusting said selector means in order to effect a series of primary locations, means for adjusting said selector means to a series of secondary locations, means for adjusting said selector means to a series of tertiary locations, and a frame having bearings 324. In an apparatus of the class described, the combination with a series of selectors, of means adjacent thereto and for direct cooperation therewith, for rendering a chosen selector effective, means for locating said chosen selector, selective manipulative key mechanisms adapted to control respectively said rendering and locating means, and a frame having bearings for supporting said selectors, said means and said mechanisms for cooperative relation.

325. In an apparatus of the class described, the combination with a series of selectors, of a set of key mechanisms connected to control said selectors, a set of key mechanisms adapted to further control a chosen selector, and a frame having bearings for supporting said selectors and key mechanisms for cooperative relation.

326. In an apparatus of the class described, the combination with a series of selectors, of a set of key mechanisms, each connected to control one of said selectors, a set of key mechanisms adapted to further control any selector chosen by any of said first key mechanisms, and a frame having bearings for supporting said selectors and key mechanisms for cooperative relation.

327. In an apparatus of the class described, the combination with a series of selectors, of a set of key mechanisms, each connected to render one of said selectors effective, a set of key mechanisms adapted to further control any selector chosen by any of said first key mechanisms, and a frame having bearings for supporting said selectors and key mechanisms for cooperative relation.

328. In an apparatus of the class described, the combination with a series of selectors, of a set of key mechanisms, each adapted to render one of said selectors effective, a set of key mechanisms, each adapted to locate any selector chosen by any of said first key mechanisms, and a frame having bearings for supporting said selectors and key mechanisms for cooperative relation.

329. In an apparatus of the class described, the combination with a series of selectors, of a set of key mechanisms, each adapted to render one of said selectors effective, secondary sets of key mechanisms, each set being adapted to locate any selector chosen by any of said first first key mechanisms, and a frame having bearings for supporting said selectors and keys for cooperative relation.

330. In an apparatus of the class described, the combination with a series of selectors, of means for rendering a chosen selector effective, means adjacent thereto and for direct cooperation therewith, for successively locating said chosen selector, selective manipulative key mechanisms adapted to control respectively said rendering and locating means, and a frame having bearings for supporting said selectors, said means and said elements for cooperative relation.

331. In an apparatus of the class described, the combination with a series of selectors, of a set of key mechanisms each adapted to render one of said selectors effective, secondary sets of key mechanisms, the key mechanisms of each set being adapted variantly to locate any selector chosen by any of said first key mechanisms, and a frame having bearings for supporting said selectors and key mechanisms for cooperative relation.

332. In an apparatus of the class described, the combination with a selector, of primary, secondary and tertiary selective manipulative mechanisms adapted for corresponding primary, secondary and tertiary operation to locate said selector, and a frame having bearings for supporting said selector and said mechanisms for cooperative relation.

333. In an apparatus of the class described, the combination with a selector, of a primary key mechanism adapted for operation for locating said selector, a set of secondary key mechanisms adapted to adjust said selector to a series of secondary locations, and a frame having bearings for supporting said selector and key mechanisms for cooperative relation.

334. In an apparatus of the class described, the combination with a selector, of a primary key mechanism adapted for operation for locating said selector, a set of secondary key mechanisms adapted to adjust said selector to a series of secondary locations, a set of tertiary key mechanisms adapted to adjust said selector to a series of tertiary locations, and a frame having bearings for supporting said selector and key mechanisms for cooperative relation.

335. In an apparatus of the class described, the combination with a series of selectors, of a series of primary key mechanisms, each adapted to render a chosen selector effective, a set of secondary key mechanisms adapted to adjust the chosen selector to a series of secondary locations, and a frame having bearings for supporting said selectors and key mechanisms for cooperative relation.

336. In an apparatus of the class described, the combination with a series of selectors, of a series of primary key mechanisms each adapted to render a chosen selector effective, a set of secondary key mechanisms adapted to adjust the chosen selector to a series of secondary locations, a set of tertiary key mechanisms adapted to adjust the chosen selector to a series of tertiary locations, and a frame having bearings for supporting said selectors and key mechanisms for cooperative relation.

337. In an apparatus of the class described, the combination with a series of selectors, of a series of primary key mechanisms, each adapted to render a chosen selector effective, a set of secondary key mechanisms adapted to adjust said selectors to a series of secondary locations, and a frame having bearings for supporting said selectors and key mechanisms for cooperative relation.

338. In an apparatus of the class described, the combination with a series of selectors, of a series of primary key mechanisms, each adapted to render a chosen selector effective, a set of secondary key mechanisms adapted to adjust said selectors to a series of secondary locations, a set of tertiary key mechanisms adapted to adjust said selectors to a series of tertiary locations, and a frame having bearings for supporting said selectors and key mechanisms for cooperative relation.

339. In an apparatus of the class described, the combination with a series of selectors, of a series of primary key mechanisms each adapted to render a chosen selector effective, a set of secondary key mechanisms adapted to adjust a chosen selector to a series of secondary locations, means for actuating the adjusted selector, and a frame having bearings for supporting said selectors and key mechanisms for cooperative relation.

340. In an apparatus of the class described, the combination with a series of selectors, of a series of primary key mechanisms, each adapted to render a chosen selector effective, a set of secondary key mechanisms adapted to adjust a chosen selector to a series of secondary locations, a set of tertiary key mechanisms adapted to adjust a chosen selector to a series of tertiary locations, means for actuating the adjusted selector, and a frame having bearings for supporting said selectors and key mechanisms for cooperative relation.

341. In an apparatus of the class described, the combination with a series of selectors, of a series of primary key mechanisms, each adapted to render a chosen selector effective, a set of secondary key mechanisms adapted to adjust a chosen selector to a series of secondary locations, a set of tertiary key mechanisms adapted to adjust a chosen selector to a series of tertiary locations, means actuated upon operation of a tertiary key mechanism for actuating the finally located selector, and a frame having bearings for supporting said selectors and key mechanisms for cooperative relation.

342. In an apparatus of the class described, the combination with a series of selectors, of a set of key mechanisms adapted to adjust said selectors to a series of locations, a set of key mechanisms adapted to adjust said selectors to another series of locations, and a frame having bearings for supporting said selectors and key mechanisms for cooperative relation.

343. In an apparatus of the class described, the combination with a series of selectors, of a set of key mechanisms adapted to adjust said selectors to a series of locations in one direction, a set of key mechanisms adapted to adjust said selectors to another series of locations in another direction, and a frame having bearings for supporting said selectors and key mechanisms for cooperative relation.

In testimony whereof we affix our signatures this 29th day of March, 1918.

LUTHER A. WATTERS.
SAMUEL F. LLOYD.

CERTIFICATE OF CORRECTION.

Patent No. 1,736,334.                        Granted November 19, 1929, to

LUTHER A. WATTERS ET AL.

It is hereby certified that error appears in the printed specification of the above numbered patent requiring correction as follows: Page 5, line 84, strike out the words "comprises a pair of sides" and insert "is mounted on the main"; page 7, line 11, strike out the article "the"; page 12, line 43, for the misspelled word "th" read "the"; page 19, line 119, for the numeral "30" read "303" page 25, claims 40, 41, 42 and 43, before the period at the end of each claim insert the word "successively"; same page, line 102, claim 42, for the word "for" read "of"; page 28, line 41, claim 79, for the misspelled word "acocunting" read "accounting"; page 30 lines 11 and 16, claims 113 and 114, respectively, after the word "relation" insert the word "and"; line 26, claim 115, after the word "elements" insert the word "and"; page 32, line 44, claim 145, for the word "division" read "divisions"; page 37, line 11, claim 230, for "an" read "and"; page 39, lines 1, 9 and 19, for claim numerals "262, 263 and 264" read "263, 264 and 265"; same page, strike out lines 27 to 36, comprising present claim 265, and insert the following as claim 262, after line 130, page 38:

262. In a selecting device, a movably mounted releasing element, a plurality of mechanisms to be released by said element, means for moving said element to positions adjacent each of said mechanisms, and an operating key related to said element for releasing said mechanisms.;

and that the said Letters Patent should be read with these corrections therein that the same may conform to the record of the case in the Patent Office.

Signed and sealed this 18th day of March, A. D. 1930.

(Seal)                                                                   M. J. Moore,
                                                                      Acting Commissioner of Patents.